(12) United States Patent
Kuo et al.

(10) Patent No.: US 9,386,653 B2
(45) Date of Patent: Jul. 5, 2016

(54) CIRCUITS AND METHODS FOR DRIVING LIGHT SOURCES

(71) Applicant: O2Micro, Inc., Santa Clara, CA (US)

(72) Inventors: Ching-Chuan Kuo, Taipei (TW); Feng Lin, Sichuan (CN); Ying-Chieh Su, Taipei (TW)

(73) Assignee: O2Micro Inc, Santa Clara, CA (US)

( * ) Notice: Subject to any disclaimer, the term of this patent is extended or adjusted under 35 U.S.C. 154(b) by 217 days.

(21) Appl. No.: 14/096,892

(22) Filed: Dec. 4, 2013

(65) Prior Publication Data

US 2014/0091723 A1    Apr. 3, 2014

Related U.S. Application Data

(63) Continuation-in-part of application No. 13/559,451, filed on Jul. 26, 2012, now Pat. No. 9,232,591, which is a continuation-in-part of application No. 13/100,434, filed on May 4, 2011, now Pat. No.
(Continued)

(30) Foreign Application Priority Data

Nov. 15, 2013 (CN) .......................... 2013 1 0572104

(51) Int. Cl.
*H05B 33/02* (2006.01)
*H05B 33/08* (2006.01)

(52) U.S. Cl.
CPC ........ *H05B 33/0857* (2013.01); *H05B 33/0818* (2013.01); *H05B 33/0848* (2013.01); *Y02B 20/346* (2013.01)

(58) Field of Classification Search
CPC .......... H05B 33/0857; H05B 33/0818; H05B 33/0848; Y02B 20/346
See application file for complete search history.

(56) References Cited

U.S. PATENT DOCUMENTS

| | | | |
|---|---|---|---|
| 5,691,605 A | 11/1997 | Xia et al. | |
| 5,959,443 A | 9/1999 | Littlefield | |
| 6,304,464 B1 | 10/2001 | Jacobs et al. | |
| 6,320,330 B1 | 11/2001 | Haavisto et al. | |
| 6,727,662 B2 | 4/2004 | Konopka et al. | |
| 6,839,247 B1 | 1/2005 | Yang et al. | |

(Continued)

FOREIGN PATENT DOCUMENTS

| | | |
|---|---|---|
| CN | 1498055 A | 5/2004 |
| CN | 1694597 A | 11/2005 |

(Continued)

OTHER PUBLICATIONS

The datasheet describes an Universal High Brightness LED driver HV9910B from Supertex Inc.
(Continued)

*Primary Examiner* — Jung Kim

(57) ABSTRACT

A driving circuit for driving a light source having an adjustable color temperature is provided. The driving circuit includes a power converter, coupled between a power source and the light source and operable for receiving power from the power source and for providing a regulated power to the light source; and a color temperature controller, coupled to the power converter and operable for receiving a switch monitoring signal indicative of an operation of a power switch coupled between the power source and the power converter, and for adjusting the color temperature of the light source based on the switch monitoring signal.

6 Claims, 29 Drawing Sheets

Related U.S. Application Data 8,339,067, which is a continuation-in-part of application No. 12/415,028, filed on Mar. 31, 2009, now Pat. No. 8,076,867, which is a continuation-in-part of application No. 12/316,480, filed on Dec. 12, 2008, now Pat. No. 8,044,608.

(56) References Cited

U.S. PATENT DOCUMENTS

| | | |
|---|---|---|
| 6,946,819 B2 | 9/2005 | Fagnani et al. |
| 6,975,078 B2 | 12/2005 | Yanai et al. |
| 6,984,963 B2 | 1/2006 | Pidutti et al. |
| 7,084,582 B2 | 8/2006 | Buonocunto |
| 7,141,940 B2 | 11/2006 | Ortiz |
| 7,148,664 B2 | 12/2006 | Takahashi et al. |
| 7,180,274 B2 | 2/2007 | Chen et al. |
| 7,190,124 B2 | 3/2007 | Kumar et al. |
| 7,259,527 B2 | 8/2007 | Foo |
| 7,288,902 B1 | 10/2007 | Melanson |
| 7,304,464 B2 | 12/2007 | Weng et al. |
| 7,307,614 B2 | 12/2007 | Vinn |
| 7,312,783 B2 | 12/2007 | Oyama |
| 7,323,828 B2 | 1/2008 | Russell et al. |
| 7,394,209 B2 | 7/2008 | Lin et al. |
| 7,466,082 B1 | 12/2008 | Snyder et al. |
| 7,639,517 B2 | 12/2009 | Zhou et al. |
| 7,649,325 B2 | 1/2010 | McIntosh et al. |
| 7,710,084 B1 | 5/2010 | Guo |
| 7,714,464 B2 | 5/2010 | Tsai et al. |
| 7,759,881 B1 | 7/2010 | Melanson |
| 7,800,315 B2 | 9/2010 | Shteynberg et al. |
| 7,804,256 B2 | 9/2010 | Melanson |
| 7,852,017 B1 | 12/2010 | Melanson |
| 7,863,828 B2 | 1/2011 | Melanson |
| 7,888,922 B2 | 2/2011 | Melanson |
| 7,944,153 B2 | 5/2011 | Greenfeld |
| 8,076,867 B2 | 12/2011 | Kuo et al. |
| 8,085,005 B2 | 12/2011 | Dearn |
| 8,232,780 B2 | 7/2012 | Uno |
| 8,237,371 B2 | 8/2012 | Lin et al. |
| 8,274,800 B2 | 9/2012 | Uno et al. |
| 8,339,063 B2 | 12/2012 | Yan et al. |
| 8,344,657 B2 | 1/2013 | Zhan et al. |
| 8,378,588 B2 | 2/2013 | Kuo et al. |
| 8,379,413 B2 | 2/2013 | Ren et al. |
| 8,564,210 B2 | 10/2013 | Hamamoto et al. |
| 8,669,721 B2 | 3/2014 | Watanabe et al. |
| 8,890,436 B2 | 11/2014 | Chou |
| 9,119,252 B2 | 8/2015 | Wu |
| 9,167,646 B2 * | 10/2015 | Courtel .............. H05B 33/0815 |
| 9,215,769 B2 | 12/2015 | Ren et al. |
| 2001/0005319 A1 | 6/2001 | Ohishi et al. |
| 2003/0048632 A1 | 3/2003 | Archer |
| 2003/0107332 A1 | 6/2003 | Newman et al. |
| 2004/0085030 A1 | 5/2004 | Laflamme et al. |
| 2004/0130271 A1 | 7/2004 | Sekoguchi et al. |
| 2004/0218410 A1 | 11/2004 | Yamada et al. |
| 2005/0017691 A1 | 1/2005 | Aradachi et al. |
| 2006/0072324 A1 | 4/2006 | Hachiya et al. |
| 2006/0139907 A1 | 6/2006 | Yen |
| 2007/0047276 A1 | 3/2007 | Lin et al. |
| 2007/0182347 A1 | 8/2007 | Shteynberg et al. |
| 2007/0210725 A1 | 9/2007 | Marosek |
| 2007/0262724 A1 | 11/2007 | Mednik |
| 2008/0018261 A1 | 1/2008 | Kastner |
| 2008/0030153 A1 | 2/2008 | Mizuno |
| 2008/0180075 A1 | 7/2008 | Xie et al. |
| 2008/0203946 A1 | 8/2008 | Ito et al. |
| 2008/0224631 A1 | 9/2008 | Melanson |
| 2008/0258641 A1 | 10/2008 | Nakagawa et al. |
| 2008/0258647 A1 | 10/2008 | Scianna |
| 2008/0259655 A1 | 10/2008 | Wei et al. |
| 2008/0278092 A1 | 11/2008 | Lys et al. |
| 2008/0297068 A1 | 12/2008 | Koren et al. |
| 2009/0167187 A1 | 7/2009 | Kitagawa et al. |
| 2009/0184662 A1 | 7/2009 | Given et al. |
| 2009/0189548 A1 | 7/2009 | Hoffman et al. |
| 2009/0195180 A1 | 8/2009 | Chenetz |
| 2009/0224686 A1 | 9/2009 | Kunimatsu |
| 2009/0251059 A1 | 10/2009 | Veltman |
| 2009/0251071 A1 | 10/2009 | Gater et al. |
| 2009/0295303 A1 | 12/2009 | Pucko et al. |
| 2009/0309501 A1 | 12/2009 | Catalano et al. |
| 2009/0315480 A1 | 12/2009 | Yan et al. |
| 2009/0322254 A1 | 12/2009 | Lin |
| 2009/0322255 A1 | 12/2009 | Lin |
| 2010/0007292 A1 | 1/2010 | Horino |
| 2010/0013409 A1 | 1/2010 | Quek et al. |
| 2010/0026191 A1 | 2/2010 | Radermacher et al. |
| 2010/0141177 A1 | 6/2010 | Negrete et al. |
| 2010/0219766 A1 | 9/2010 | Kuo et al. |
| 2010/0253302 A1 * | 10/2010 | Otte ..................... H02M 3/155 323/282 |
| 2010/0265745 A1 | 10/2010 | Xu et al. |
| 2010/0308733 A1 | 12/2010 | Shao |
| 2011/0001766 A1 | 1/2011 | Hua et al. |
| 2011/0013437 A1 | 1/2011 | Uruno et al. |
| 2011/0037399 A1 | 2/2011 | Hung et al. |
| 2011/0050185 A1 | 3/2011 | Notman et al. |
| 2011/0109228 A1 | 5/2011 | Shimomura et al. |
| 2011/0109230 A1 | 5/2011 | Simi |
| 2011/0115407 A1 | 5/2011 | Wibben et al. |
| 2011/0128303 A1 | 6/2011 | Yonemaru et al. |
| 2011/0133665 A1 | 6/2011 | Huang |
| 2011/0140620 A1 | 6/2011 | Lin et al. |
| 2011/0140630 A1 | 6/2011 | Doudousakis et al. |
| 2011/0227506 A1 | 9/2011 | Ren et al. |
| 2011/0285307 A1 | 11/2011 | Kimura et al. |
| 2011/0298374 A1 | 12/2011 | Lenk et al. |
| 2012/0038292 A1 * | 2/2012 | Kuo ................... H05B 33/0818 315/297 |
| 2012/0062138 A1 | 3/2012 | Wilson et al. |
| 2012/0069606 A1 | 3/2012 | Sagneri et al. |
| 2012/0081018 A1 | 4/2012 | Shteynberg et al. |
| 2012/0081029 A1 | 4/2012 | Choi et al. |
| 2012/0139422 A1 | 6/2012 | Ren et al. |
| 2012/0139433 A1 | 6/2012 | Yan et al. |
| 2012/0146532 A1 | 6/2012 | Ivey et al. |
| 2012/0217894 A1 | 8/2012 | Chang et al. |
| 2012/0242247 A1 | 9/2012 | Hartmann et al. |
| 2012/0262079 A1 | 10/2012 | Lin et al. |
| 2012/0268023 A1 | 10/2012 | Yan et al. |
| 2012/0293087 A1 | 11/2012 | Matsuda et al. |
| 2013/0033197 A1 | 2/2013 | Hwang et al. |
| 2013/0043801 A1 * | 2/2013 | Kuwu ................. H05B 33/0863 315/210 |
| 2013/0049621 A1 | 2/2013 | Yan et al. |
| 2013/0147379 A1 | 6/2013 | Zhou et al. |
| 2013/0193877 A1 | 8/2013 | Kuo et al. |
| 2013/0200814 A1 | 8/2013 | Chen et al. |
| 2014/0145632 A1 | 5/2014 | Wey |
| 2015/0097489 A1 * | 4/2015 | Wu ..................... H05B 33/0827 315/122 |

FOREIGN PATENT DOCUMENTS

| | | |
|---|---|---|
| CN | 1760721 A | 4/2006 |
| CN | 101176386 A | 5/2008 |
| CN | 101179879 A | 5/2008 |
| CN | 101193486 A | 6/2008 |
| CN | 101222800 A | 7/2008 |
| CN | 101242143 A | 8/2008 |
| CN | 101370335 A | 2/2009 |
| CN | 101378207 A | 3/2009 |
| CN | 101466186 A | 6/2009 |
| CN | 101472368 A | 7/2009 |
| CN | 101489335 A | 7/2009 |
| CN | 101500354 A | 8/2009 |
| CN | 101511136 A | 8/2009 |
| CN | 101572974 A | 11/2009 |
| CN | 101605413 A | 12/2009 |
| CN | 101605416 A | 12/2009 |
| CN | 201491339 U | 5/2010 |
| CN | 101742771 A | 6/2010 |

(56) References Cited

FOREIGN PATENT DOCUMENTS

| | | | |
|---|---|---|---|
| CN | 101801129 A | 8/2010 |
| CN | 101815383 A | 8/2010 |
| CN | 101815391 A | 8/2010 |
| CN | 101854759 A | 10/2010 |
| CN | 201611973 U | 10/2010 |
| CN | 201682668 U | 12/2010 |
| CN | 101998726 A | 3/2011 |
| CN | 102014540 A | 4/2011 |
| CN | 102056378 A | 5/2011 |
| CN | 102118906 A | 7/2011 |
| CN | 102192487 A | 9/2011 |
| CN | 202050564 U | 11/2011 |
| CN | 102332814 A | 1/2012 |
| CN | 102387639 A | 3/2012 |
| CN | 102438377 A | 5/2012 |
| CN | 102522066 A | 6/2012 |
| CN | 102523650 A | 6/2012 |
| CN | 102695329 A | 9/2012 |
| CN | 102696282 A | 9/2012 |
| CN | 102811530 A | 12/2012 |
| CN | 102811531 A | 12/2012 |
| DE | 29904988 U1 | 6/1999 |
| EP | 1565042 A2 | 8/2005 |
| EP | 2026634 A1 | 2/2009 |
| EP | 2031942 A2 | 3/2009 |
| EP | 2214457 A1 | 8/2010 |
| EP | 2273851 A2 | 1/2011 |
| EP | 2320710 A1 | 5/2011 |
| EP | 2533606 A1 | 12/2012 |
| GB | 2482371 A | 2/2012 |
| GB | 2493054 A | 1/2013 |
| GB | 2501134 A | 10/2013 |
| JP | 10070846 A | 3/1998 |
| JP | 2001185371 A | 7/2001 |
| JP | 2001245436 A | 9/2001 |
| JP | 2008210536 A | 9/2008 |
| JP | 2010140823 A | 6/2010 |
| JP | 2010140824 A | 6/2010 |
| JP | 2010282757 A | 12/2010 |
| JP | 2011009701 A | 1/2011 |
| TW | M390631 U | 10/2010 |
| TW | M399572 U | 3/2011 |
| TW | 201113464 A | 4/2011 |
| TW | 201228458 A | 7/2012 |
| TW | 201234919 A1 | 8/2012 |
| TW | 201304605 A | 1/2013 |
| TW | M461737 U1 | 9/2013 |
| TW | 201408135 A | 2/2014 |
| WO | 2006006085 A1 | 1/2006 |
| WO | 2008001246 A1 | 1/2008 |
| WO | 2010148329 A1 | 12/2010 |
| WO | 2011048214 A1 | 4/2011 |

OTHER PUBLICATIONS

The datasheet describes a PWM high efficiency LED driver controller A704 from ADDtek Corp., Aug. 2008.
European search report dated Oct. 4, 2013 issued in European Patent Application No. 12161538.9 (9 pages).
Japanese Office Action dated Oct. 15, 2013 issued in Japanese Patent Application 2010-258837 (3 pages).
Datasheet of "Close Loop LED Driver with Enhanced PWM Dimming" from SUPERTEX INC, Dec. 31, 2009, pp. 1-12, XP002714011, CA, 94089, US.
Application Report of "Driving High-Current LEDs" from TEXAS INSTRUMENT, Jan. 31, 2007, pp. 1-8, XP002714012.
GB Office Action dated Jan. 14, 2013 issued in related GB patent Application No. 1313787.2 (5 pages).
European Search Report dated Dec. 11, 2013 issued in related patent Application No. 13150915.0 (5 pages).
Combined Search and Examination Report dated Jun. 26, 2014 issued for British Patent Application No. 1405042.1.

* cited by examiner

CIRCUITS AND METHODS FOR DRIVING LIGHT SOURCES

RELATED APPLICATIONS

The present application claims priority to Chinese Patent Application No. 201310572104.5, titled "Circuits And Methods For Driving Light Sources", filed on Nov. 15, 2013 with the State Intellectual Property Office of the People's Republic of China, and the present application is also a continuation-in-part of the co-pending U.S. patent application, application Ser. No. 13/559,451, filed on Jul. 26, 2012, entitled "Circuits And Methods For Driving Light Sources", which itself is a continuation-in-part of the U.S. patent application, application Ser. No. 13/100,434, filed on May 4, 2011, entitled "Circuits And Methods For Driving Light Sources", (now U.S. Pat. No. 8,339,067), which itself is a continuation-in-part of the U.S. patent application, application Ser. No. 12/415,028, filed on Mar. 31, 2009, entitled "Driving Circuit with Continuous Dimming Function for Driving Light sources" (now U.S. Pat. No. 8,076,867), which itself is a continuation-in-part of the U.S. patent application, application Ser. No. 12/316,480, filed on Dec. 12, 2008, entitled "Driving Circuit with Dimming Controller for Driving Light Sources" (now U.S. Pat. No. 8,044,608), and all of which are fully incorporated herein by reference.

BACKGROUND

In recent years, light sources such as light-emitting diodes (LEDs) have been improved through technological advances in material and manufacturing processes. An LED possesses relatively high efficiency, long life, and vivid colors, and can be used in a variety of industries including the automotive, computer, telecom, military and consumer goods, etc. One example is an LED lamp which uses LEDs to replace traditional light sources such as electrical filament.

FIG. 1 shows a schematic diagram of a conventional LED driving circuit 100. The LED driving circuit 100 utilizes an LED string 106 as a light source. The LED string 106 includes a group of LEDs connected in series. A power converter 102 converts an input voltage Vin to a desired output DC voltage Vout for powering the LED string 106. A switch 104 coupled to the LED driving circuit 100 can enable or disable the input voltage Vin to the LED string 106, and therefore can turn on or turn off the LED lamp. The power converter 102 receives a feedback signal from a current sensing resistor Rsen and adjusts the output voltage Vout to make the LED string 106 generate a desired light output. One of the drawbacks of this solution is that a desired light output is predetermined. In operation, the light output of the LED string 106 is set to a predetermined level and may not be adjusted by users.

FIG. 2 illustrates a schematic diagram of another conventional LED driving circuit 200. A power converter 102 converts an input voltage Vin to a desired output DC voltage Vout for powering the LED string 106. A switch 104 coupled to LED driving circuit 100 can enable or disable the input voltage Vin to the LED string 106, and therefore can turn on or turn off the LED lamp. The LED string 106 is coupled to a linear LED current regulator 208. Operational amplifiers 210 in the linear LED current regulator 208 compares a reference signal REF and a current monitoring signal from current sensing resistor Rsen, and generates a control signal to adjust the resistance of transistor Q1 in a linear mode. Therefore, the LED current flowing through the LED string 106 can be adjusted accordingly. In this solution, in order to control the light output of the LED string 106, users may need to use a dedicated apparatus, such as a specially designed switch with adjusting buttons or a switch that can receive a remote control signal, to adjust the reference signal REF.

SUMMARY

In one embodiment, the present invention provides a driving circuit for driving a light source having an adjustable color temperature. The driving circuit includes: a power converter, coupled between a power source and the light source and operable for receiving power from the power source and for providing a regulated power to the light source; and a color temperature controller, coupled to the power converter and operable for receiving a switch monitoring signal indicative of an operation of a power switch coupled between the power source and the power converter, and for adjusting the color temperature of the light source based on the switch monitoring signal.

In another embodiment, the present invention provides a color temperature controller. The color temperature controller includes: a driving unit, that is operable for receiving a current monitoring signal indicating a level of a current flowing through a light source, and for generating a driving signal to control a power converter to provide a regulated power to the light source according to the current monitoring signal; and a control unit coupled to the driving unit, the control unit operable for receiving a switch monitoring signal indicative of an operation of a power switch in a primary side circuit, and for adjusting the color temperature of the light source in a secondary side circuit based on the switch monitoring signal, wherein the power switch is coupled between a power source and the power converter.

In yet another embodiment, the present invention provides a method for driving a light source having an adjustable color temperature. The method includes: receiving power from a power source and providing regulated power from a power converter to the light source; receiving a switch monitoring signal indicative of an operation of a power switch coupled between the power source and the power converter; and adjusting the color temperature of the light source based on the switch monitoring signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
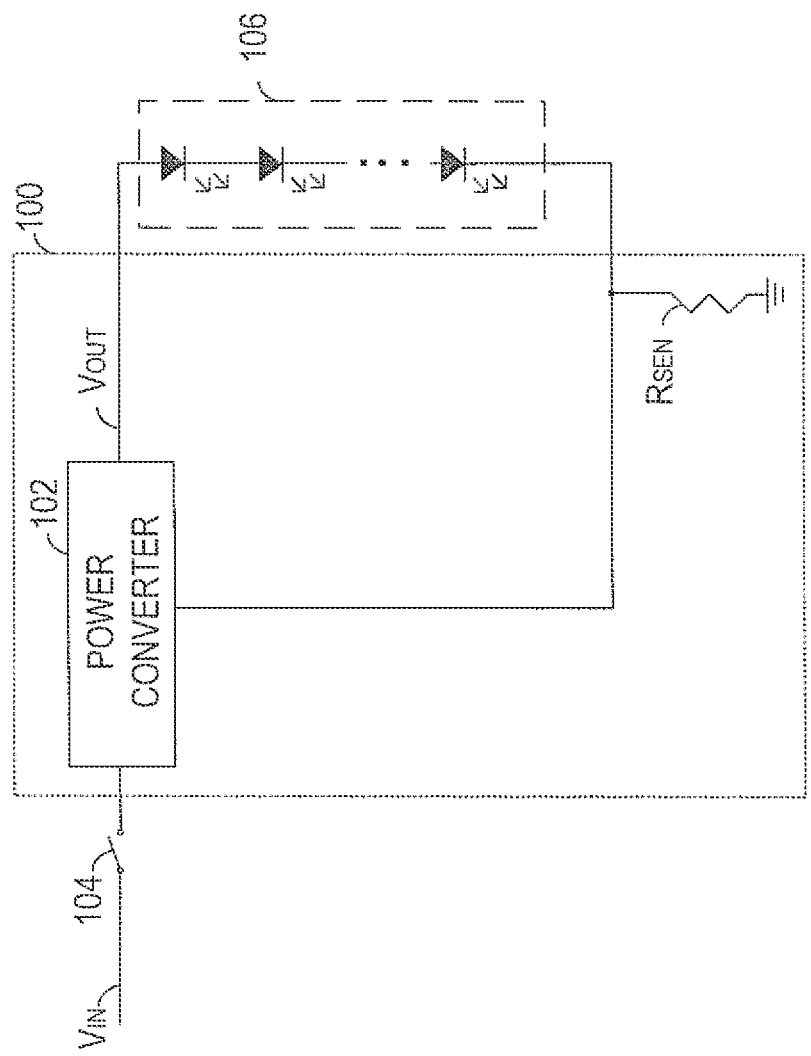
FIG. 1 shows a schematic diagram of a conventional LED driving circuit.
Figure 2:
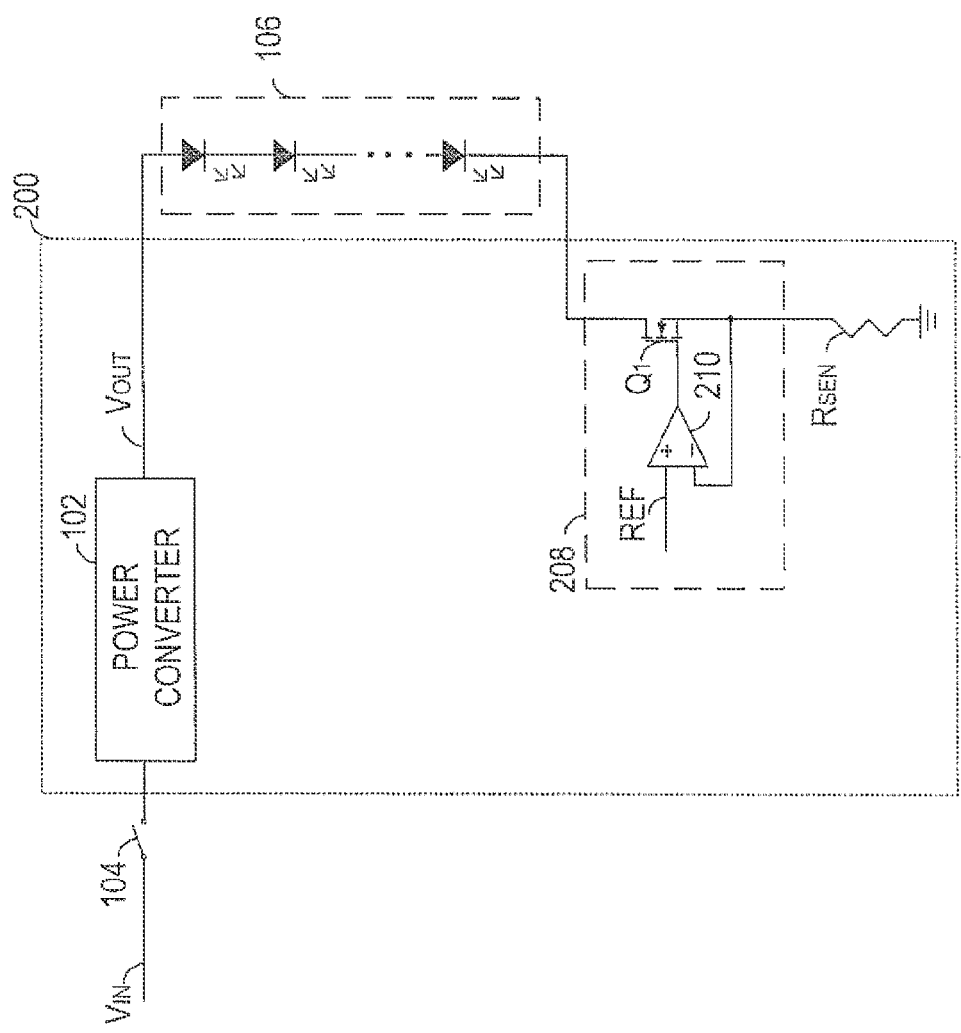
FIG. 2 shows a schematic diagram of another conventional LED driving circuit.
Figure 3:
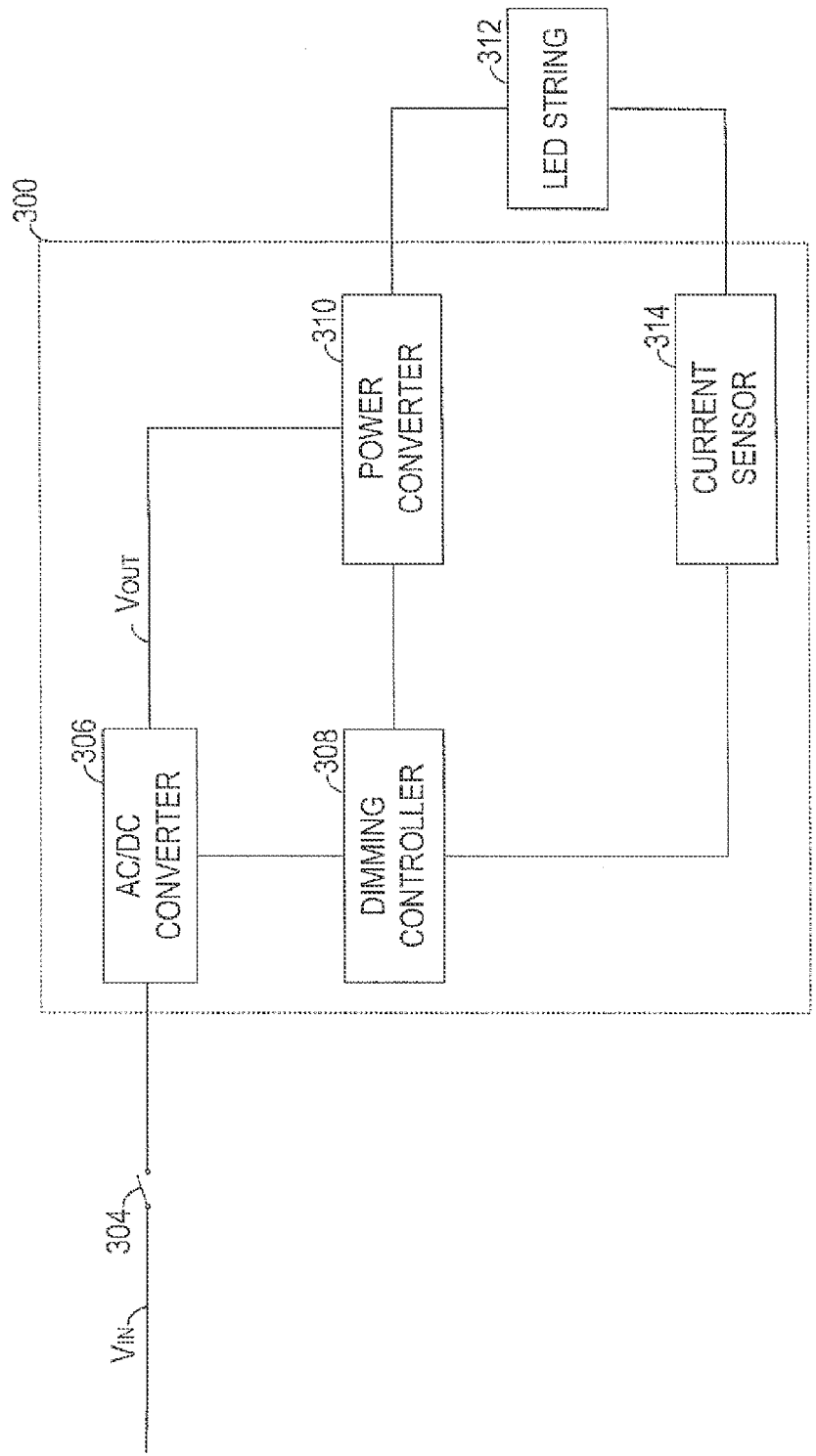
FIG. 3 shows a block diagram of a light source driving circuit, in accordance with one embodiment of the present invention.

FIG. 3 shows an example of a block diagram of a light source driving circuit 300, in accordance with one embodiment of the present invention. In one embodiment, a power switch 304 coupled between a power source Vin and the light source driving circuit 300 is operable for selectively coupling the power source to the light source driving circuit 300. The light source driving circuit 300 includes an AC/DC converter 306 for converting an AC input voltage Vin from the power source to a DC voltage Vout, a power converter 310 coupled to the AC/DC converter 306 for providing an LED string 312 with a regulated power, a dimming controller 308 coupled to the power converter 310 for receiving a switch monitoring signal indicative of an operation of the power switch 304 and for adjusting the regulated power from the power converter 310 according to the switch monitoring signal, and a current sensor 314 for sensing an LED current flowing through the LED string 312. In one embodiment, the power switch 304 can be an on/off switch mounted on the wall.

In operation, the AC/DC converter 306 converts the input AC voltage Vin to the output DC voltage Vout. The power converter 310 receives the DC voltage Vout and provides the LED string 312 with a regulated power. The current sensor 314 generates a current monitoring signal indicating a level of an LED current flowing through the LED string 312. The dimming controller 308 monitors the operation of the power switch 304, receives the current monitoring signal from the current sensor 314, and is operable for controlling the power converter 310 to adjust power of the LED string 312 in response to the operation of the power switch 304. In one embodiment, the dimming controller 308 operates in an analog dimming mode and adjusts the power of the LED string 312 by adjusting a reference signal indicating a peak value of the LED current. In another embodiment, the dimming controller 308 operates in a burst dimming mode and adjusts the power of the LED string 312 by adjusting a duty cycle of a pulse width modulation (PWM) signal. By adjusting the power of the LED string 312, the light output of the LED string 312 can be adjusted accordingly.

Figure 4:
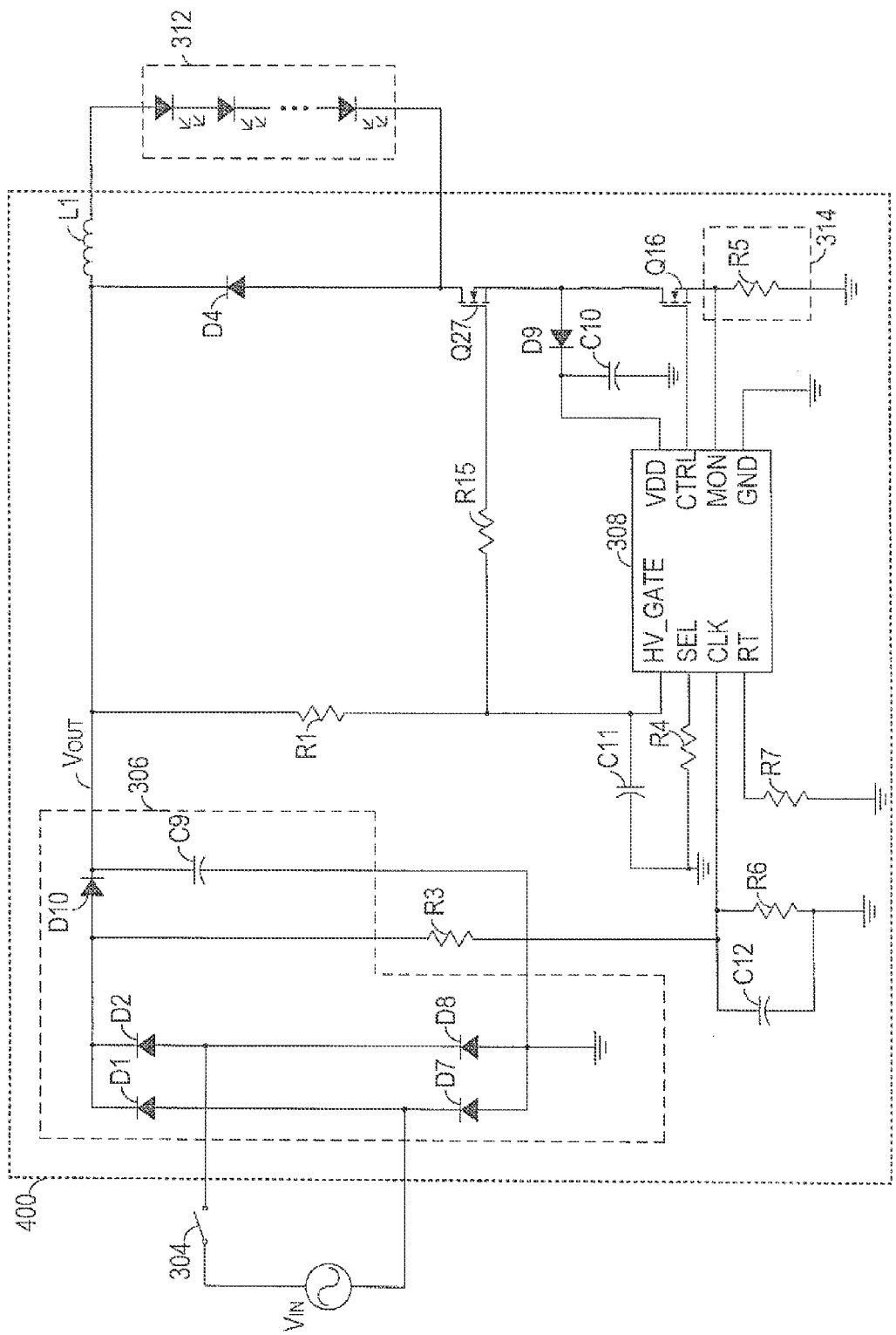
FIG. 4 shows a schematic diagram of a light source driving circuit, in accordance with one embodiment of the present invention.

FIG. 4 shows an example of a schematic diagram of a light source driving circuit 400, in accordance with one embodiment of the present invention. FIG. 4 is described in combination with FIG. 3. Elements labeled the same as in FIG. 3 have similar functions and will not be detailed described herein.

The light source driving circuit 400 includes a power converter 310 (shown in FIG. 3) coupled to a power source and coupled to an LED string 312 for receiving power from the power source and for providing a regulated power to the LED string 312. In the example of FIG. 4, the power converter 310 can be a buck converter including an inductor L1, a diode D4 and a control switch Q16. In the embodiment shown in FIG. 4, the control switch Q16 is implemented outside the dimming controller 308. In another embodiment, the control switch Q16 can be integrated in the dimming controller 308.

A dimming controller 308 is operable for receiving a switch monitoring signal indicative of an operation of a power switch, e.g., a power switch 304 coupled between the power source Vin and the light source driving circuit 400, and for adjusting the regulated power from the power converter 310 (including the inductor L1, the diode D4 and the control switch Q16) by controlling the control switch Q16 coupled in series with the LED string 312 according to the switch monitoring signal. The light source driving circuit 400 can further include an AC/DC converter 306 for converting an AC input voltage Vin to a DC output voltage Vout, and a current sensor 314 for sensing an LED current flowing through the LED string 312. In the example of FIG. 4, the AC/DC converter 306 can include a bridge rectifier including diodes D1, D2, D7 and D8. The current sensor 314 can include a current sensing resistor R5.

In one embodiment, terminals of the dimming controller 308 can include HV_GATE, SEL, CLK, RT, VDD, CTRL, MON and GND. The terminal HV_GATE is coupled to a switch Q27 through a resistor R15 for controlling a conductance status, e.g., ON/OFF status, of the switch Q27 coupled to the LED string 312. A capacitor C11 is coupled between the terminal HV_GATE and ground for regulating a gate voltage of the switch Q27.

A user can select a dimming mode, e.g., an analog dimming mode or a burst dimming mode, by coupling the terminal SEL to ground through a resistor R4 (as shown in FIG. 4), or coupling the terminal SEL to ground directly.

The terminal CLK is coupled to the AC/DC converter 306 through a resistor R3, and is coupled to ground through a resistor R6. The terminal CLK can receive a switch monitoring signal indicating an operation of the power switch 304. In one embodiment, the switch monitoring signal can be generated at a common node between the resistor R3 and the resistor R6. A capacitor C12 is coupled to the resistor R6 in parallel for filtering undesired noises. The terminal RT is coupled to ground through a resistor R7 for determining a frequency of a pulse signal generated by the dimming controller 308.

The terminal VDD is coupled to the switch Q27 through a diode D9 for supplying power to the dimming controller 308. In one embodiment, an energy storage unit, e.g., a capacitor C10, coupled between the terminal VDD and ground can power the dimming controller 308 when the power switch 304 is turned off. In an alternate embodiment, the energy storage unit can be integrated in the dimming controller 308. The terminal GND is coupled to ground.

The terminal CTRL is coupled to the control switch Q16. The control switch Q16 is coupled in series with the LED string 312 and the switch Q27, and is coupled to ground through the current sensing resistor R5. The dimming controller 308 is operable for adjusting the regulated power from the power converter 310 by controlling a conductance status, e.g., ON and OFF status, of the control switch Q16 using a control signal via the terminal CTRL. The terminal MON is coupled to the current sensing resistor R5 for receiving a current monitoring signal indicating an LED current flowing through the LED string 312. When the switch Q27 is turned on, the dimming controller 308 can adjust the LED current flowing through the LED string 312 to ground by controlling the control switch Q16.

In operation, when the power switch 304 is turned on, the AC/DC converter 306 converts an input AC voltage Vin to a DC voltage Vout. A predetermined voltage at the terminal HV_GATE is supplied to the switch Q27 through the resistor R15 so that the switch Q27 is turned on.

If the dimming controller 308 turns on the control switch Q16, the DC voltage Vout powers the LED string 312 and charges the inductor L1. An LED current flows through the inductor L1, the LED string 312, the switch Q27, the control switch Q16, the current sensing resistor R5 to ground. If the dimming controller 308 turns off the control switch Q16, an LED current flows through the inductor L1, the LED string 312 and the diode D4. The inductor L1 is discharged to power the LED string 312. As such, the dimming controller 308 can adjust the regulated power from the power converter 310 by controlling the control switch Q16.

When the power switch 304 is turned off, the capacitor C10 is discharged to power the dimming controller 308. A voltage across the resistor R6 drops to zero, therefore a switch monitoring signal indicating a turn-off operation of the power switch 304 can be detected by the dimming controller 308 through the terminal CLK. Similarly, when the power switch 304 is turned on, the voltage across the resistor R6 rises to a predetermined voltage, therefore a switch monitoring signal indicating a turn-on operation of the power switch 304 can be detected by the dimming controller 308 through the terminal CLK. If a turn-off operation is detected, the dimming controller 308 can turn off the switch Q27 by pulling the voltage at the terminal HV_GATE to zero such that the LED string 312 can be turned off after the inductor L1 completes discharging. In response to the turn-off operation, the dimming controller 308 can adjust a reference signal indicating a target light output of the LED string 312. Therefore, when the power switch 304 is turned on next time, the LED string 312 can generate a light output according to the adjusted target light output. In other words, the light output of the LED string 312 can be adjusted by the dimming controller 308 in response to the turn-off operation of the power switch 304.

Figure 5:
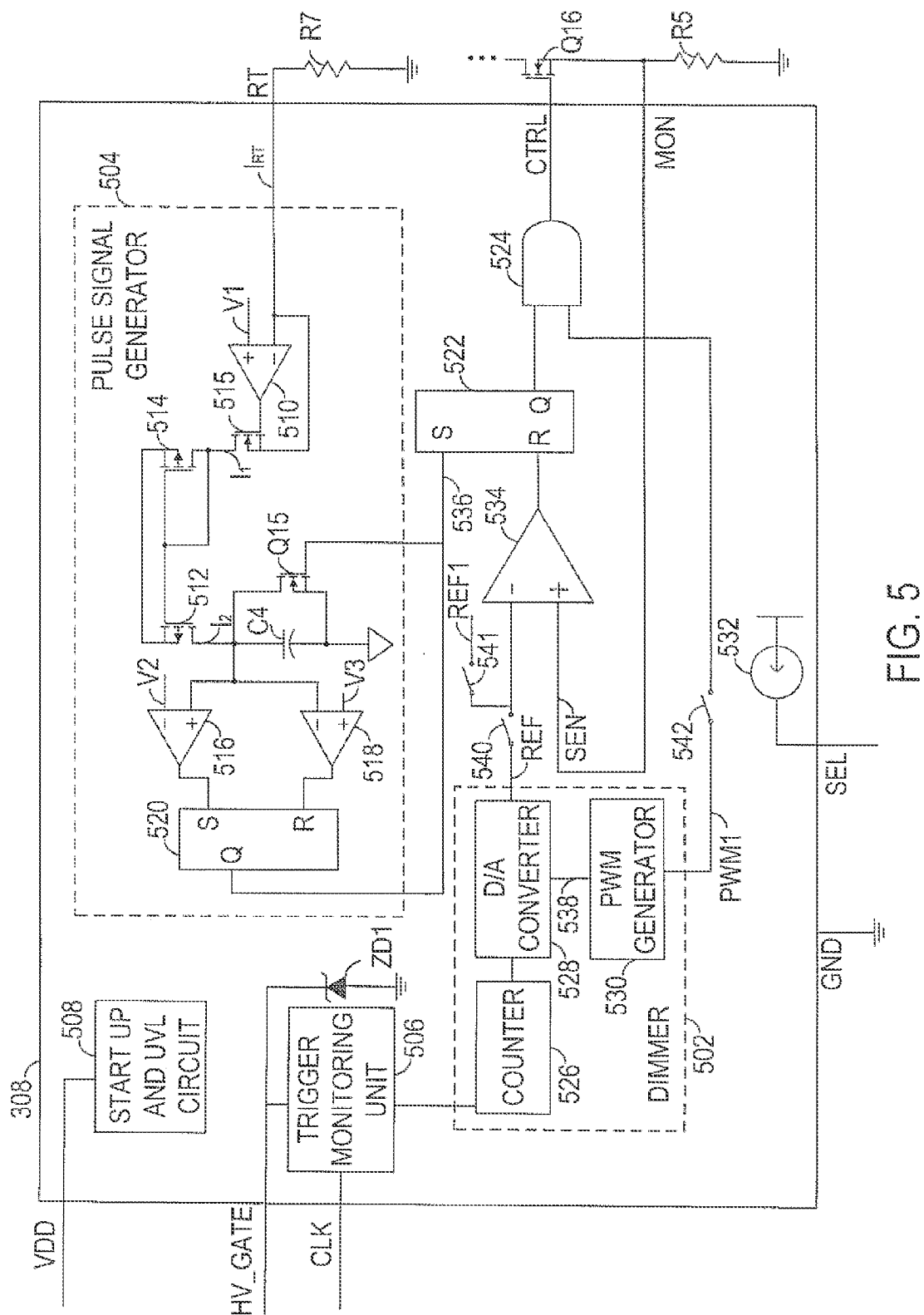
FIG. 5 shows a structure of a dimming controller in FIG. 4, in accordance with one embodiment of the present invention.

FIG. 5 shows an example of a structure of the dimming controller 308 in FIG. 4, in accordance with one embodiment of the present invention. FIG. 5 is described in combination with FIG. 4. Elements labeled the same as in FIG. 4 have similar functions and will not be detailed described herein.

The dimming controller 308 includes a trigger monitoring unit 506, a dimmer 502 and a pulse signal generator 504. The trigger monitoring unit 506 is coupled to ground through a Zener diode ZD1. The trigger monitoring unit 506 can receive a switch monitoring signal indicating an operation of the external power switch 304 through the terminal CLK and can generate a driving signal for driving a counter 526 when an operation of the external power switch 304 is detected at the terminal CLK. The trigger monitoring unit 506 is further operable for controlling a conductance status of the switch Q27. The dimmer 502 is operable for generating a reference signal REF to adjust power of the LED string 312 in an analog dimming mode, or generating a control signal 538 for adjusting a duty cycle of a PWM signal PWM1 to adjust the power of the LED string 312. The pulse signal generator 504 is operable for generating a pulse signal which can turn on a control switch Q16. The dimming controller 308 can further include a start up and under voltage lockout (UVL) circuit 508 coupled to the terminal VDD for selectively turning on one or more components of the dimming controller 308 according to different power condition.

In one embodiment, the start up and under voltage lockout circuit 508 is operable for turning on all the components of the dimming controller 308 when the voltage at the terminal VDD is greater than a first predetermined voltage. When the power switch 304 is turned off, the start up and under voltage lockout circuit 508 is operable for turning off other components of the dimming controller 308 except the trigger monitoring unit 506 and the dimmer 502 when the voltage at the terminal VDD is less than a second predetermined voltage, in order to save energy. The start up and under voltage lockout circuit 508 is further operable for turning off the trigger monitoring unit 506 and the dimmer 502 when the voltage at the terminal VDD is less than a third predetermined voltage. In one embodiment, the first predetermined voltage is greater than the second predetermined voltage and the second predetermined voltage is greater than the third predetermined voltage. Because the dimming controller 308 can be powered by the capacitor C10 through the terminal VDD, the trigger monitoring unit 506 and the dimmer 502 can still operate for a time period after the power switch 304 is turned off.

In the dimming controller 308, the terminal SEL is coupled to a current source 532. Users can choose a dimming mode by configuring the terminal SEL, e.g., by coupling the terminal SEL directly to ground or coupling the terminal SEL to ground via a resistor. In one embodiment, the dimming mode can be determined by measuring a voltage at the terminal SEL. If the terminal SEL is directly coupled to ground, the voltage at the terminal SEL is approximately equal to zero. A control circuit can in turn switch on a switch 540, switch off a switch 541 and switch off a switch 542. Therefore, the dimming controller 308 can work in an analog dimming mode and can adjust the power of the LED string 312 (shown in FIG. 4) by adjusting a reference signal REF. In one embodiment, if the terminal SEL is coupled to ground via a resistor R4 having a predetermined resistance (as shown in FIG. 4), the voltage at the terminal SEL can be greater than zero. The control circuit can in turn switch off the switch 540, switch on the switch 541 and switch on the switch 542. Therefore, the dimming controller 308 can work in a burst dimming mode and can adjust the power of the LED string 312 (shown in FIG. 4) by adjusting a duty cycle of a PWM signal PWM1. In other words, different dimming modes can be selected by controlling the ON/OFF status of the switch 540, switch 541 and switch 542. The ON/OFF status of the switch 540, switch 541 and switch 542 can be determined by the voltage at the terminal SEL.

The pulse signal generator 504 is coupled to ground through the terminal RT and the resistor R7 for generating a pulse signal 536 which can turn on the control switch Q16. The pulse signal generator 504 can have different configurations and is not limited to the configuration as shown in the example of FIG. 5.

In the pulse signal generator 504, the non-inverting input of an operational amplifier 510 receives a predetermined voltage V1. Thus, the voltage of the inverting input of the operational amplifier 510 can be forced to V1. A current IRT flows through the terminal RT and the resistor R7 to ground. A current I1 flowing through a MOSFET 514 and a MOSFET 515 is equal to IRT. Because the MOSFET 514 and a MOSFET 512 constitute a current mirror, a current I2 flowing through the MOSFET 512 is also substantially equal to IRT. The output of a comparator 516 and the output of a comparator 518 are respectively coupled to the S input and the R input of an SR flip-flop 520. The inverting input of the comparator 516 receives a predetermined voltage V2. The non-inverting input of the comparator 518 receives a predetermined voltage V3. V2 is greater than V3, and V3 is greater than zero, in one embodiment. A capacitor C4 is coupled between the MOSFET 512 and ground, and has one end coupled to a common node between the non-inverting input of the comparator 516 and the inverting input of the comparator 518. The Q output of the SR flip-flop 520 is coupled to the switch Q15 and the S input of an SR flip-flop 522. The switch Q15 is coupled in parallel with the capacitor C4. A conductance status, e.g., ON/OFF status, of the switch Q15 can be determined by the Q output of the SR flip-flop 520.

Initially, the voltage across the capacitor C4 is approximately equal to zero which is less than V3. Therefore, the R input of the SR flip-flop 520 receives a digital 1 from the output of the comparator 518. The Q output of the SR flip-flop 520 is set to digital 0, which turns off the switch Q15. When the switch Q15 is turned off, the voltage across the capacitor C4 increases as the capacitor C4 is charged by I2. When the voltage across C4 is greater than V2, the S input of the SR flip-flop 520 receives a digital 1 from the output of the comparator 516. The Q output of the SR flip-flop 520 is set to digital 1, which turns on the switch Q15. When the switch Q15 is turned on, the voltage across the capacitor C4 decreases as the capacitor C4 discharges through the switch Q15. When the voltage across the capacitor C4 drops below V3, the comparator 518 outputs a digital 1, and the Q output of the SR flip-flop 520 is set to digital 0, which turns off the switch Q15. Then the capacitor C4 is charged by I2 again. As such, through the process described above, the pulse signal generator 504 can generate a pulse signal 536 which includes a series of pulses at the Q output of the SR flip-flop 520. The pulse signal 536 is sent to the S input of the SR flip-flop 522.

The trigger monitoring unit 506 is operable for monitoring an operation of the power switch 304 through the terminal CLK, and is operable for generating a driving signal for driving the counter 526 when an operation of the power switch 304 is detected at the terminal CLK. In one embodiment, when the power switch 304 is turned on, the voltage at the terminal CLK rises to a level that is equal to a voltage across the resistor R6 (shown in FIG. 4). When the power switch 304 is turned off, the voltage at the terminal CLK drops to zero. Therefore, a switch monitoring signal indicating the operation of the power switch 304 can be detected at the terminal CLK. In one embodiment, the trigger monitoring unit 506 generates a driving signal when a turn-off operation is detected at the terminal CLK.

The trigger monitoring unit 506 is further operable for controlling a conductance status of the switch Q27 through the terminal HV_GATE. When the power switch 304 is turned on, a breakdown voltage across the Zener diode ZD1 is applied to the switch Q27 through the resistor R3. Therefore, the switch Q27 can be turned on. The trigger monitoring unit 506 can turn off the switch Q27 by pulling the voltage at the terminal HV_GATE to zero. In one embodiment, the trigger monitoring unit 506 turns off the switch Q27 when a turn-off operation of the power switch 304 is detected at the terminal CLK and turns on the switch Q27 when a turn-on operation of the power switch 304 is detected at the terminal CLK.

In one embodiment, the dimmer 502 includes a counter 526 coupled to the trigger monitoring unit 506 for counting operations of the power switch 304, a digital-to-analog converter (D/A converter) 528 coupled to the counter 526. The dimmer 502 can further include a PWM generator 530 coupled to the D/A converter 528. The counter 526 can be driven by the driving signal generated by the trigger monitoring unit 506. More specifically, when the power switch 304 is turned off, the trigger monitoring unit 506 detects a negative edge of the voltage at the terminal CLK and generates a driving signal, in one embodiment. The counter value of the counter 526 can be increased, e.g., by 1, in response to the driving signal. The D/A converter 528 reads the counter value from the counter 526 and generates a dimming signal (e.g., control signal 538 or reference signal REF) based on the counter value. The dimming signal can be used to adjust a target power level of the power converter 310, which can in turn adjust the light output of the LED string 312.

In the burst dimming mode, the switch 540 is off, the switch 541 and the switch 542 are on. The inverting input of the comparator 534 receives a reference signal REF1 which can be a DC signal having a predetermined substantially constant voltage. The voltage of REF1 can determine a peak value of the LED current, which can in turn determine the maximum light output of the LED string 312. The dimming signal can be a control signal 538 which is applied to the PWM generator 530 for adjusting a duty cycle of the PWM signal PWM1. By adjusting the duty cycle of PWM1, the light output of the LED string 312 can be adjusted no greater than the maximum light output determined by REF1. For example, if PWM1 has a duty cycle of 100%, the LED string 312 can have the maximum light output. If the duty cycle of PWM1 is less than 100%, the LED string 312 can have a light output that is lower than the maximum light output.

In the analog dimming mode, the switch 540 is on, the switch 541 and the switch 542 are off, and the dimming signal can be an analog reference signal REF having an adjustable voltage. The D/A converter 528 can adjust the voltage of the reference signal REF according to the counter value of the counter 526. The voltage of REF can determine a peak value of the LED current, which can in turn determine an average value of the LED current. As such, the light output of the LED string 312 can be adjusted by adjusting the reference signal REF.

In one embodiment, the D/A converter 528 can decrease the voltage of REF in response to an increase of the counter value. For example, if the counter value is 0, the D/A converter 528 adjusts the reference signal REF to have a voltage V4. If the counter value is increased to 1 when a turn-off operation of the power switch 304 is detected at the terminal CLK by the trigger monitoring unit 506, the D/A converter 528 adjusts the reference signal REF to have a voltage V5 that is less than V4. Yet in another embodiment, the D/A converter 528 can increase the voltage of REF in response to an increase of the counter value.

In one embodiment, the counter value will be reset to zero after the counter 526 reaches its maximum counter value. For example, if the counter 526 is a 2-bit counter, the counter value will increase from 0 to 1, 2, 3 and then return to zero after four turn-off operations have been detected. Accordingly, the light output of the LED string 312 can be adjusted from a first level to a second level, then to a third level, then to a fourth level, and then back to the first level.

The inverting input of a comparator 534 can selectively receive the reference signal REF and the reference signal REF1. For example, the inverting input of the comparator 534 receives the reference signal REF through the switch 540 in the analog dimming mode, and receives the reference signal REF1 through the switch 541 in the burst dimming mode. The non-inverting input of the comparator 534 is coupled to the resistor R5 through the terminal MON for receiving a current monitoring signal SEN from the current sensing resistor R5. The voltage of the current monitoring signal SEN can indicate an LED current flowing through the LED string 312 when the switch Q27 and the control switch Q16 are turned on.

The output of the comparator 534 is coupled to the R input of the SR flip-flop 522. The Q output of the SR flip-flop 522 is coupled to an AND gate 524. The PWM signal PWM1 generated by the PWM generator 530 is applied to the AND gate 524. The AND gate 524 outputs a control signal to control the control switch Q16 through the terminal CTRL.

If the analog dimming mode is selected, the switch 540 is turned on and the switches 541 and 542 are turned off. The control switch Q16 is controlled by the SR flip-flop 522. In operation, when the power switch 304 is turned on, the breakdown voltage across the Zener diode ZD1 turns on the switch Q27. The SR flip-flop 522 generates a digital 1 at the Q output to turn on the control switch Q16 in response to the pulse signal 536 generated by the pulse generator 504. An LED current flowing through the inductor L1, the LED string 312, the switch Q27, the control switch Q16, the current sensing resistor R5 to ground. The LED current gradually increases because the inductor resists a sudden change of the LED current. As a result, the voltage across the current sensing resistor R5, that is, the voltage of the current monitoring signal SEN can be increased. When the voltage of SEN is greater than that of the reference signal REF, the comparator 534 generates a digital 1 at the R input of the SR flip-flop 522 so that the SR flip-flop 522 generates a digital 0 to turn off the control switch Q16. After the control switch Q16 is turned off, the inductor L1 is discharged to power the LED string 312. An LED current which flows through the inductor L1, the LED string 312 and the diode D4 gradually decreases. The control switch Q16 is turned on when the SR flip-flop 522 receives a pulse at the S input again, and then the LED current flows through the current sensing resistor R5 to ground again. When the voltage of the current monitoring signal SEN is greater than that of the reference signal REF, the control switch Q16 is turned off by the SR flip-flop 522. As described above, the reference signal REF determines a peak value of the LED current, which can in turn determine the light output of the LED string 312. By adjusting the reference signal REF, the light output of the LED string 312 can be adjusted.

In the analog dimming mode, when the power switch 304 is turned off, the capacitor C10 (shown in FIG. 4) is discharged to power the dimming controller 308. The counter value of the counter 526 can be increased by 1 when the trigger monitoring unit 506 detects a turn-off operation of the power switch 304 at the terminal CLK. The trigger monitoring unit 506 can turn off the switch Q27 in response to the turn-off operation of the power switch 304. The D/A converter 528 can adjust the voltage of the reference signal REF from a first level to a second level in response to the change of the counter value. Therefore, the light output of the LED string 312 can be adjusted in accordance with the adjusted reference signal REF when the power switch 304 is turned on.

If the burst dimming mode is selected, the switch 540 is turned off and the switches 541 and 542 are turned on. The inverting input of the comparator 534 receives a reference signal REF1 having a predetermined voltage. The control switch Q16 is controlled by both of the SR flip-flop 522 and the PWM signal PWM1 through the AND gate 524. The reference signal REF1 can determine a peak value of the LED current, which can in turn determine a maximum light output of the LED string 312. The duty cycle of the PWM signal PWM1 can determine the on/off time of the control switch Q16. When the PWM signal PWM1 is logic 1, the conductance status of the control switch Q16 is determined by the Q output of the SR flip-flop 522. When the PWM signal PWM1 is logic 0, the control switch Q16 is turned off. By adjusting the duty cycle of the PWM signal PWM1, the power of the LED string 312 can be adjusted accordingly. As such, the combination of the reference signal REF1 and the PWM signal PWM1 can determine the light output of the LED string 312.

In the burst dimming mode, when the power switch 304 is turned off, a turn-off operation of the power switch 304 can be detected by the trigger monitoring unit 506 at the terminal CLK. The trigger monitoring unit 506 turns off the switch Q27 and generates a driving signal. The counter value of the counter 526 can be increased, e.g., by 1, in response of the driving signal. The D/A converter 528 can generate the control signal 538 to adjust the duty cycle of the PWM signal PWM1 from a first level to a second level. Therefore, when the power switch 304 is turned on next time, the light output of the LED string 312 can be adjusted to follow a target light output which is determined by the reference signal REF1 and the PWM signal PWM1.

Figure 6:
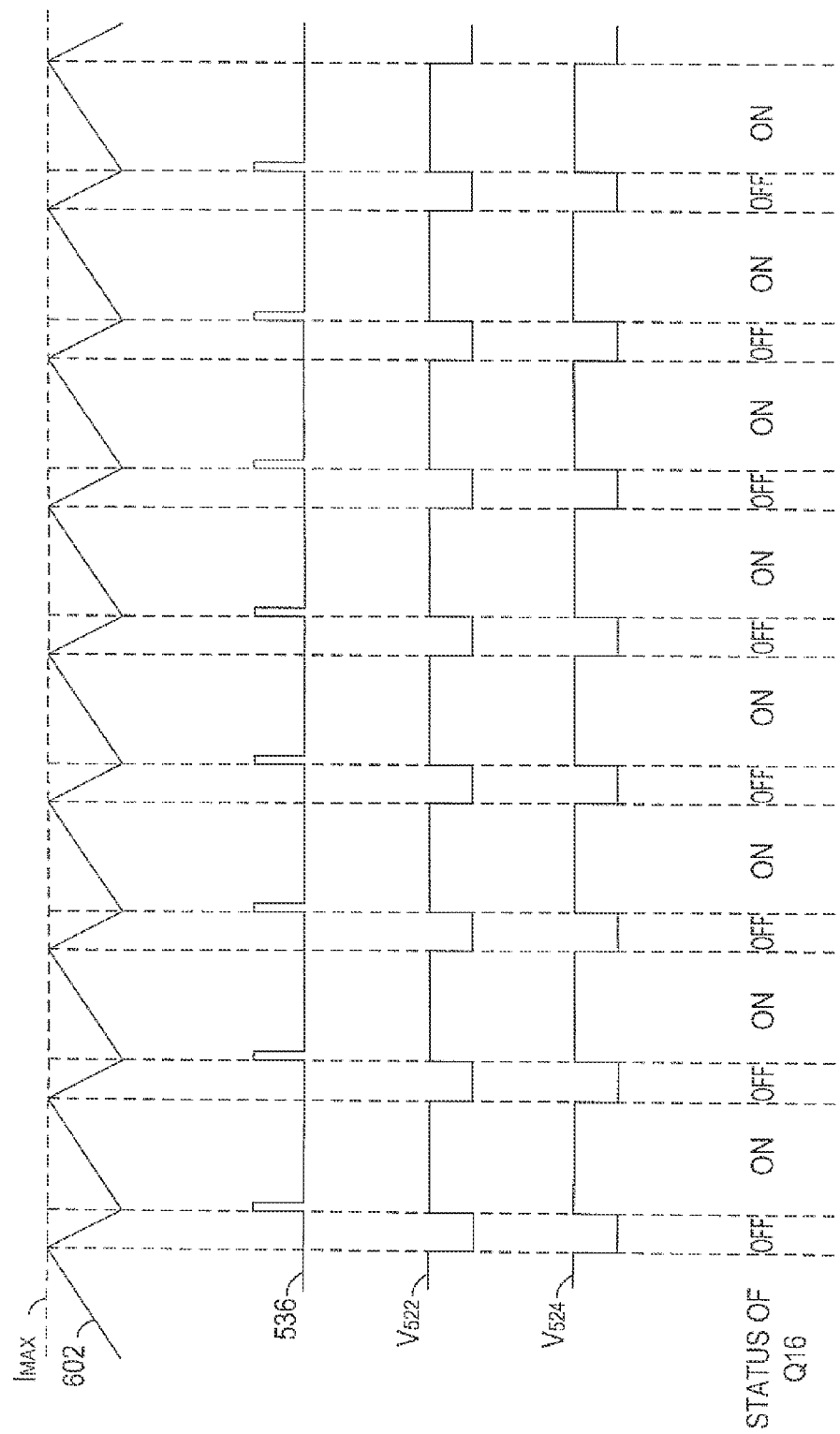
FIG. 6 illustrates signal waveforms in the analog dimming mode, in accordance with one embodiment of the present invention.

FIG. 6 illustrates examples of signal waveforms of an LED current 602 flowing through the LED string 312, the pulse signal 536, V522 which indicates the output of the SR flip-flop 522, V524 which indicates the output of the AND gate 524, and the ON/OFF status of the control switch Q16 in the analog dimming mode. FIG. 6 is described in combination with FIG. 4 and FIG. 5.

In operation, the pulse signal generator 504 generates pulse signal 536. The SR flip-flop 522 generates a digital 1l at the Q output in response to each pulse of the pulse signal 536. The control switch Q16 is turned on when the Q output of the SR flip-flop 522 is digital 1. When the control switch Q16 is turned on, the inductor L1 ramps up and the LED current 602 increases. When the LED current 602 reaches the peak value Imax, which means the voltage of the current monitoring signal SEN is substantially equal to the voltage of the reference signal REF, the comparator 534 generates a digital 1l at the R input of the SR flip-flop 522 so that the SR flip-flop 522 generates a digital 0 at the Q output. The control switch Q16 is turned off when the Q output of the SR flip-flop 522 is digital 0. When the control switch Q16 is turned off, the inductor L1 is discharged to power the LED string 312 and the LED current 602 decreases. In this analog dimming mode, by adjusting the reference signal REF, the average LED current can be adjusted accordingly and therefore the light output of the LED string 312 can be adjusted.

Figure 7:
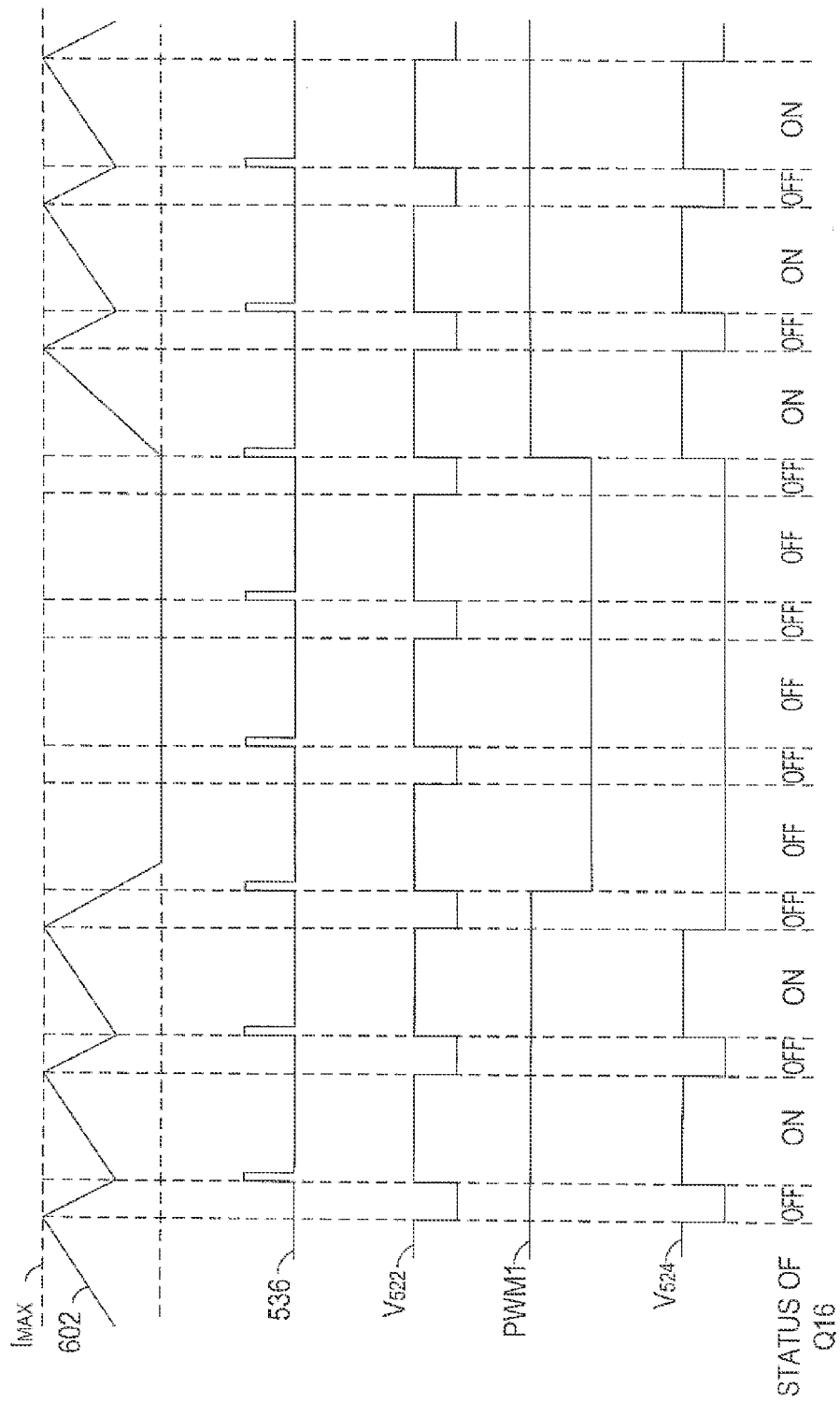
FIG. 7 illustrates signal waveforms in the burst dimming mode, in accordance with one embodiment of the present invention.

FIG. 7 illustrates examples of signal waveforms of the LED current 602 flowing through the LED string 312, the pulse signal 536, V522 which indicates the output of the SR flip-flop 522, V524 which indicates the output of the AND gate 524, and the ON/OFF status of the control switch Q16, and the PMW signal PWM1 in the burst dimming mode. FIG. 7 is described in combination with FIG. 4 and FIG. 5.

When PWM1 is digital 1, the relationship among the LED current 602, the pulse signal 536, V522, V524, and the ON/OFF status of the switch Q1 is similar to that is illustrated in FIG. 6. When PWM1 is digital 0, the output of the AND gate 524 turns to digital 0. Therefore, the control switch Q16 is turned off and the LED current 602 decreases. If the PWM1 holds digital 0 long enough, the LED current 602 can falls to zero. In this burst dimming mode, by adjusting the duty cycle of PWM1, the average LED current can be adjusted accordingly and therefore the light output of the LED string 312 can be adjusted.

Figure 8:
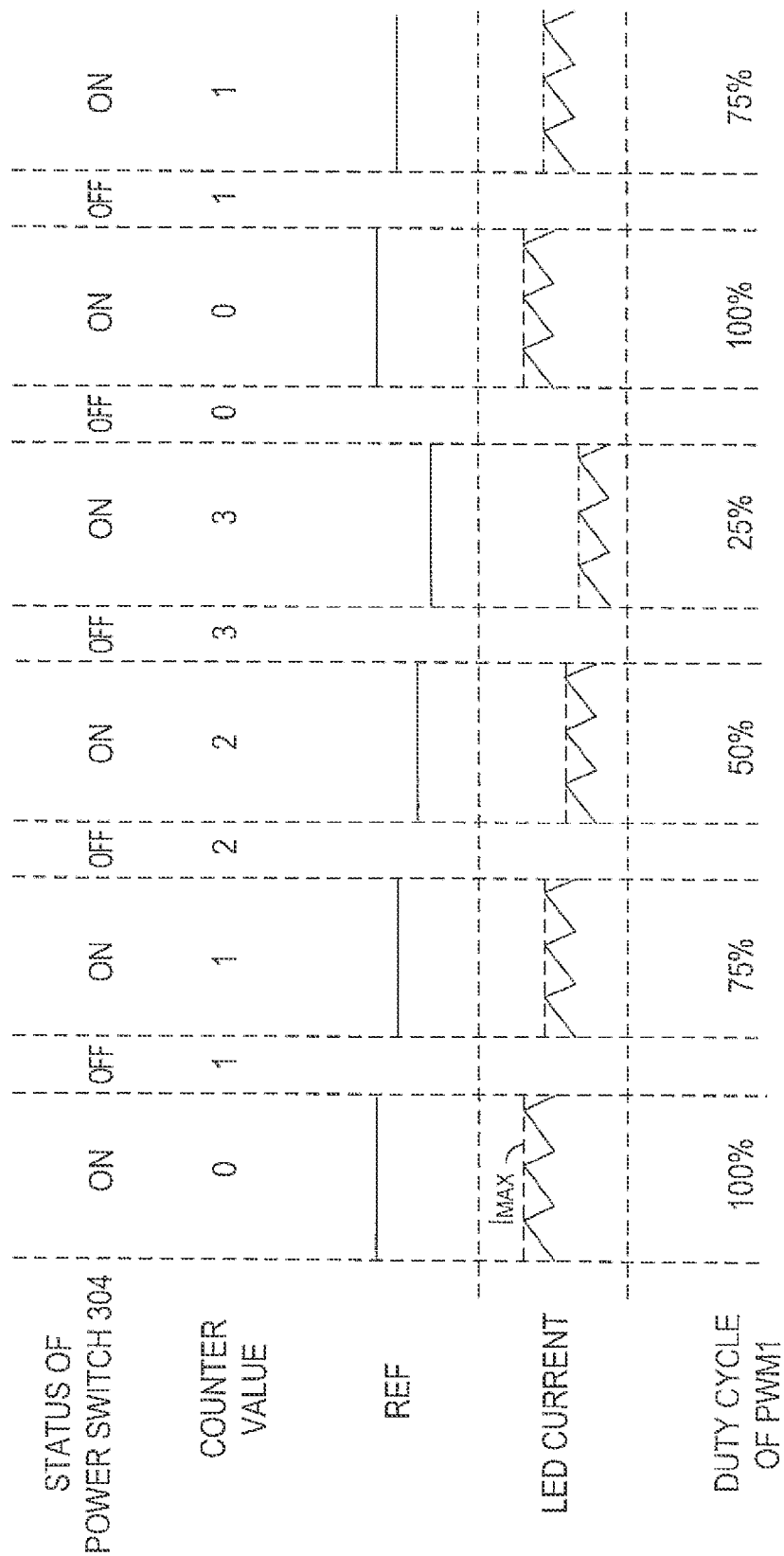
FIG. 8 illustrates a diagram illustrating an operation of a light source driving circuit which includes the dimming controller in FIG. 5, in accordance with one embodiment of the present invention.

FIG. 8 shows an example of a diagram illustrating an operation of a light source driving circuit which includes the dimming controller in FIG. 5, in accordance with one embodiment of the present invention. FIG. 8 is described in combination with FIG. 5.

In the example shown in FIG. 8, each time when a turn-off operation of the power switch 304 is detected by the trigger monitoring unit 506, the counter value of the counter 526 is increases by 1. The counter 526 can be a 2-bit counter which has a maximum counter value of 3.

In the analog dimming mode, the D/A converter 528 reads the counter value from the counter 526 and decreases the voltage of the reference signal REF in response to an increase of the counter value. The voltage of REF can determine a peak value Imax of the LED current, which can in turn determine an average value of the LED current. In the burst dimming mode, the D/A converter 528 reads the counter value from the counter 526 and decreases the duty cycle of the PWM signal PWM1 (e.g., decreases 25% each time) in response to an increase of the counter value. The counter 526 is reset after it reaches its maximum counter value (e.g., 3).

Figure 9:
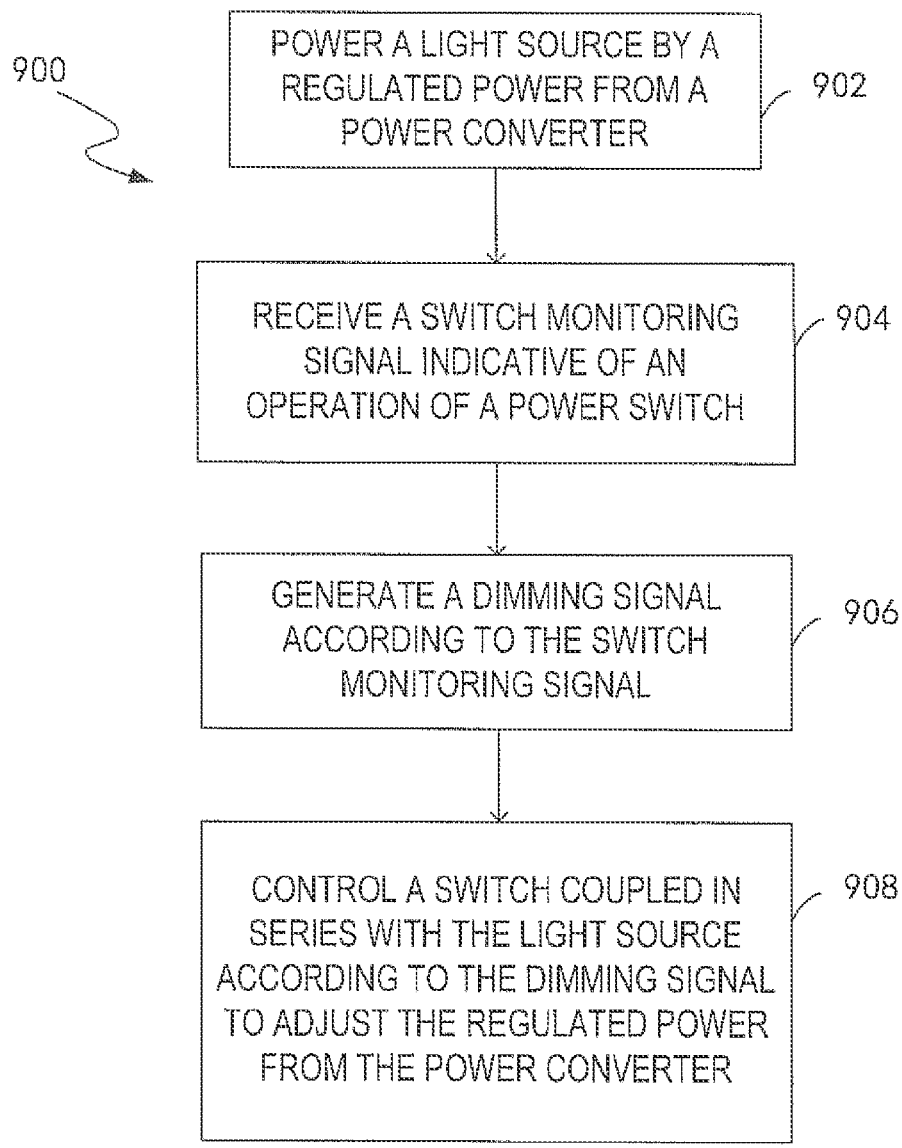
FIG. 9 shows a flowchart of a method for adjusting power of a light source, in accordance with one embodiment of the present invention.

FIG. 9 shows a flowchart 900 of a method for adjusting power of a light source, in accordance with one embodiment of the present invention. FIG. 9 is described in combination with FIG. 4 and FIG. 5.

In block 902, a light source, e.g., the LED string 312, is powered by a regulated power from a power converter, e.g., the power converter 310. In block 904, a switch monitoring signal can be received, e.g., by the dimming controller 308. The switch monitoring signal can indicate an operation of a power switch, e.g., the power switch 304 coupled between a power source and the power converter. In block 906, a dimming signal is generated according to the switch monitoring signal. In block 908, a switch coupled in series with the light source, e.g., the control switch Q16, is controlled according to the dimming signal so as to adjust the regulated power from the power converter. In one embodiment, in an analog dimming mode, the regulated power from the power converter can be adjusted by comparing the dimming signal with a feedback current monitoring signal which indicates a light source current of the light source. In another embodiment, in a burst dimming mode, the regulated power from the power converter can be adjusted by controlling a duty cycle of a PWM signal by the dimming signal.

Accordingly, embodiments in accordance with the present invention provide a light source driving circuit that can adjust power of a light source according to a switch monitoring signal indicative of an operation of a power switch, e.g., an on/off switch mounted on the wall. The power of the light source, which is provided by a power converter, can be adjusted by a dimming controller by controlling a switch coupled in series with the light source. Advantageously, as described above, users can adjust the light output of the light source through an operation (e.g., a turn-off operation) of a common on/off power switch. Therefore, extra apparatus for dimming, such as an external dimmer or a specially designed switch with adjusting buttons, can be avoided and the cost can be reduced.

Figure 10:
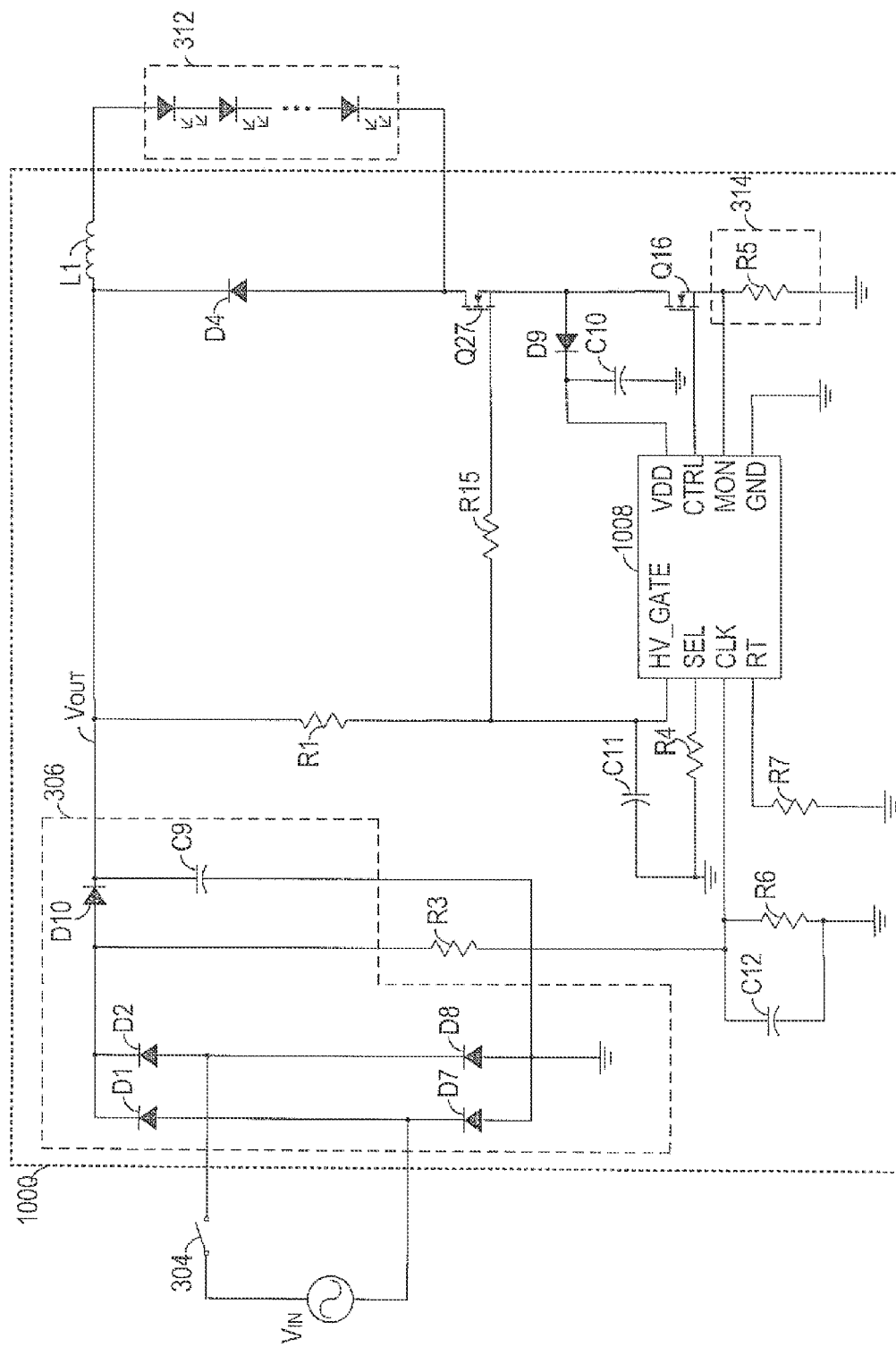
FIG. 10 shows a schematic diagram of a light source driving circuit, in accordance with one embodiment of the present invention.

FIG. 10 shows an example of a schematic diagram of a light source driving circuit 1000, in accordance with one embodiment of the present invention. FIG. 10 is described in combination with FIG. 3. Elements labeled the same as in FIG. 3 and FIG. 4 have similar functions.

The light source driving circuit 1000 includes a power converter 310 coupled to a power source and an LED string 312 for receiving power from the power source and for providing a regulated power to the LED string 312. A dimming controller 1008 is operable for monitoring a power switch 304 coupled between the power source and the light source driving circuit 1000 by monitoring the voltage at a terminal CLK. The dimming controller 1008 is operable for receiving a dimming request signal indicative of a first set of operations of the power switch 304 and for receiving a dimming termination signal indicative of a second set of operations of the power switch 304. The dimming controller 1008 can receive the dimming request signal and the dimming termination signal via the terminal CLK. The dimming controller 1008 is further operable for continuously adjusting the regulated power from the power converter 310 if the dimming request signal is received, and for stopping adjusting the regulated power from the power converter 310 if the dimming termination signal is received. In other words, the dimming controller 1008 can continuously adjust the power from the power converter 310 upon detection of the first set of operations of the power switch 304 until the second set of operations of the power switch 304 are detected. In one embodiment, the dimming controller 1008 can adjust the regulated power from the power converter 310 by controlling a control switch Q16 coupled in series with the LED string 312.

Figure 11:
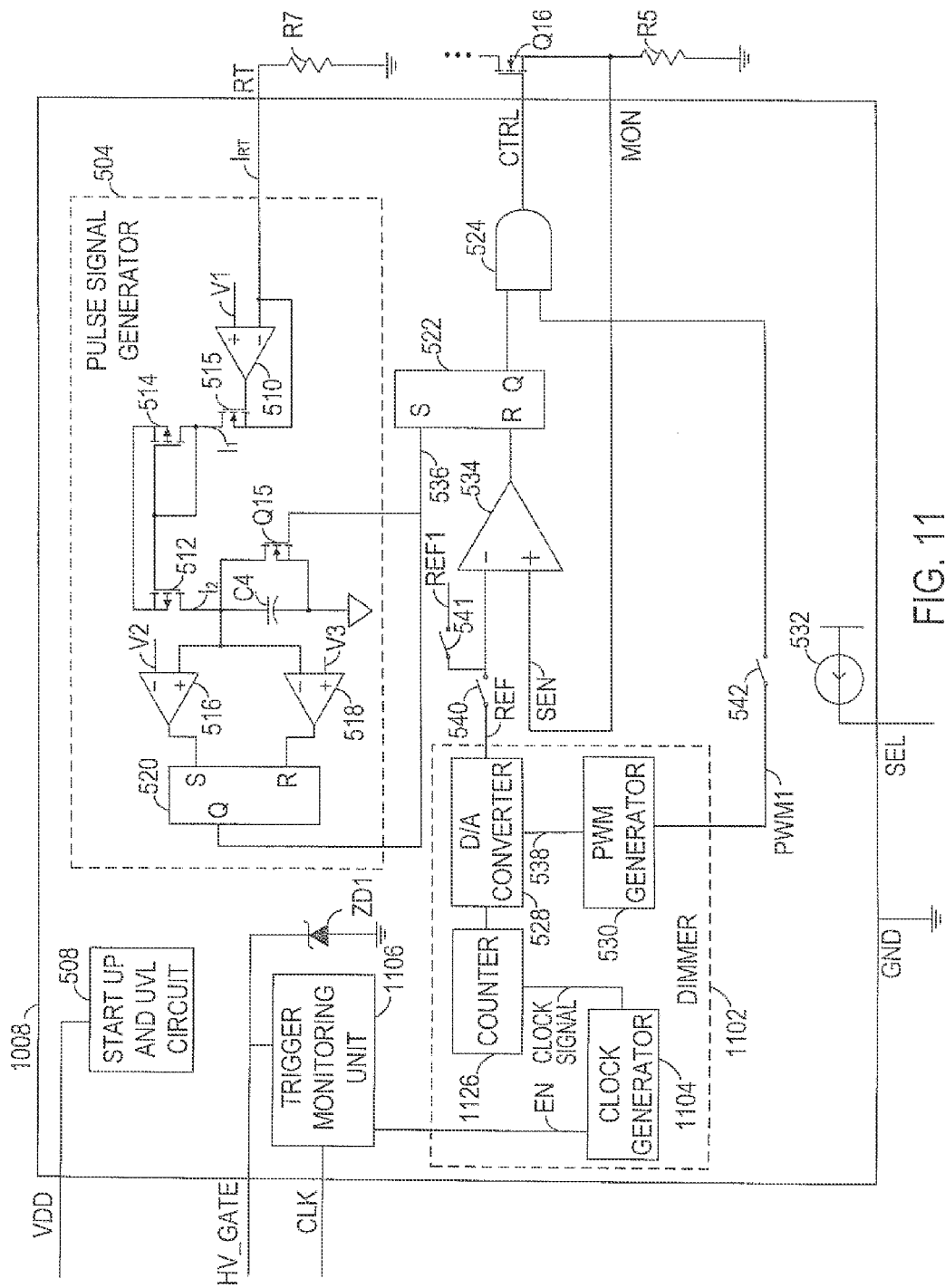
FIG. 11 shows a structure of a dimming controller in FIG. 10, in accordance with one embodiment of the present invention.

FIG. 11 shows an example of a structure of the dimming controller 1008 in FIG. 10, in accordance with one embodiment of the present invention. FIG. 11 is described in combination with FIG. 10. Elements labeled the same as in FIG. 4, FIG. 5 and FIG. 10 have similar functions.

In the example of FIG. 11, the structure of the dimming controller 1008 in FIG. 11 is similar to the structure of the dimming controller 308 in FIG. 5 except for the configuration of the dimmer 1102 and the trigger monitoring unit 1106. In FIG. 11, the trigger monitoring unit 1106 is operable for receiving the dimming request signal and the dimming termination signal via the terminal CLK, and for generating a signal EN to enable or disable a clock generator 1104. The trigger monitoring unit 1106 is further operable for controlling a conductance status of the switch Q27 coupled to the LED string 312.

The dimmer 1102 is operable for generating a reference signal REF to adjust power of the LED string 312 in an analog dimming mode, or generating a control signal 538 for adjusting a duty cycle of a PWM signal PWM1 to adjust the power of the LED string 312 in a burst dimming mode. In the example shown in FIG. 11, the dimmer 1102 can include the clock generator 1104 coupled to the trigger monitoring unit 1106 for generating a clock signal, a counter 1126 driven by the clock signal, an digital-to-analog (D/A) converter 528 coupled to the counter 1126. The dimmer 1102 can further include a PWM generator 530 coupled to the D/A converter 528.

In operation, when the power switch 304 is turned on or turned off, the trigger monitoring unit 1106 can detect a positive edge or a negative edge of the voltage at the terminal CLK. For example, when the power switch 304 is turned off, the capacitor C10 is discharged to power the dimming controller 1108. A voltage across the resistor R6 drops to zero. Therefore, a negative edge of the voltage at the terminal CLK can be detected by the trigger monitoring unit 1106. Similarly, when the power switch 304 is turned on, the voltage across the resistor R6 rises to a predetermined voltage. Therefore, a positive edge of the voltage at the terminal CLK can be detected by the trigger monitoring unit 1106. As such, operations, e.g., turn-on operations or turn-off operations, of the power switch 304 can be detected by the trigger monitoring unit 1106 by monitoring the voltage at the terminal CLK.

In one embodiment, a dimming request signal can be received by the trigger monitoring unit 1106 via the terminal CLK when a first set of operations of the power switch 304 are detected. A dimming termination signal can be received by the trigger monitoring unit 1106 via the terminal CLK when a second set of operations of the power switch 304 are detected. In one embodiment, the first set of operations of the power switch 304 includes a first turn-off operation followed by a first turn-on operation. In one embodiment, the second set of operations of the power switch 304 includes a second turn-off operation followed by a second turn-on operation.

If the dimming request signal is received by the trigger monitoring unit 1106, the dimming controller 1108 begins to continuously adjust the regulated power from the power converter 310. In an analog dimming mode, the dimming controller 1108 adjusts a voltage of a reference signal REF to adjust the regulated power from the power converter 310. In a burst dimming mode, the dimming controller 1108 adjusts a duty cycle of a PWM signal PWM1 to adjust the regulated power from the power converter 310.

If the dimming termination signal is received by the trigger monitoring unit 1106, the dimming controller 1008 can stop adjusting the regulated power from the power converter 310.

Figure 12:
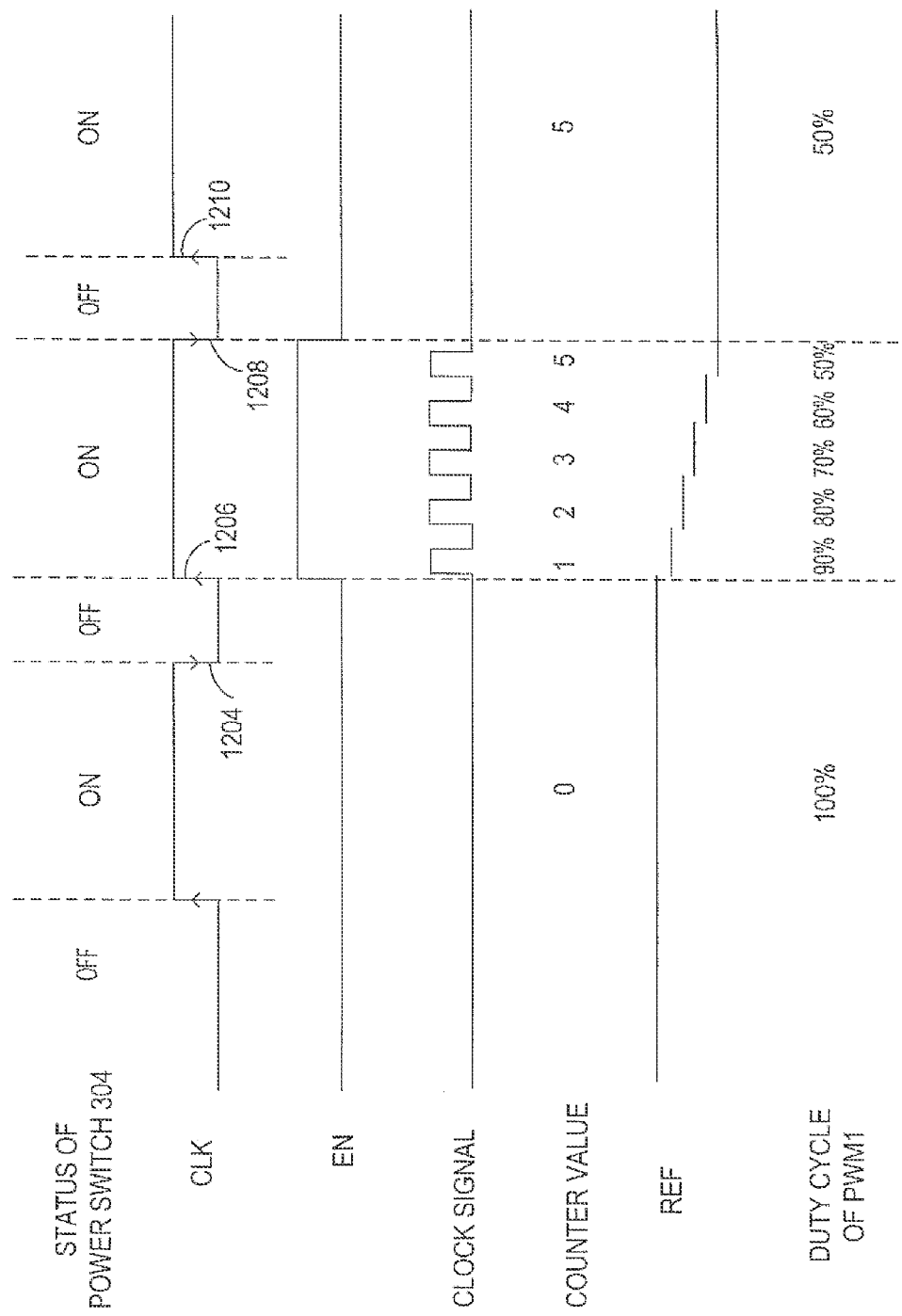
FIG. 12 illustrates a diagram illustrating an operation of a light source driving circuit which includes the dimming controller in FIG. 11, in accordance with one embodiment of the present invention.

FIG. 12 illustrates an example of a diagram illustrating an operation of a light source driving circuit which includes the dimming controller 1008 in FIG. 11, in accordance with one embodiment of the present invention. FIG. 12 is described in combination with FIG. 10 and FIG. 11.

Assume that initially the power switch 304 is off. In operation, when the power switch 304 is turned on, e.g., by a user, the LED string 312 is powered by a regulated power from the power converter 310 to generate an initial light output, in one embodiment. In the analog dimming mode, the initial light output can be determined by an initial voltage of the reference signal REF. In the burst dimming mode, the initial light output can be determined by an initial duty cycle (e.g., 100%) of the PWM signal PWM1. The reference signal REF and the PWM signal PWM1 can be generated by the D/A converter 528 according to a counter value of the counter 1126, in one embodiment. Therefore, the initial voltage of REF and the initial duty cycle of PWM1 can be determined by an initial counter value (e.g., zero) provided by the counter 1126.

In order to adjust the light output of the LED string 312, the user can apply a first set of operations to the power switch 304. A dimming request signal is generated upon detection of the first set of operations of the power switch 304. In one embodiment, the first set of operations can include a first turn-off operation followed by a first turn-on operation. As a result, a dimming request signal including a negative edge 1204 followed by a positive edge 1206 of the voltage at the terminal CLK can be detected and received by the trigger monitoring unit 1106. In response to the dimming request signal, the trigger monitoring unit 1106 can generate a signal EN having a high level. Thus, the clock generator 1104 is enabled to generate a clock signal. The counter 1126 driven by the clock signal can change the counter value in response to each clock pulse of the clock signal. In the example of FIG. 12, the counter value increases in response to the clock signal. In one embodiment, the counter value can be reset to zero after the counter 1126 reaches its predetermined maximum counter value. In another embodiment, the counter value increases until the counter 1126 reaches its predetermined maximum counter value, and then decreases until the counter 1126 reaches its predetermined minimum counter value.

In the analog dimming mode, the D/A converter 528 reads the counter value from the counter 1126 and decreases the voltage of the reference signal REF in response to an increase of the counter value, in one embodiment. In the burst dimming mode, the D/A converter 528 reads the counter value from the counter 1126 and decreases the duty cycle of the PWM signal PWM1 (e.g., decreases 10% each time) in response to an increase of the counter value, in one embodiment. Accordingly, the light output of the LED string 312 can be adjusted because the regulated power from the power converter 310 can be determined by the voltage of the reference signal REF (in the analog dimming mode) or by the duty cycle of the PWM signal PWM1 (in the burst dimming mode).

Once a desired light output has been achieved, the user can terminate the adjustment process by applying a second set of operations to the power switch 304. A dimming termination signal is generated upon detection of the second set of operations of the power switch 304. In one embodiment, the second set of operations can include a second turn-off operation followed by a second turn-on operation. As a result, the dimming termination signal including a negative edge 1208 followed by a positive edge 1210 of the voltage at the terminal CLK can be detected and received by the trigger monitoring unit 1106. Upon detection of the dimming termination signal, the trigger monitoring unit 1106 can generate the signal EN having a low level. Thus, the clock generator 1104 is disabled, such that the counter 1126 can hold its counter value. Accordingly, in the analog dimming mode, the voltage of the reference signal REF can be held at a desired level. In the burst dimming mode, the duty cycle of the PWM signal PWM1 can be held at a desired value. Therefore, the light output of the LED string 312 can be maintained at a desired light output.

Figure 13:
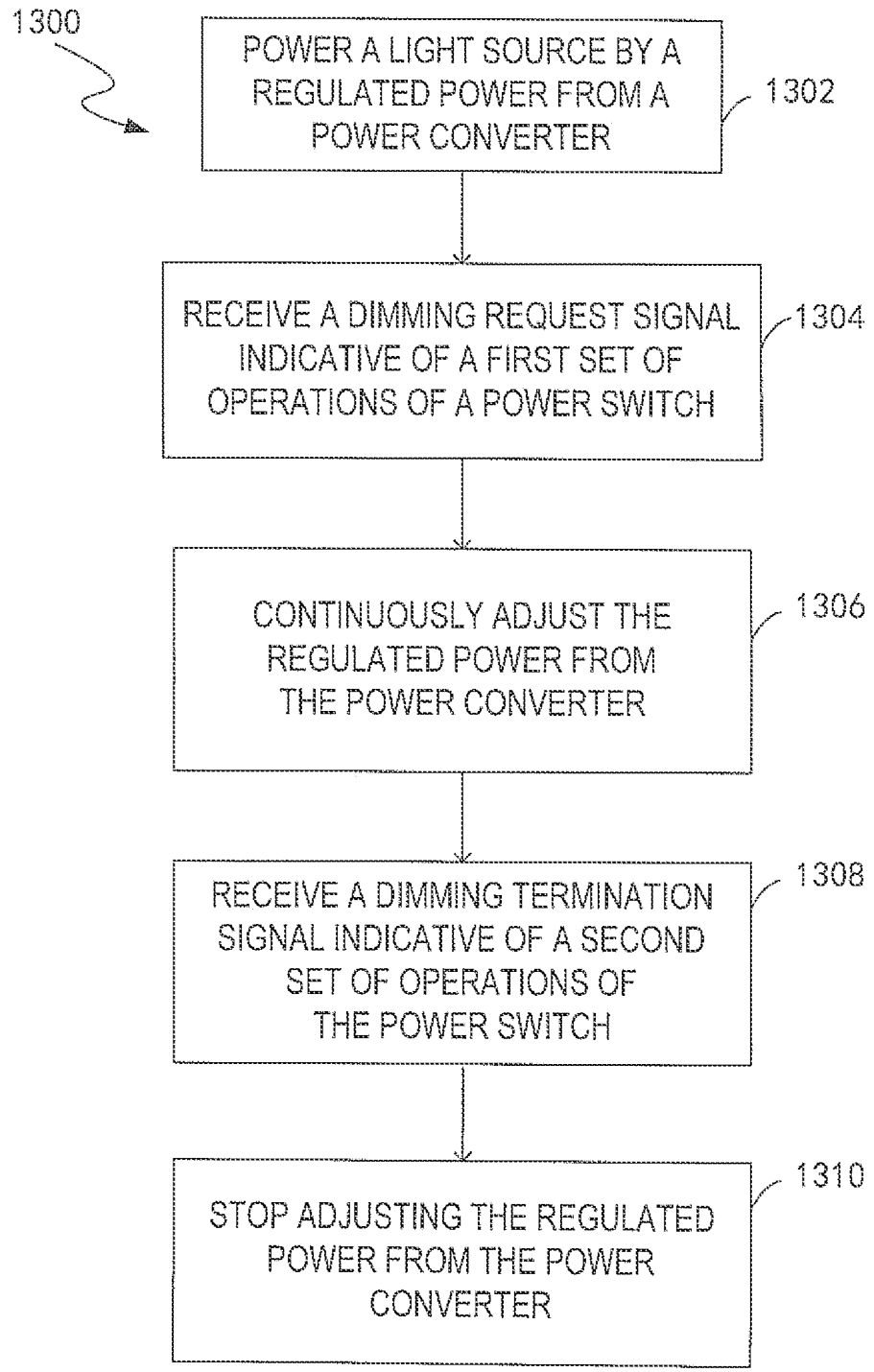
FIG. 13 shows a flowchart of a method for adjusting power of a light source, in accordance with one embodiment of the present invention.

FIG. 13 shows a flowchart 1300 of a method for adjusting power of a light source, in accordance with one embodiment of the present invention. FIG. 13 is described in combination with FIG. 10 and FIG. 11.

In block 1302, a light source, e.g., the LED string 312, is powered by a regulated power from a power converter, e.g., the power converter 310.

In block 1304, a dimming request signal can be received, e.g., by the dimming controller 1108. The dimming request signal can indicate a first set of operations of a power switch, e.g., the power switch 304 coupled between a power source and the power converter. In one embodiment, the first set of operations of the power switch includes a first turn-off operation followed by a first turn-on operation.

In block 1306, the regulated power from the power converter is continuously adjusted, e.g., by the dimming controller 1108. In one embodiment, a clock generator 1104 can be enabled to drive a counter 1126. A dimming signal (e.g., control signal 538 or reference signal REF) can be generated according to the counter value of the counter 1126. In an analog dimming mode, the regulated power from the power converter can be adjusted by comparing the reference signal REF with a feedback current monitoring signal which indicates a light source current of the light source. The voltage of REF can be determined by the counter value. In a burst dimming mode, the regulated power from the power converter can be adjusted by varying a duty cycle of a PWM signal PWM1 by the control signal 538. The duty cycle of PWM1 can be also determined by the counter value.

In block 1308, a dimming termination signal can be received, e.g., by the dimming controller 1108. The dimming termination signal can indicate a second set of operations of a power switch, e.g., the power switch 304 coupled between a power source and the power converter. In one embodiment, the second set of operations of the power switch includes a second turn-off operation followed by a second turn-on operation.

In block 1310, the adjustment of the regulated power from the power converter is terminated if the dimming termination signal is received. In one embodiment, the clock generator 1104 is disabled such that the counter 1126 can hold its counter value. As a result, in the analog dimming mode, the voltage of REF can be held at a desired level. In the burst dimming mode, the duty cycle of the PWM signal PWM1 can be held at a desired value. Consequently, the light source can maintain a desired light output.

Figure 14A:
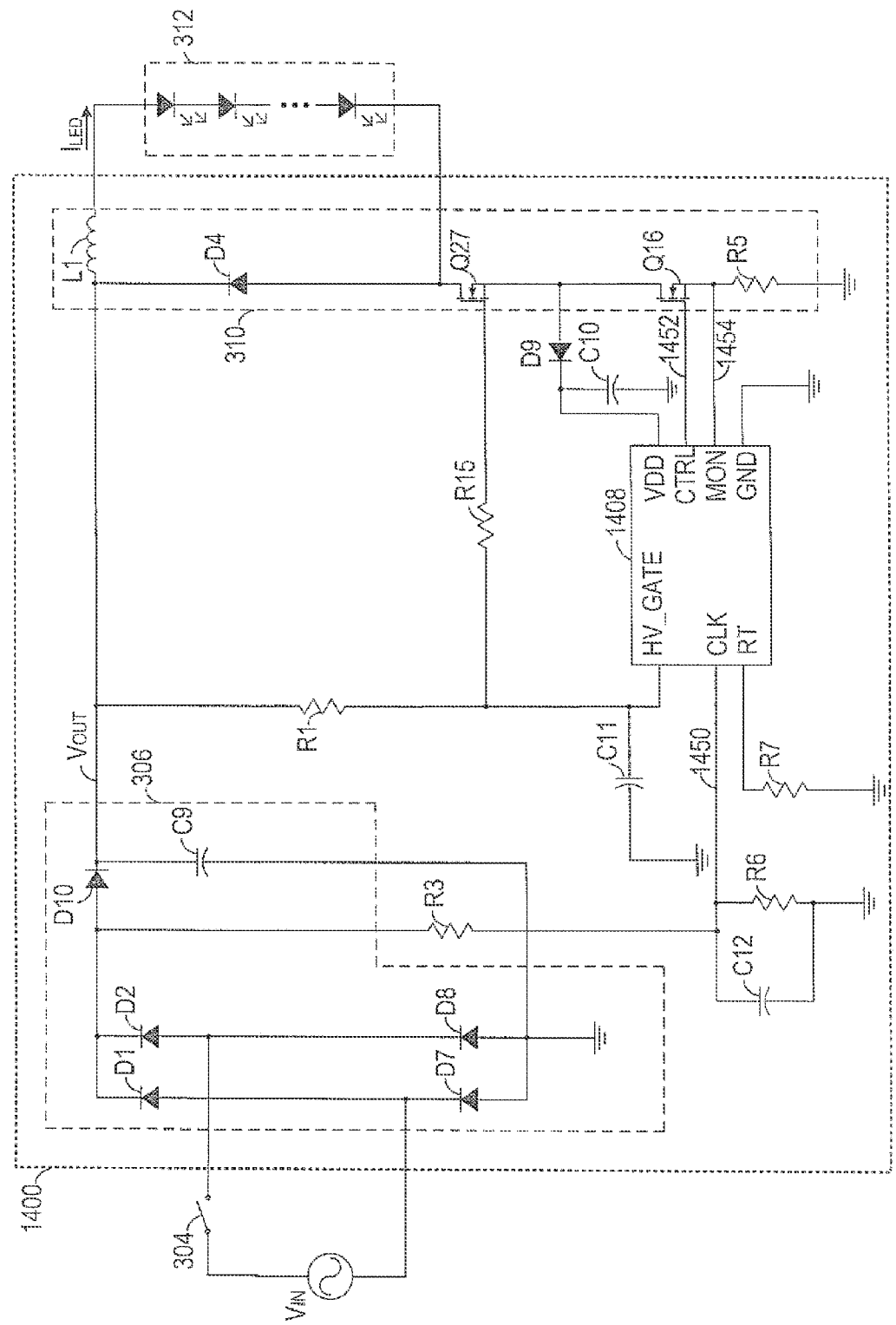
FIG. 14A shows an example of a schematic diagram of a light source driving circuit, in accordance with one embodiment of the present invention.
Figure 14B:
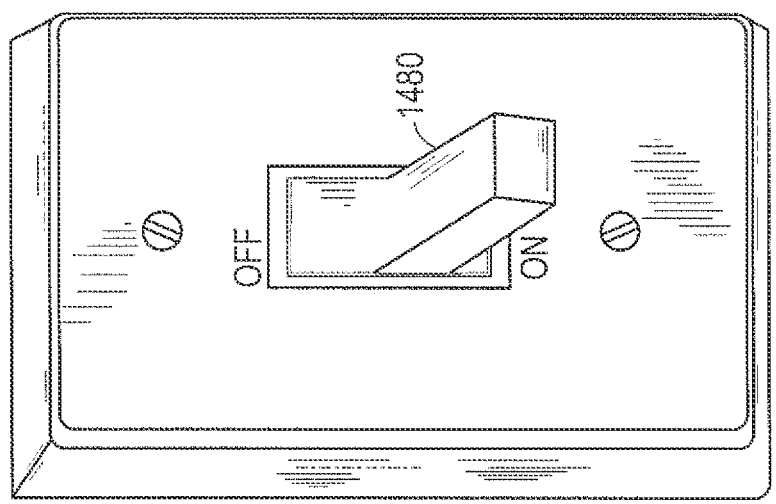
FIG. 14B shows an example of a power switch in FIG. 14A, in accordance with one embodiment of the present invention.

FIG. 14A shows an example of a schematic diagram of a light source driving circuit 1400, in accordance with one embodiment of the present invention. Elements labeled the same as in FIG. 3 and FIG. 4 have similar functions. FIG. 14A is described in combination with FIG. 4. The light source driving circuit 1400 is coupled to a power source $V_{IN}$ (e.g., 110/120 Volt AC, 60 Hz) via a power switch 304 and is coupled to an LED light source 312. Referring to FIG. 14B, an example of the power switch 304 in FIG. 14A is illustrated according to one embodiment of the present invention. In one embodiment, the power switch 304 is an on/off switch mounted on the wall. By switching an element 1480 to an ON place or an OFF place, the conductance status of the power switch 304 is controlled on or off, e.g., by a user.

Referring back to FIG. 14A, the light source driving circuit 1400 includes an AC/DC converter 306, a power converter 310, and a dimming controller 1408. The AC/DC converter 306 converts an input AC voltage $V_{IN}$ to an output DC voltage $V_{OUT}$. In the example of FIG. 14A, the AC/DC converter 306 includes a bridge rectifier including diodes D1, D2, D7 and D8. The power converter 310 coupled to the AC/DC converter 306 receives the output DC voltage $V_{OUT}$ and provides output power to the LED light source 312. The dimming controller 1408 coupled to the AC/DC converter 306 and coupled to the power converter 310 is operable for monitoring the power switch 304, and for regulating the output power of the power converter 310 according to operations of the power switch 304 so as to control brightness of light emitted from the LED light source 312.

In one embodiment, the power converter 310 includes an inductor L1, a diode D4, a switch Q27, a control switch Q16, and a current sensor R5. The dimming controller 1408 includes multiple terminals, such as a terminal HV_GATE, a terminal CLK, a terminal VDD, a terminal GND, a terminal CTRL, a terminal RT and a terminal MON. The terminals of the dimming controller 1408 operate similarly as the corresponding terminals of the dimming controller 308 described in relation to FIG. 4.

During operation, the dimming controller 1408 monitors the power switch 304 by receiving a switch monitoring signal 1450 at the terminal CLK. The switch monitoring signal 1450 indicates a conductance status, e.g., ON/OFF status, of the power switch 304. Accordingly, the dimming controller 1408 controls the switch Q27 through the terminal HV_GATE and controls the control switch Q16 through the terminal CTRL, so as to control the dimming of the LED light source 312.

More specifically, in one embodiment, when the power switch 304 is turned on, the dimming controller 1408 generates a signal, e.g., logic high, at the terminal HV_GATE to turn the switch Q27 on, and generates a switch control signal 1452 at the terminal CTRL to turn the control switch Q16 on and off. In one embodiment, the control switch Q16 operates in a switch-on state and a switch-off state. During the switch-on state of the control switch Q16, the switch control signal 1452 alternately turns the control switch Q16 on and off. For example, the dimming controller 1408 periodically turns on the control switch Q16. In addition, the dimming controller 1408 receives a sensing signal 1454 via the terminal MON indicating the current $I_{LED}$ through the LED light source 312, and turns off the control switch Q16 if the sensing signal 1454 indicates that the current $I_{LED}$ reaches a current threshold $I_{TH}$. Thus, the current $I_{LED}$ ramps up when the control switch Q16 is turned on and ramps down when the control switch Q16 is turned off. In this way, the dimming controller 1408 determines a peak level of the current $I_{LED}$, such that an average level $I_{AVERAGE}$ of the current $I_{LED}$ is controlled. During the switch-off state of the control switch Q16, the switch control signal 1452 maintains the control switch Q16 off to cut off the current $I_{LED}$. In one embodiment, the dimming controller 1408 determines a time ratio of the switch-on state to the switch-off state to control the average level $I_{AVERAGE}$ of the current $I_{LED}$.

When the power switch 304 is turned off, the dimming controller 1408 generates a signal, e.g., logic low, at the terminal HV_GATE to turn off the switch Q27, in one embodiment. As such, the current $I_{LED}$ flowing through the LED light source 312 drops to substantially zero ampere to cut off the LED light source 312.

In one embodiment, the dimming controller 1408 receives the switch monitoring signal 1450 indicating a conductance status of the power switch 304 at the terminal CLK. Accordingly, the dimming controller 1408 is able to identify an operation of the power switch 304 and provide a dimming request signal indicating the operation of the power switch 304. In one embodiment, the dimming controller 1408 provides a dimming request signal if a turn-off operation of the power switch 304 is identified. Alternatively, the dimming controller 1408 provides a dimming request signal if a turn-on operation of the power switch 304 is identified. In response, the dimming controller 1408 operates in an analog dimming mode, a burst dimming mode, or a combination mode to adjust the on/off state of the control switch Q16 to control the dimming of the LED light source 312, in one embodiment. For example, in the analog dimming mode, the peak level of the current $I_{LED}$ is determined by the dimming controller 1408 while the time ratio of the switch-on state to the switch-off state remains at the same level. In the burst dimming mode, the time ratio of the switch-on state to the switch-off state is determined by the dimming controller 1408 while the peak level of the current $I_{LED}$ remains at the same level. In the combination mode, both the peak level of the current $I_{LED}$ and the time ratio of the switch-on state to the switch-off state are determined by the dimming controller 1408. Thus, when the switch Q27 is turned on again (indicating the power switch 304 is turned on again), the peak level of the current $I_{LED}$ and/or the time durations of the switch-on state and the switch-off state are adjusted. As a result, the average current $I_{AVERAGE}$ flowing through the LED light source 312 is adjusted to control the brightness of the LED light source 312.

Advantageously, by adjusting both the peak level of the current $I_{LED}$ and the durations of the switch-on state and the switch-off state, the dimming controller 1408 is able to adjust the average current $I_{AVERAGE}$ in a relatively wide range. For example, if $I_{MAX}$ is a maximum level of the average current $I_{AVERAGE}$, $I_{AVERAGE}$ can vary in a range of 4%*$I_{MAX}$ to 100%*$I_{MAX}$ in accordance with one embodiment, compared to a range of 20%*$I_{MAX}$ to 100%*$I_{MAX}$ in conventional art. Consequently, a wider range dimming for the LED light source 312 is achieved, which is beneficial for energy-efficient light applications, for example, night lighting.

Figure 15:
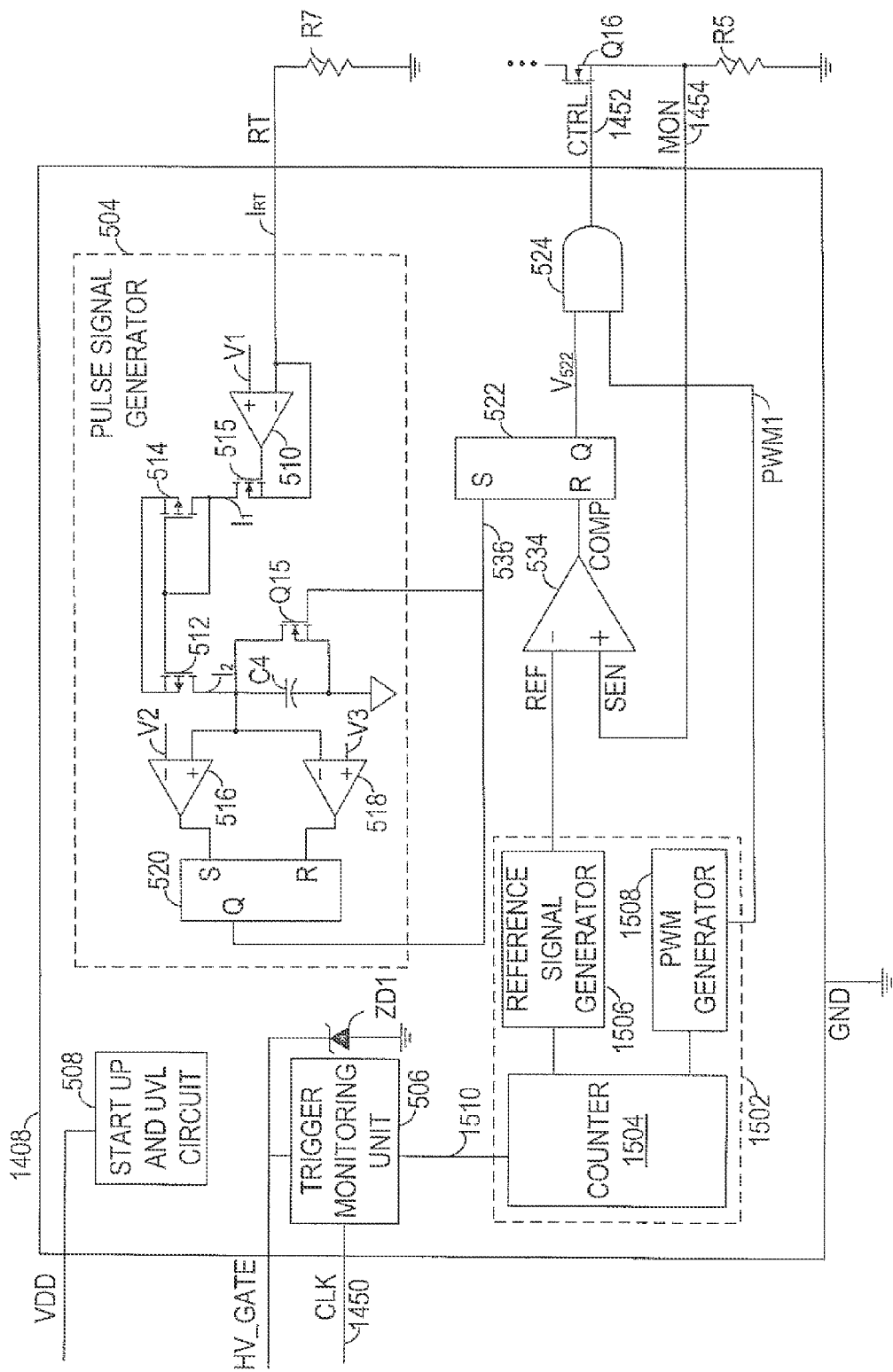
FIG. 15 shows an example of a structure of a dimming controller in FIG. 14, in accordance with one embodiment of the present invention.

FIG. 15 shows an example of a structure of the dimming controller 1408 in FIG. 14A, in accordance with one embodiment of the present invention. FIG. 15 is described in combination with FIG. 5-FIG. 7 and FIG. 14A. Elements labeled the same as in FIG. 5 and FIG. 14A have similar functions.

In the example of FIG. 15, the dimming controller 1408 includes a start-up and UVL circuit 508, a pulse signal generator 504, a trigger monitoring unit 506, a dimmer 1502, a comparator 534, an SR flip-flop 522, and an AND gate 524. The dimmer 1502 includes a reference signal generator 1506 for generating a reference signal REF and further includes a PWM generator 1508 for generating a pulse-width modulation signal PWM1. As described in relation to FIG. 5, the comparator 534 compares the sensing signal 1454 with the reference signal REF to generate a comparing signal COMP. The pulse signal generator 504 generates a pulse signal 536 having a waveform of periodical pulses. In one embodiment, the SR flip-flop 522 sets the pulse signal $V_{522}$ to digital one when the pulse signal 536 is digital one and resets the pulse signal $V_{522}$ to digital zero when the comparing signal COMP is digital one (e.g., when the sensing signal 1454 reaches the reference signal REF). The AND gate 524 receives the pulse signal $V_{522}$ and the pulse-width modulation signal PWM1, and generates the switch control signal 1452 accordingly to control the control switch Q16.

Assuming that the switch Q27 is turned on, the dimming controller 1408 controls the current $I_{LED}$ in a similar way as the dimming controller 308 described in relation to FIG. 6 and FIG. 7. During a first state of the pulse-width modulation signal PWM1 (e.g., PWM1 is digital one), the AND gate 524 alternately turns on and off the control switch Q16 according to the pulse signal $V_{522}$, in one embodiment. As such, the control switch Q16 operates in the switch-on state, in which the current $I_{LED}$ ramps up when the control switch Q16 is turned on and ramps down when the control switch Q16 is turned off. The reference signal REF determines a peak level of the current $I_{LED}$ by turning off the control switch Q16 when the sensing signal 1454 reaches the reference signal REF. During a second state of the pulse-width modulation signal PWM1 (e.g., PWM1 is digital zero), the AND gate 524 maintains the control switch Q16 to be off. As such, the control switch Q16 operates in the switch-off state to cut off the current $I_{LED}$.

Therefore, the reference signal REF is used to determine the peak level of the current $I_{LED}$, and the duty cycle of the pulse-width modulation signal PWM1 is used to determine the time ratio of the switch-on state to the switch-off state of the control switch Q16. In other words, the average current $I_{AVERAGE}$ through the LED light source 312 varies according to the reference signal REF and the duty cycle of the PWM1. For example, $I_{AVERAGE}$ is increased if the voltage $V_{REF}$ of the reference signal REF is increased and is decreased if $V_{REF}$ is decreased. Moreover, $I_{AVERAGE}$ is increased if the duty cycle $D_{PWM1}$ of PWM1 is increased and is decreased if $D_{PWM1}$ is decreased.

The dimmer 1502 further includes a counter 1504 for providing a counter value. In one embodiment, the reference signal generator 1506 coupled to the counter 1504 determines the voltage level $V_{REF}$ based upon the counter value VALUE_1504 of the counter 1504. The PWM generator 1508 coupled to the counter 1504 determines the duty cycle $D_{PWM1}$ based upon the counter value VALUE_1504.

TABLE 1

| VALUE_1504 | 0 | 1 | 2 | 3 |
|---|---|---|---|---|
| $V_{REF}$ | $V_{MAX}$ | 50% * $V_{MAX}$ | 20% * $V_{MAX}$ | 20% * $V_{MAX}$ |
| $D_{PWM1}$ | 100% | 100% | 100% | 20% |

TABLE 2

| VALUE_1504 | 0 | 1 | 2 | 3 |
|---|---|---|---|---|
| $V_{REF}$ | $V_{MAX}$ | 50% * $V_{MAX}$ | 30% * $V_{MAX}$ | 20% * $V_{MAX}$ |
| $D_{PWM1}$ | 100% | 60% | 40% | 20% |

Table 1 and Table 2 show examples of the counter value VALUE_1504 of the counter 1504 versus the voltage $V_{REF}$ and the duty cycle $D_{PWM1}$. In one embodiment, the counter 1504 is a 2-bit counter, and thus the counter value can be 0, 1, 2 or 3. $V_{MAX}$ represents a maximum voltage level of the reference signal REF. According to Table 1, when the counter value VALUE_1504 is 0, 1, 2 and 3, the reference signal REF has levels $V_{MAX}$, 50%*$V_{MAX}$, 20%*$V_{MAX}$ and 20%*$V_{MAX}$, respectively, and the duty cycle $D_{PWM1}$ has values 100%, 100%, 100% and 20%, respectively. According to Table 2, when the counter value VALUE_1504 is 0, 1, 2 and 3, the reference signal REF has levels $V_{MAX}$, 50%*$V_{MAX}$, 30%*$V_{MAX}$ and 20%*$V_{MAX}$, respectively, and the duty cycle $D_{PWM1}$ has values 100%, 60%, 40% and 20%, respectively. The counter value, the reference signal REF and the duty cycle of PWM1 can have other relationships, and are not limited to the examples in Table 1 and Table 2.

If a dimming request signal, e.g., indicating a turn-off operation of the power switch 304, is received, the trigger monitoring unit 506 generates an enable signal 1510, in one embodiment. The counter 1504 receives the enable signal 1510 and increases or decreases the counter value accordingly. As such, the reference signal generator 1506 determines the reference signal REF, e.g., according to Table 1 or Table 2. The PWM generator 1508 determines the duty cycle of PWM1, e.g., according to Table 1 or Table 2.

As a result, the dimming controller 1408 selectively operates in an analog dimming mode, a burst dimming mode, and a combination mode. In the analog dimming mode, the level of the reference signal REF is determined by the counter value of the counter 1504 to adjust the average current $I_{AVERAGE}$ while the duty cycle $D_{PWM1}$ of PWM1 remains at the same level, in one embodiment. In the bust dimming mode, the duty cycle $D_{PWM1}$ of PWM1 is determined by the counter value of the counter 1504 to adjust the average current $I_{AVERAGE}$ while the reference signal REF remains at the same level, in one embodiment. In the combination mode, both the level of the reference signal REF and the duty cycle $D_{PWM1}$ are determined according to the counter value of the counter 1504. Therefore, the brightness of the LED light source 302 is adjusted. The operations of the dimming controller 1408 are further described in relation to FIG. 16 and FIG. 17. The dimming controller 1408 can have other configurations and is not limited to the example shown in FIG. 15.

Figure 16:
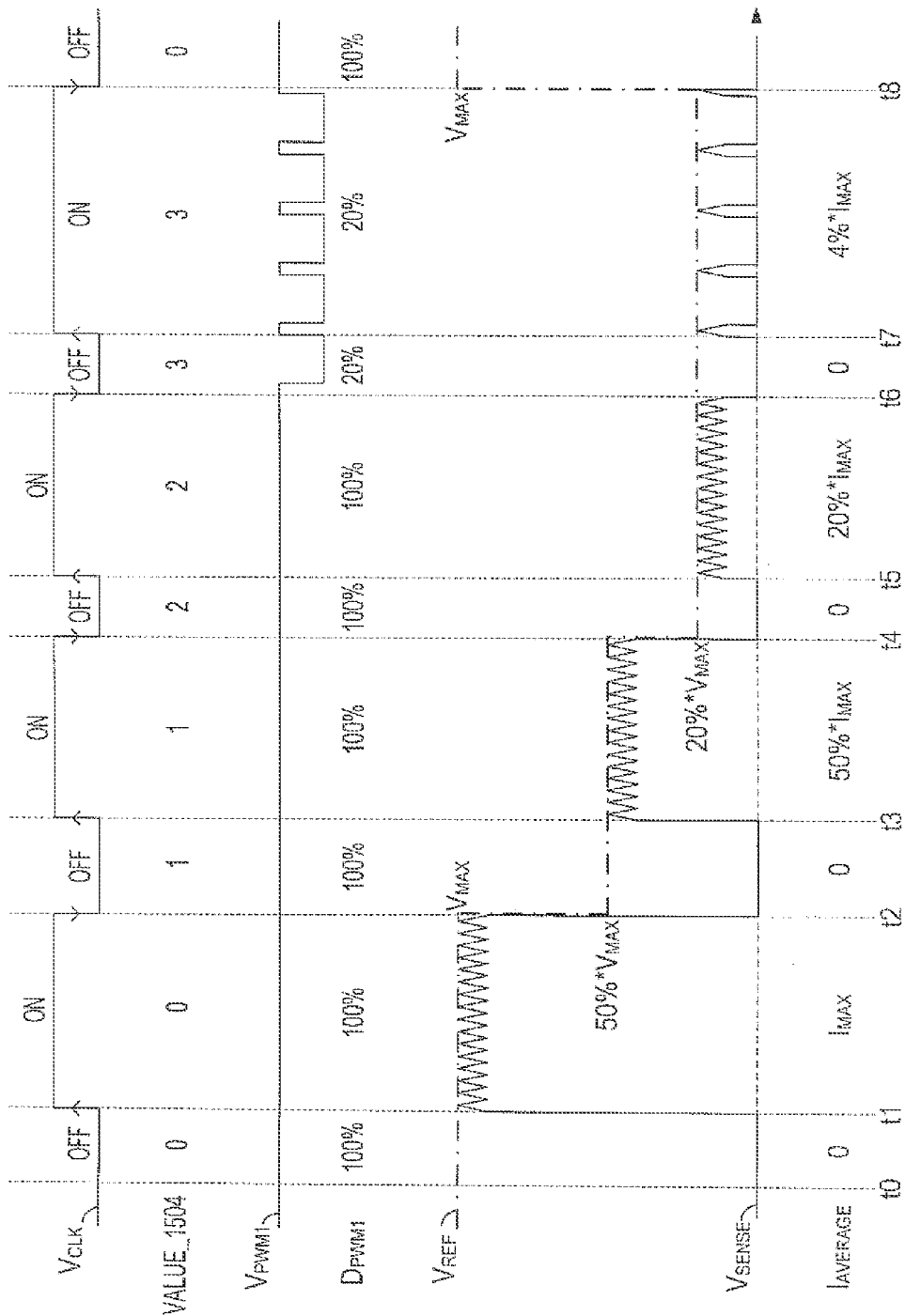
FIG. 16 illustrates an example of a diagram illustrating an operation of a light source driving circuit which includes the dimming controller in FIG. 15, in accordance with one embodiment of the present invention.

FIG. 16 illustrates an example of a diagram illustrating an operation of a light source driving circuit which includes the dimming controller 1408 in FIG. 15, in accordance with one embodiment of the present invention. FIG. 16 is described in combination with FIG. 14A and FIG. 15. FIG. 16 shows the voltage $V_{CLK}$ at the terminal CLK, the counter value VALUE_1504 of the counter 1504, the voltage $V_{PWM1}$ of the pulse-width modulation signal PWM1, the duty cycle $D_{PWM1}$ of the pulse-width modulation signal PWM1, the voltage $V_{REF}$ of the reference signal REF, the voltage $V_{SENSE}$ of the sensing signal 1454, and the average level $I_{AVERAGE}$ of the current $I_{LED}$. In the example of FIG. 16, the dimming controller 1408 sets the voltage $V_{REF}$ and the duty cycle $D_{PWM1}$ according to the example presented in Table 1.

At time t0, the power switch 304 is off. The counter value VALUE_1504 is 0. Based upon Table 1, the duty cycle $D_{PWM1}$ is 100% and the voltage $V_{REF}$ has the maximum level $V_{MAX}$. Since the power switch 304 and the switch Q27 are both turned off, the current $I_{LED}$ is cut off and thus the average current $I_{AVERAGE}$ is zero.

At time t1, the voltage $V_{CLK}$ has a rising edge indicating a turn-on operation of the power switch 304. The dimming controller 1408 turns on the switch Q27, and thus the current $I_{LED}$ is controlled according to the conductance status of the control switch Q16. Between t1 and t2, the duty cycle $D_{PWM1}$ is 100% and the voltage $V_{REF}$ has the maximum level $V_{MAX}$. The control switch Q16 operates in the switch-on state to be alternately on and off. As shown in FIG. 16, the voltage $V_{SENSE}$ ramps up when the control switch Q16 is on and ramps down when the control switch Q16 is off. Since the peak level of the voltage $V_{SENSE}$ is equal to the maximum level $V_{MAX}$ of the reference signal REF, the average current $I_{AVERAGE}$ has a maximum level $I_{MAX}$.

At time t2, the voltage $V_{CLK}$ has a falling edge indicating a turn-off operation of the power switch 304. The switch Q27 is turned off to cut off the current $I_{LED}$. Thus, between t2 and t3, the voltage $V_{SENSE}$ drops to substantially zero volt and the average current $I_{AVERAGE}$ drops to substantially zero ampere.

In one embodiment, upon detection of a turn-off operation of the power switch 304 at time t2, a dimming request signal is generated. The counter value VALUE_1504 is increased from 0 to 1. Based upon the example in Table 1, the dimming controller 1408 is switched to an analog dimming mode to adjust the voltage $V_{REF}$ to 50%*$V_{MAX}$ and maintains the duty cycle $D_{PWM1}$ at 100%.

At time t3, the switch Q27 is turned on again. Thus, during the time period between t3 and t4, the dimming controller 1408 switches the control switch Q16 on and off according to the reference signal REF and the pulse-width modulation signal PWM1. Thus, the average current $I_{AVERAGE}$ is adjusted to 50%*$I_{MAX}$.

At time t4, the voltage $V_{CLK}$ has a falling edge indicating a turn-off operation of the power switch 304. The counter value VALUE_1504 is increased from 1 to 2. Based upon Table 1, the dimming controller 1408 is in the analog dimming mode to adjust the voltage $V_{REF}$ to 20%*$V_{MAX}$ and maintain the duty cycle $D_{PWM1}$ at 100%. Thus, the average current $I_{AVERAGE}$ is adjusted to 20%*$I_{MAX}$ between t5 and t6.

At time t6, a falling edge of the voltage $V_{CLK}$ indicates a turn-off operation of the power switch 304. In response, the counter value is increased from 2 to 3. Based upon Table 1, the dimming controller 1408 is switched to a burst dimming mode to maintain the voltage $V_{REF}$ at 20%*$V_{MAX}$ and decrease the duty cycle $D_{PWM1}$ to 20%. As such, when the power switch 304 is turned on during a time period between t7 and t8, the voltage $V_{SENSE}$ ramps up and down when the voltage $V_{PWM1}$ has a first state, e.g., logic high, and drops to substantially zero volt when the voltage $V_{PWM1}$ has a second state, e.g., logic low. As such, the average current $I_{AVERAGE}$ is adjusted to 4%*$I_{MAX}$ between t7 and t8.

Therefore, in the example of FIG. 16, the dimming controller 1408 initially operates in the analog dimming mode to adjust the average current $I_{AVERAGE}$ from 100%*$I_{MAX}$ to 20%*$I_{MAX}$ and then operates in the burst dimming mode to adjust the average current $I_{AVERAGE}$ from 20%*$I_{MAX}$ to 4%*$I_{MAX}$. Advantageously, both the duty cycle $D_{PWM1}$ and the voltage $V_{REF}$ are adjusted to achieve the average current $I_{AVERAGE}$ in a range of 100%*$I_{MAX}$ to 4%*$I_{MAX}$. Thus, the dimming of the LED light source 312 is achieved in a wider range. Moreover, during the relatively wide range of dimming, the voltage $V_{REF}$ is maintained greater than a voltage threshold (e.g., 15%*$V_{MAX}$) and the duty cycle $D_{PWM1}$ is maintained greater than a duty cycle threshold (e.g., 10%). As such, the accuracy of the reference signal REF and the pulse-width modulation signal PWM1 is not affected by undesirable conditions such as noises, which improves the dimming accuracy of the light source driving circuit 1400.

Figure 17:
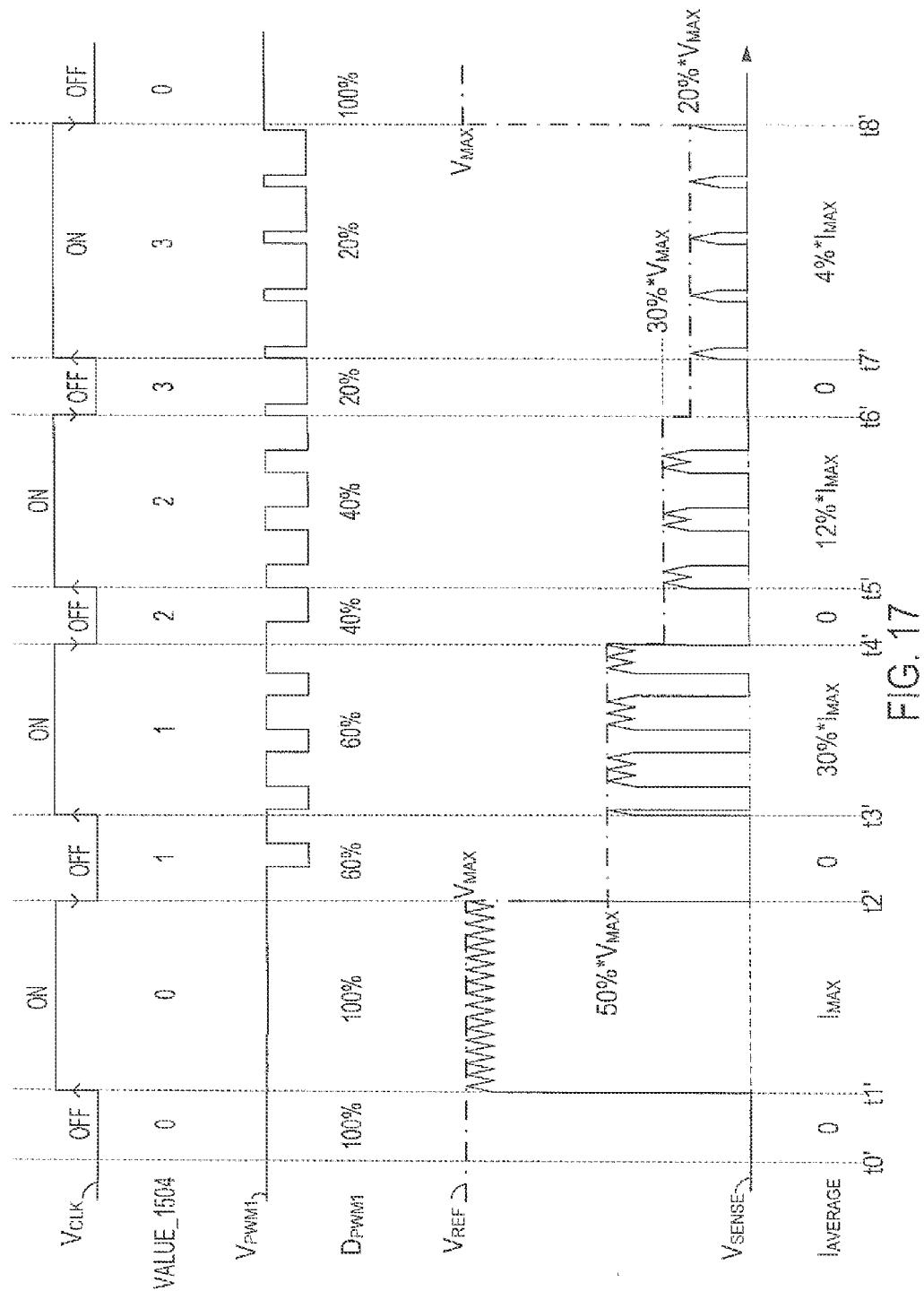
FIG. 17 illustrates another example of a diagram illustrating an operation of a light source driving circuit which includes the dimming controller in FIG. 15, in accordance with one embodiment of the present invention.

FIG. 17 illustrates another example of a diagram illustrating an operation of a light source driving circuit which includes the dimming controller 1408 in FIG. 15, in accordance with one embodiment of the present invention. FIG. 17 is described in combination with FIG. 14A-FIG. 16. FIG. 17 shows the voltage $V_{CLK}$ at the terminal CLK, the counter value VALUE_1504 of the counter 1504, the voltage $V_{PWM1}$ of the pulse-width modulation signal PWM1, the duty cycle $D_{PWM1}$ of the pulse-width modulation signal PWM1, the voltage $V_{REF}$ of the reference signal REF, the voltage $V_{SENSE}$ of the sensing signal 1454, and the average level $I_{AVERAGE}$ of the current $I_{LED}$. In the example of FIG. 17, the dimming controller 1408 sets the voltage $V_{REF}$ and the duty cycle $D_{PWM1}$ according to the example presented in Table 2.

Between t0' and t2', the dimming controller 1408 operates similarly to the operation between t0 and t2 as described in relation to FIG. 16. For example, the counter value VALUE_1504 is 0 between t0' and t2'. Based upon Table 2, the duty cycle $D_{PWM1}$ is 100% and the voltage $V_{REF}$ has the maximum level $V_{MAX}$. Thus, between t1' and t2', the peak level of the voltage $V_{SENSE}$ is equal to the maximum level $V_{MAX}$ of the reference signal REF and the average current $I_{AVERAGE}$ has a maximum level $I_{MAX}$.

At time t2', a falling edge of the voltage $V_{CLK}$ indicates a turn-off operation of the power switch 304. The switch Q27 is turned off to cut off the current $I_{LED}$. Thus, between t2' and t3', the voltage $V_{SENSE}$ drops to substantially zero volt and the average current $I_{AVERAGE}$ drops to substantially zero ampere.

In one embodiment, upon detection the turn-off operation of the power switch 304 at time t2', a dimming request signal is generated. The counter value VALUE_1504 is increased from 0 to 1. Based upon the example in Table 2, the dimming controller 1408 operates in the combination mode to adjust the voltage $V_{REF}$ to 50%*$V_{MAX}$ and adjust the duty cycle $D_{PWM1}$ to 60%. Therefore, between t3' and t4', the control switch Q16 operates in the switch-on state to alternately on and off according to the pulse signal $V_{522}$ when the voltage $V_{PWM1}$ has a first state, e.g., logic high. The peak level of the voltage $V_{SENSE}$ is equal to the voltage $V_{REF}$, that is, 50%*$V_{MAX}$. Moreover, the control switch Q16 operates in the switch-off state to cut off the current $I_{LED}$ when the voltage $V_{PWM1}$ has a second state, e.g., logic low. Thus, the average level of the current $I_{LED}$ is equal to 30%*$I_{MAX}$.

At time t4', a falling edge of the voltage $V_{CLK}$ indicates a turn-off operation of the power switch 304, and thus a dimming request signal is generated. In response, the counter value VALUE_1504 is increased from 1 to 2. Based upon the example in Table 2, the dimming controller 1408 operates in the combination mode to adjust the voltage $V_{REF}$ to 30%*$V_{MAX}$ and adjust the duty cycle $D_{PWM1}$ to 40%. Consequently, the average level of the current $I_{LED}$ is equal to 12%*$I_{MAX}$ between t5' and t6'.

At time t6', a falling edge of the voltage $V_{CLK}$ indicates a turn-off operation of the power switch 304 and thus a dimming request signal is generated. In response, the counter value VALUE_1504 is increased from 2 to 3. Based upon the example in Table 2, the dimming controller 1408 operates in the combination mode to adjust the voltage $V_{REF}$ to 20%*$V_{MAX}$ and adjust the duty cycle $D_{PWM1}$ to 20%. Consequently, the average level of the current $I_{LED}$ is equal to 4%*$I_{MAX}$ between t7' and t8'.

Therefore, between t1' and t7', the dimming controller operates in the combination mode when the counter value VALUE_1504 is changed. Advantageously, both the duty cycle $D_{PWM1}$ and the voltage $V_{REF}$ are adjusted to achieve the average current $I_{AVERAGE}$ in a range of 100%*$I_{MAX}$ to 4%*$I_{MAX}$. The dimming of the LED light source 302 are achieved in a wider dimming range. Moreover, during the relatively wide range of dimming, the voltage $V_{REF}$ is maintained greater than a voltage threshold (e.g., 15%*$V_{MAX}$) and the duty cycle $D_{PWM1}$ is maintained greater than a duty cycle threshold (e.g., 10%). As such, the accuracy of the reference signal REF and the pulse-width modulation signal PWM1 is not affected by undesirable conditions such as noises, which improves the dimming accuracy of the light source driving circuit 1400.

Figure 18:
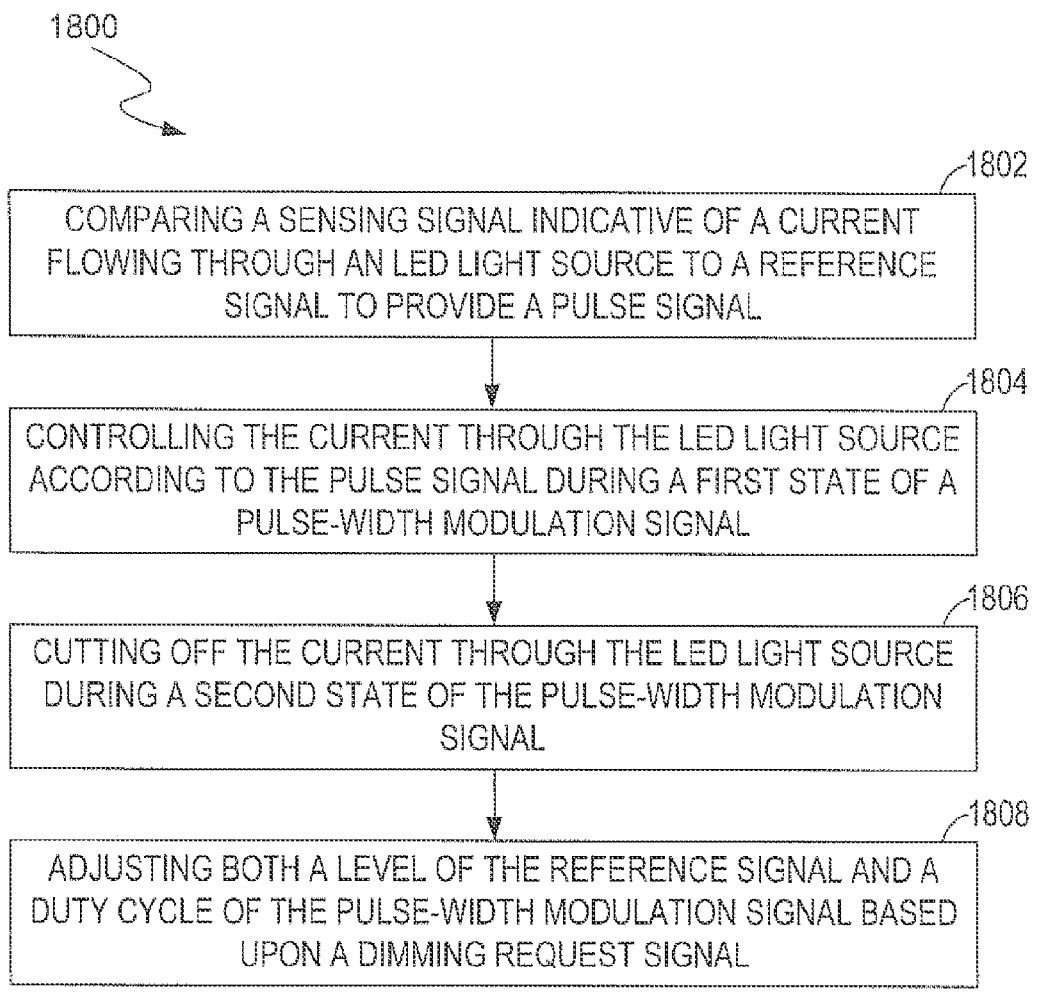
FIG. 18 shows a flowchart of a method for adjusting power of a light source, in accordance with one embodiment of the present invention.

FIG. 18 shows a flowchart 1800 of a method for controlling dimming of an LED light source, in accordance with one embodiment of the present invention. FIG. 18 is described in combination with FIG. 14A-FIG. 17. Although specific steps are disclosed in FIG. 18, such steps are examples. That is, the present invention is well suited to performing various other steps or variations of the steps recited in FIG. 18.

In block 1802, a sensing signal, e.g., the sensing signal 1454, indicative of a current flowing through the LED light source, e.g., $I_{LED}$, is compared to a reference signal, e.g., the reference signal REF, to provide a pulse signal, e.g., the pulse signal $V_{522}$. In block 1804, the current through the LED light source is controlled according to the pulse signal during a first state of a pulse-width modulation signal, e.g., PWM1. In block 1806, the current through the LED light source is cut off during a second state of a pulse-width modulation signal.

In block 1808, both a level of the reference signal and the duty cycle of the pulse-width modulation signal are adjusted based upon a dimming request signal. In one embodiment, a counter value of a counter is adjusted according to the dimming request signal. The level of the reference signal and the duty cycle of the pulse-width modulation signal are determined according to the counter value. If the counter value is changed from a first value to a second value, a first mode (e.g., an analog dimming mode), a second mode (e.g., a burst dimming mode), or a third mode (e.g., a combination mode) is selected. In the first mode, the level of the reference signal is adjusted and the duty cycle of the pulse-width modulation signal is maintained. In the second mode, the level of the reference signal is maintained and the duty cycle of the pulse-width modulation signal is adjusted. In the third mode, both the level of the reference signal and the duty cycle of the pulse-width modulation signal are adjusted.

Figure 19:
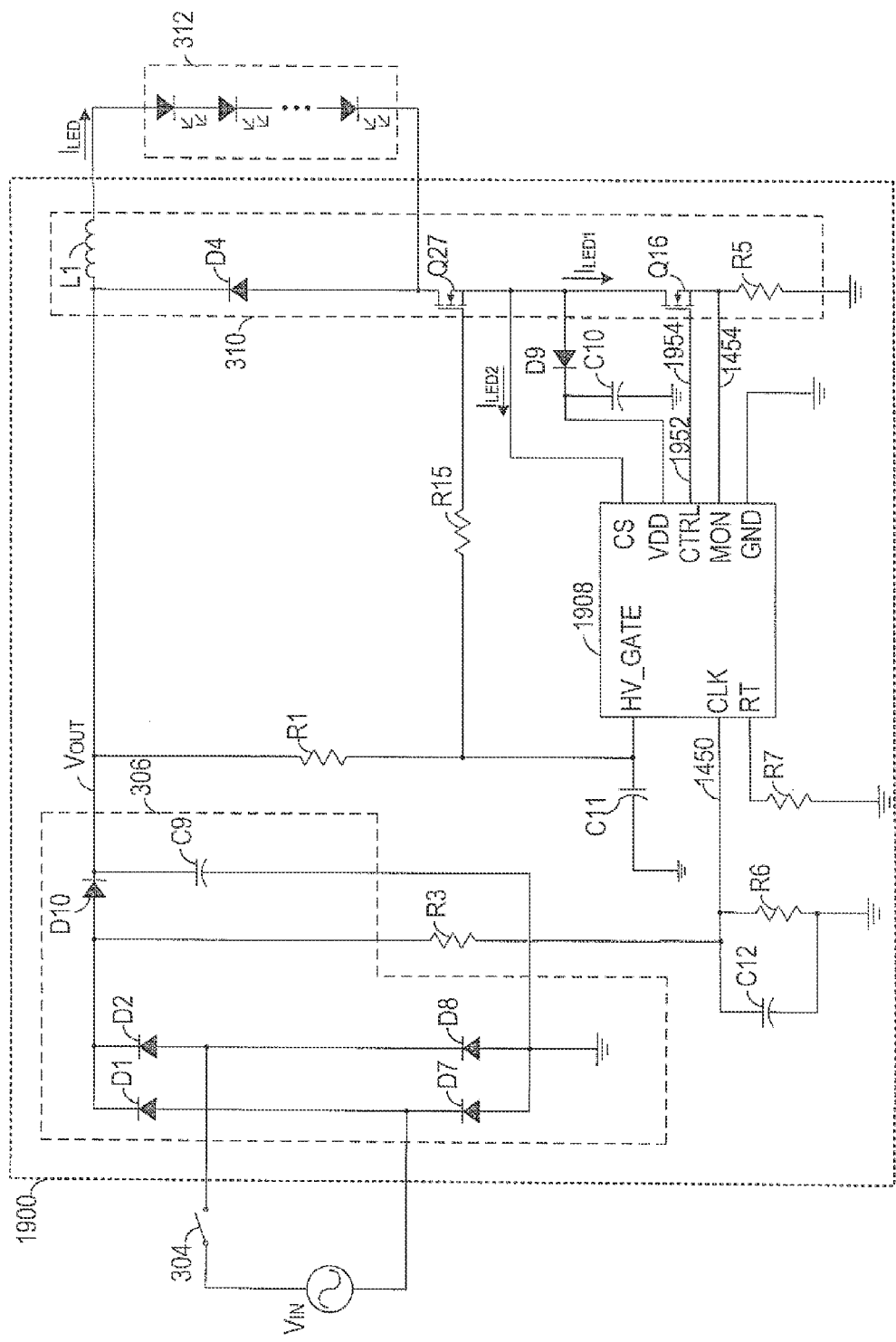
FIG. 19 shows an example of a schematic diagram of a light source driving circuit, in an embodiment according to the present invention.

FIG. 19 shows an example of a schematic diagram of a light source driving circuit 1900, in an embodiment according to the present invention. Elements labeled the same as in FIG. 3 and FIG. 4 have similar functions. FIG. 19 is described in combination with FIG. 3 and FIG. 4. The light source driving circuit 1900 is coupled to a power source $V_{IN}$ (e.g., 110/120 Volt AC, 60 Hz) via a power switch 304 and is coupled to an LED light source 312. As described in relation to FIG. 14B, the power switch 304 is an on/off switch mounted on the wall, and the power switch 304 is controlled on or off, e.g., by a user, in one embodiment.

The light source driving circuit 1900 includes an AC/DC converter 306, a power converter 310, and a dimming controller 1908. The AC/DC converter 306 converts an input AC voltage $V_{IN}$ to an output DC voltage $V_{OUT}$. In the example of FIG. 19, the AC/DC converter 306 includes a bridge rectifier having diodes D1, D2, D7 and D8, and includes a filter having a diode D10 and a capacitor C9. The power converter 310 is coupled to the AC/DC converter 306, receives the output DC voltage $V_{OUT}$, and provides output power to the LED light source 312. In one embodiment, the power converter 310 includes an inductor L1, a diode D4, a switch Q27, a control switch Q16, and a current sensor R5. The dimming controller 1908 is coupled to the AC/DC converter 306 and the power converter 310. The dimming controller 1908 is operable for monitoring operations of the power switch 304, e.g., a turn-on operation and/or a turn-off operation, and for controlling the output power delivered to the LED light source 312 accordingly, to control the dimming of the LED light source 312. The dimming controller 1908 includes multiple terminals, such as a terminal HV_GATE, a terminal CLK, a terminal VDD, a terminal GND, a voltage control terminal CTRL, a terminal RT, a terminal MON and a current control terminal CS. The terminals VDD, GND, RT and MON operate similar to the corresponding terminals of the dimming controller 1408 shown in FIG. 14.

In one embodiment, the dimming controller 1908 receives a switch monitoring signal 1450 indicative of a conductance status, e.g., an ON/OFF status, of the power switch 304 at the terminal CLK. In one embodiment, the dimming controller 1908 controls the switch Q27 according to the switch monitoring signal 1450. More specifically, if the switch monitoring signal 1450 indicates that the power switch 304 is turned off, then the dimming controller 1908 generates a signal, e.g., logic low, at the terminal HV_GATE to turn off the switch Q27. As such, the current $I_{LED}$ flowing through the LED light source 312 drops to substantially zero amperes to cut off the LED light source 312. If the switch monitoring signal 1450 indicates that the power switch 304 is turned on, then the dimming controller 1908 generates a signal, e.g., logic high, at the terminal HV_GATE to turn the switch Q27 on. Then, the dimming controller 1908 controls the current $I_{LED}$ flowing through the LED light source 312 according to signals on the terminal CTRL and the terminal CS.

In one embodiment, the dimming controller 1908 detects a dimming request signal indicating an operation of the power switch 304 according to the switch monitoring signal 1450. In one embodiment, the dimming controller 1908 receives the dimming request signal if the switch monitoring signal 1450 indicates that the power switch 304 performs a turn-off operation. When the power switch 304 is turned on again, the dimming controller 1908 adjusts an average current flowing though the LED light source 312 in response to the dimming request signal, to adjust the brightness of the LED light source 312.

The dimming controller 1908 is capable of operating in a first mode and a second mode to adjust an average current of the LED light source 312. As described below, the current $I_{LED}$ represents the current flowing through the LED light source 312. During operation in the first mode, the current $I_{LED}$ is represented as the current $I_{LED1}$. During operation in the second mode, the current $I_{LED}$ is represented as the current $I_{LED2}$.

When the dimming controller 1908 operates in the first mode, the voltage control terminal CTRL of the dimming controller 1908 provides a pulse signal 1952 to alternately operate the control switch Q16 in a first state, e.g., a switch-on state, and a second state, e.g., a switch-off state. Thus, the current $I_{LED1}$ flows through the LED light source 312, and varies according to the status of the control switch Q16. In one embodiment, during the switch-on state of the switch Q16, the current $I_{LED1}$ flows through the LED light source 312, the switch Q16, the resistor R5, and ground. Thus, the current $I_{LED1}$ increases. During the switch-off state of the switch Q16, the current $I_{LED1}$ flows through the LED light source 312 and the diode D4, and thereby decreases. Thus, the average current flowing through the LED light source 312 can be adjusted by controlling the control switch Q16 in an analog dimming mode, a burst dimming mode, and/or a combination dimming mode, in one embodiment, which is further described in relation to FIG. 20.

When the dimming controller 1908 operates in the second mode, the dimming controller 1908 provides a control signal 1954 at the voltage control terminal CTRL, e.g., a digital zero signal, which maintains the control switch Q16 in the switch-off state. Thus, the current $I_{LED1}$ is cut off. Moreover, the dimming controller 1908 conducts the current $I_{LED2}$ through the LED light source 312 and the current control terminal CS.

Advantageously, the dimming controller 1908 achieves a relatively wide range of dimming by selecting an operation mode from at least the first mode and the second mode. For example, if $I_{MAX}$ indicates a maximum level of the average current $I_{AVERAGE}$, then the dimming controller 1908 can operate in the first mode to adjust the average level $I_{AVERAGE}$ of the current $I_{LED1}$ ranging from 4%*$I_{MAX}$ to 100%*$I_{MAX}$ (by way of example). Moreover, the dimming controller 1908 is capable of operating in the second mode to adjust the average current $I_{AVERAGE}$ to a lower level. For example, the dimming controller 1908 sets the current $I_{LED2}$ to a constant level 1%*$I_{MAX}$. In other words, the LED light source 312 in the second mode is adjusted to be darker than that in the first mode, which is beneficial for energy-efficient light applications such as, for example, night lighting. In addition, the current $I_{LED2}$ in the second mode is at a substantially constant level, which does not vary according to turn-on and turn-off operations of the switch Q16. As such, the light emitted by the LED light source 312 is not interfered with by switching noise of the switch Q16, which enhances the lighting stability of the LED light source 312.

Figure 20:
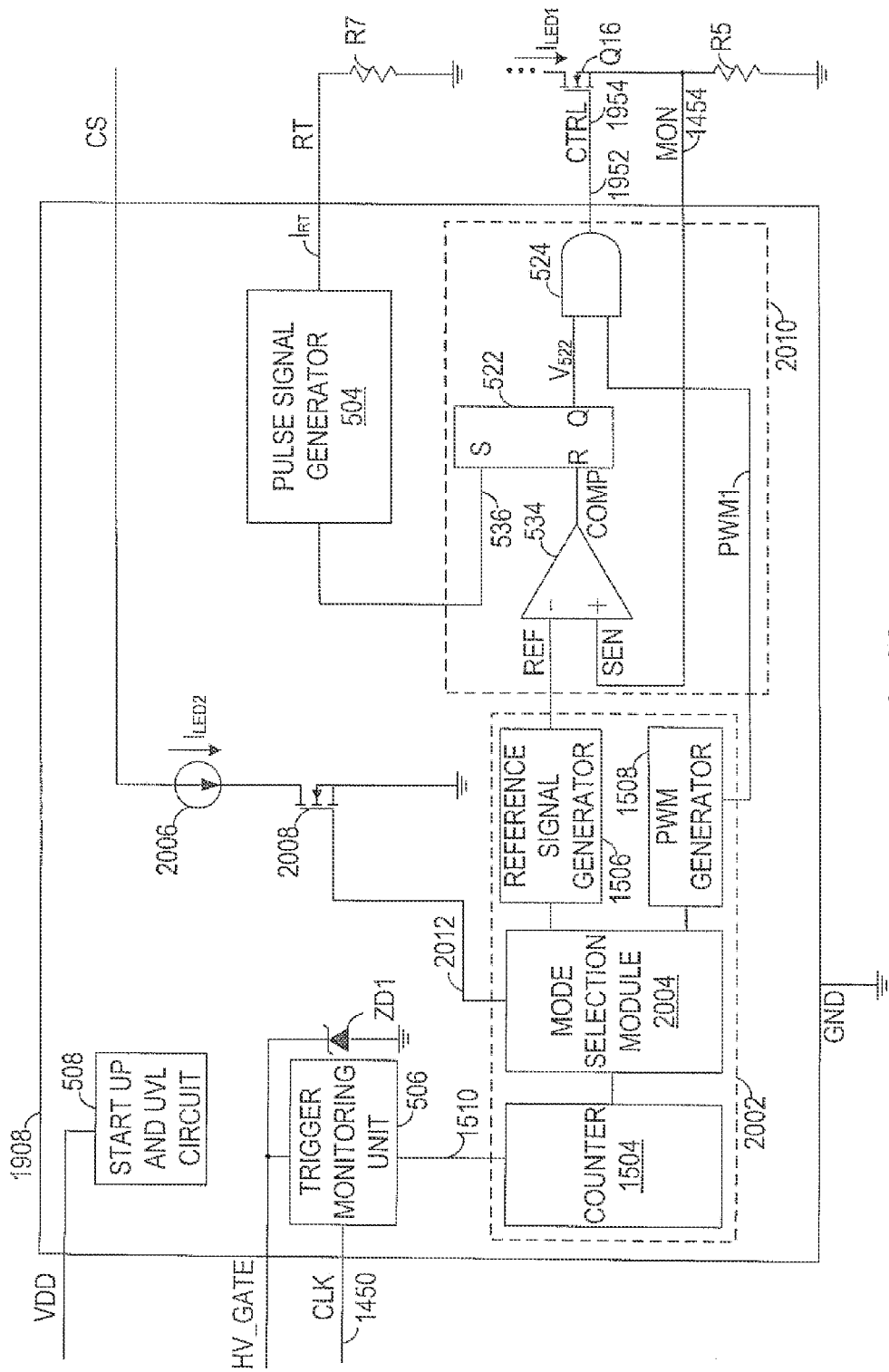
FIG. 20 shows an example of a structure of a dimming controller in FIG. 19, in an embodiment according to the present invention.

FIG. 20 shows an example of a structure of the dimming controller 1908 in FIG. 19, in an embodiment according to the present invention. FIG. 20 is described in combination with FIG. 15 and FIG. 19. Elements labeled the same as in FIG. 15 and FIG. 19 have similar functions. In the example of FIG. 20, the dimming controller 1908 includes a start-up and UVL circuit 508, a pulse signal generator 504, a trigger monitoring unit 506, a dimmer 2002, a driver 2010, a switch 2008 and a current source 2006.

In one embodiment, the switch monitoring signal 1450 can be received by the trigger monitoring unit 506 via the terminal CLK. The trigger monitoring unit 506 identifies the dimming request signal indicating a turn-off operation according to the switch monitoring signal 1450. If a dimming request signal is received, the trigger monitoring unit 506 generates an enable signal 1510.

The dimmer 2002 includes a counter 1504, a reference signal generator 1506, a PWM generator 1508, and a mode selection module 2004. The counter 1504 provides a counter value VALUE_1504 that varies in response to the enable signal 1510. In one embodiment, the counter 1504 increases the counter value VALUE_1504 in response to the enable signal 1510. Alternatively, the counter 1504 decreases the counter value VALUE_1504 in response to the enable signal 1510.

TABLE 3

| VALUE_1504 | 0 | 1 | 2 |
|---|---|---|---|
| $I_{TARGET}$ OPERATION MODE | 100% * $I_{MAX}$ FIRST MODE | 30% * $I_{MAX}$ FIRST MODE | 1% * $I_{MAX}$ SECOND MODE |

TABLE 4

| VALUE_1504 | 0 | 1 | 2 |
|---|---|---|---|
| $I_{TARGET}$ OPERATION MODE | 1% * $I_{MAX}$ SECOND MODE | 30% * $I_{MAX}$ FIRST MODE | 100% * $I_{MAX}$ FIRST MODE |

The mode selection module 2004 selects an operation mode for the dimming controller 1908 from the first mode and the second mode according to the counter value VALUE_1504. In one embodiment, the counter value VALUE_1504 indicates a required brightness level of the LED light source 312. The required brightness level corresponds to a target level $I_{TARGET}$ of the average current $I_{AVERAGE}$ of the LED light source 312. Referring to Table 3 and Table 4, examples of the counter value VALUE_1504 of the counter 1504 versus the target level $I_{TARGET}$ and the operation mode of the dimming controller 1908 are shown. In the example of Table 3, the counter value VALUE_1504 can be 0, 1 and 2, respectively indicating the target levels $100\%*I_{MAX}$, $30\%*I_{MAX}$ and $1\%*I_{MAX}$, where $I_{MAX}$ represents a maximum level of the average current $I_{AVERAGE}$. In the example of Table 4, the counter value VALUE_1504 can be 0, 1 and 2, respectively indicating the target levels $1\%*I_{MAX}$, $30\%*I_{MAX}$, $100\%*I_{MAX}$.

The mode selection module 2004 compares the counter value VALUE_1504 to a threshold to determine the selection of the operation modes. By way of example, the threshold is set to 1 according to the examples of Table 3 and Table 4. In Table 3, the mode selection module 2004 selects the first mode if the counter value VALUE_1504 is equal to or less than 1, and selects the second mode if the counter value VALUE_1504 is greater than 1. In Table 4, the mode selection module 2004 selects the first mode if the counter value VALUE_1504 is equal to or greater than 1, and selects the second mode if the counter value VALUE_1504 is less than 1. Therefore, in the embodiments shown in Table 3 and Table 4, the first mode is selected if the target level of the average current $I_{AVERAGE}$ is relatively high, e.g., $I_{TARGET}$ is $30\%*I_{MAX}$ and $100*I_{MAX}$. Moreover, the second mode is selected if the target level of the average current $I_{AVERAGE}$ is relatively low, e.g., $I_{TARGET}$ is $1\%*I_{MAX}$.

Upon the selection of the operation mode, the mode selection module 2004 controls the switch 2008, the reference signal generator 1506, and the PWM generator 1508 to adjust the average current $I_{AVERAGE}$. More specifically, in one embodiment, the current source 2006 generates a substantially constant current $I_{LED2}$. During operation in the first mode, the mode selection module 2004 turns off the switch 2008 to cut off the current $I_{LED2}$, controls the reference signal generator 1506 to generate a reference signal REF, and controls the PWM generator 1508 to generate a pulse width modulation signal PWM1. The reference signal REF and the pulse width modulation signal PWM1 are used by the driver 2010 to generate the pulse signal 1952 to control the switch Q16, in one embodiment.

In one embodiment, the driver 2010 includes a comparator 534, a SR flip-flop 522, and an AND gate 524. If the first mode is selected, the driver 2010 operates similar to the corresponding components in the dimming controller 1408 in FIG. 15. As described in relation to FIG. 15, the comparator 534 compares the sensing signal 1454 with the reference signal REF to generate a comparing signal COMP. The pulse signal generator 504 generates a pulse signal 536 having a waveform of periodical pulses. In one embodiment, the SR flip-flop 522 sets the pulse signal $V_{522}$ to digital one when the pulse signal 536 is digital one, and resets the pulse signal $V_{522}$ to digital zero when the comparing signal COMP is digital one (e.g., when the sensing signal 1454 reaches the reference signal REF). The AND gate 524 receives the pulse signal $V_{522}$ and the pulse-width modulation signal PWM1, and generates the pulse signal 1952 at terminal CTRL accordingly to control the control switch Q16. As such, when the pulse-width modulation signal PWM1 is at the first state, e.g., digital one, the pulse signal 1952 is equal to the pulse signal $V_{522}$, which is switched between digital one and digital zero according to a result of the comparing signal COMP. When the pulse-width modulation signal PWM1 is at the second state, e.g., digital zero, the pulse signal 1952 remains at digital zero. As described in relation to FIG. 15, the reference signal REF determines a peak level of the current $I_{LED1}$. The duty cycle of the pulse width modulation signal PWM1 determines a ratio of a time when the switch Q16 is turned on to a time when the switch Q16 is turned off. Therefore, by adjusting the reference signal REF and/or the duty cycle of the pulse width modulation signal PWM1, the dimmer 2002 is capable of operating in an analog dimming mode, a burst dimming mode, and a combination dimming mode to adjust the average current $I_{AVERAGE}$.

According to the example in Table 3, when the counter value VALUE_1504 is 0, the dimming controller 1908 operates in the first mode, the reference signal REF has a level $V_{REF0}$, and the duty cycle of the pulse width modulation signal PWM1 has a value $D_{PWM0}$. If the counter value VALUE_1504 is changed from 0 to 1, the dimming controller 1908 remains in the first mode, and the target level of the average current $I_{AVERAGE}$ is changed from $100\%*I_{MAX}$ to $30\%*I_{MAX}$. If the dimmer 2002 operates in an analog dimming mode, the level of the reference signal REF is adjusted to be $30\%*V_{REF0}$, and the duty cycle of PWM1 remains at the same value $D_{PWM0}$. If the dimmer 2002 operates in a burst dimming mode, the level of the reference signal REF remains at the same level $V_{REF0}$, while the duty cycle of PWM1 is adjusted to be $30\%*D_{PWM0}$. If the dimmer 2002 operates in a combination mode, both the level of the reference signal REF and the duty cycle of PWM1 are changed, for example, the level of the reference signal REF is $50\%*V_{REF0}$, and the duty cycle of PWM1 is $60\%*D_{PWM0}$. In all the three instances, the average current $I_{AVERAGE}$ can be adjusted from $100\%*I_{MAX}$ to $30\%*I_{MAX}$ to achieve the dimming control for the LED light source 312 in the first mode.

When the dimming controller 1908 operates in the second mode, e.g., if the counter value VALUE_1504 is changed from 1 to 2 according to Table 3, then the dimming controller 1908 generates the control signal 1954 at the voltage control terminal CTRL to turn off the switch Q16. More specifically, the mode selection module 2004 controls the PWM generator 1508 to maintain the pulse width modulation signal PWM1 at the second state, e.g., digital zero. The AND gate 524 maintains the voltage at the terminal CTRL at a low electrical level to generate the control signal 1954, e.g., a digital zero signal. Thus, the current $I_{LED1}$ flowing through the LED light source 312 is cut off.

In addition, the current source 2006 generates a substantially constant current $I_{LED2}$, in one embodiment. The mode selection module 2004 generates a switch control signal 2012 to turn on the switch 2008. A current path for the current $I_{LED2}$ is conducted, e.g., when the switch Q27 is turned on after a turn-on operation of the power switch 304. As such, the current $I_{LED2}$ flows through the LED light source 312, the current control terminal CS, the switch 2008, and ground. As used herein, "a substantially constant current $I_{LED2}$" means that the current $I_{LED2}$ may vary but is within a range such that the current ripple caused by non-ideality of the circuit components can be neglected. Advantageously, since the current $I_{LED2}$ is not affected by the switching noise of one or more switches, e.g., the power switch 304 and/or the switch Q16, the line interference of the light source 312 can be reduced or eliminated. As such, the lighting stability of the light source driving circuit 1900 is further improved. The dimming controller 1908 can have other configurations and is not limited to the example shown in FIG. 20.

Figure 21:
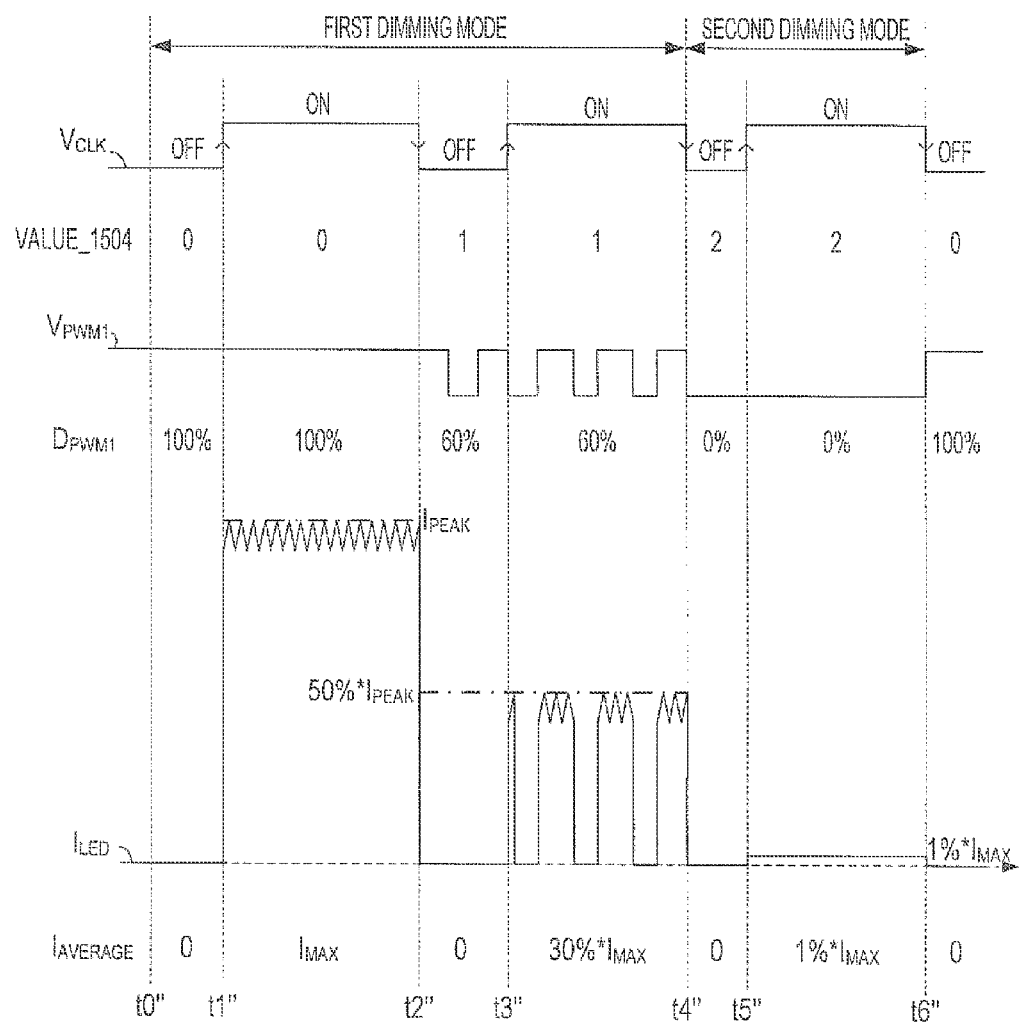
FIG. 21 illustrates an example of a diagram illustrating operation of a light source driving circuit including a dimming controller, in an embodiment according to the present invention.

FIG. 21 shows an example of a diagram illustrating an operation of a light source driving circuit which includes the dimming controller 1908 in FIG. 19, in an embodiment according to the present invention. FIG. 21 is described in combination with FIG. 19 and FIG. 20. FIG. 21 shows the voltage $V_{CLK}$ at the terminal CLK, the counter value VALUE_1504 of the counter 1504, the voltage $V_{PWM1}$ of the pulse-width modulation signal PWM1, the duty cycle $D_{PWM1}$ of the pulse-width modulation signal PWM1, the current $I_{LED}$ flowing through the LED light source 312, and the average level $I_{AVERAGE}$ of the current $I_{LED}$. In the example of FIG. 19, the dimming controller 1908 determines the operation mode and controls the average current of the LED light source 312 according to Table 3.

At time t0", the power switch 304 is off. The dimming controller 1908 turns off the switch Q27. The counter value VALUE_1504 is 0. Based upon Table 3, the mode selection module 2004 selects the first mode, and the target level of the average current $I_{AVERAGE}$ is 100%*$I_{MAX}$. Thus, the PWM generator 1508 adjusts the duty cycle $D_{PWM1}$ to 100%, and the reference signal generator 1506 controls the reference signal REF to adjust the peak value of the current $I_{LED}$ to $I_{PEAK}$, e.g., a maximum level of the peak value. At time t1", when the voltage $V_{CLK}$ at the CLK terminal has a rising edge indicating a turn-on operation of the power switch 304, the average current $I_{AVERAGE}$ is consequently adjusted to 100%*$I_{MAX}$. Between the time t1" and t2", the average current $I_{AVERAGE}$ is maintained at 100%*$I_{MAX}$.

At time t2", the voltage $V_{CLK}$ has a falling edge indicating a turn-off operation of the power switch 304. The switch Q27 is turned off to cut off the current $I_{LED}$. Thus, between t2" and t3", the current $I_{LED}$ drops to substantially zero amperes and the average current $I_{AVERAGE}$ drops to substantially zero amperes.

In one embodiment, upon detection of a turn-off operation of the power switch 304 at time t2", a dimming request signal is received. The counter value VALUE_1504 is increased from 0 to 1. According to Table 3, the mode selection module 2004 remains in the first mode from time t2" to time t4", and the target level of the average current $I_{AVERAGE}$ is adjusted to 30%*$I_{MAX}$. In the example of FIG. 21, the dimmer 2002 operates in the combination mode, in which the PWM generator 1508 adjusts the duty cycle $D_{PWM1}$ to 60%, and the reference signal generator 1506 controls the reference signal REF to adjust the peak value of the current $I_{LED}$ to be equal to 50%*$I_{PEAK}$. When the voltage $V_{CLK}$ at the CLK terminal has a rising edge indicating a turn-on operation of the power switch 304 at time t3", the average current $I_{AVERAGE}$ is adjusted to 30%*$I_{MAX}$. Between the time t3" and t4", the average current $I_{AVERAGE}$ is maintained at 30%*$I_{MAX}$.

At time t4", a falling edge of the voltage $V_{CLK}$ indicates a turn-off operation of the power switch 304, and thus a dimming request signal is received. In response, the counter value VALUE_1504 is increased from 1 to 2. According to Table 3, the target level of the average current $I_{AVERAGE}$ is adjusted to 1%*$I_{MAX}$, and the mode selection module 2004 selects the second mode. As such, the mode selection module 2004 generates the switch control signal 2012 to turn on the switch 2008. Between t4" and t5", both the current $I_{LED}$ and the average current $I_{AVERAGE}$ are at zero amperes since the power switch 304 and the switch Q27 are turned off.

At time t5", the voltage $V_{CLK}$ has a rising edge indicating a turn-on operation of the power switch 304. Since the switch Q27 is turned on after a turn-on operation of the power switch 304, and since the switch 2008 is also turned on at time t4", the current path for the current $I_{LED2}$ is conducted. The current $I_{LED2}$ is equal to 1%*$I_{MAX}$ in one embodiment. Thus, between t5" and t6", the average current $I_{AVERAGE}$ is maintained at 1%*$I_{MAX}$.

Therefore, between t1" and t6", the dimming controller 1908 selects an operation mode from the first mode and the second mode according to the counter value VALUE_1504. Advantageously, the dimming controller 1908 achieves a relatively wide dimming range, e.g., a range of 100%*$I_{MAX}$ to 1%*$I_{MAX}$. The operations of the dimming controller 1908 are not limited to the example shown in FIG. 21. In another embodiment, during the second mode, the dimming controller 1908 is capable of providing another current, e.g., having a smaller constant current level 0.01*$I_{MAX}$, to flow through the LED light source 312 and the terminal CS. Thus, the brightness of the LED light source 312 can be lower to achieve a wider dimming range. In addition, the current $I_{LED2}$ is at a substantially constant level, which does not vary according to turn-on and turn-off operations of the switch Q16. As such, the light emitted by the LED light source 312 is not interfered with by switching noises of the switch Q16, which increases the lighting stability of the LED light source 312.

Figure 22:
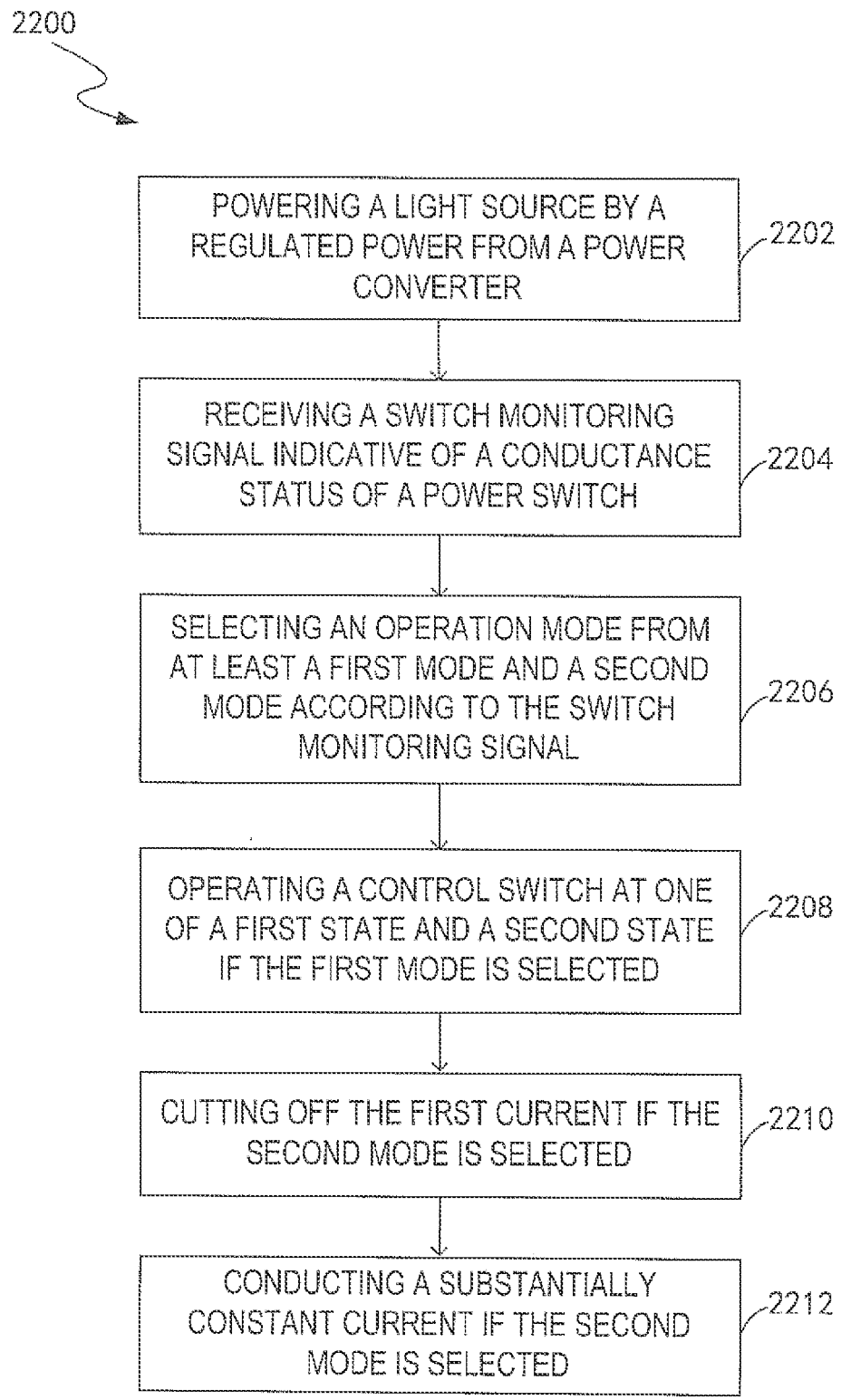
FIG. 22 shows a flowchart of a method for adjusting power for a light source, in an embodiment according to the present invention.

FIG. 22 shows a flowchart 2200 of operations performed by source dimming controller, e.g., the dimming controller 1908, in an embodiment according to the present invention. FIG. 22 is described in combination with FIG. 19-FIG. 21. Although specific steps are disclosed in FIG. 22, such steps are examples. That is, the present invention is well suited to performing various other steps or variations of the steps recited in FIG. 22.

In block 2202, a light source, e.g., the LED light source 312, is powered by a regulated voltage from a power converter, e.g., the power converter 310.

In block 2204, a switch monitoring signal is received. The switch monitoring signal indicates a conductance status of a power switch, e.g., the power switch 304, coupled between a power source and the power converter.

In block 2206, an operation mode is selected from at least a first mode and a second mode according to the switch monitoring signal. In one embodiment, when the switch monitoring signal indicating a turn-off operation of the power switch is received, the counter value of counter is changed from a first value to a second value accordingly. The counter value is compared with a threshold, e.g., 1, and the operation mode is selected according to a result of the comparison.

In block 2208, a control switch, e.g., the switch Q16, is operated between a first state, e.g., a switch-on state, and a second state, e.g., a switch-off state according to a pulse signal, e.g., the pulse signal 1952, if the first mode is selected. In one embodiment, the first current, e.g., $I_{LED1}$, flowing through the LED light source is increased during the first state of the control switch, and is decreased during the second state of the control switch. In one embodiment, if the first mode is selected, a reference signal, e.g., the reference signal REF, and a pulse-width modulation signal, e.g., the pulse-width modulation signal PWM1, are received. If the first mode is selected, a sensing signal indicating the first current flowing through the LED light source is compared with the reference signal. The control switch is turned on and off according to a result of the comparing during a first state, e.g., digital one, of the pulse-width modulation signal, and is turned off during a second state, e.g., digital zero, of the pulse-width modulation signal. In one embodiment, if the counter value is changed from a third value to a fourth value while still operating in the first mode, the level of the reference signal and the duty cycle of the pulse-width signal are adjusted to adjust the brightness of the LED light source.

In block 2210, the first current, e.g., the current $I_{LED1}$, is cut off according to a control signal, e.g., the control signal 1954, if the second mode is selected. In one embodiment, in the second mode, the pulse-width modulation signal is maintained in the second state, e.g., digital zero, to generate the control signal, e.g., a digital zero signal, to cut off the first current.

In block 2212, a substantially constant current, e.g., current $I_{LED2}$, flows through the LED light source 312 if the second mode is selected. In one embodiment, the current $I_{LED2}$ is provided by a current source, e.g., current source 2006. When the second mode is selected, the mode selection module 2004 generates a switch control signal 2012 to turn on the switch 2008 coupled with the current source 2006 in series.

Figure 23A:
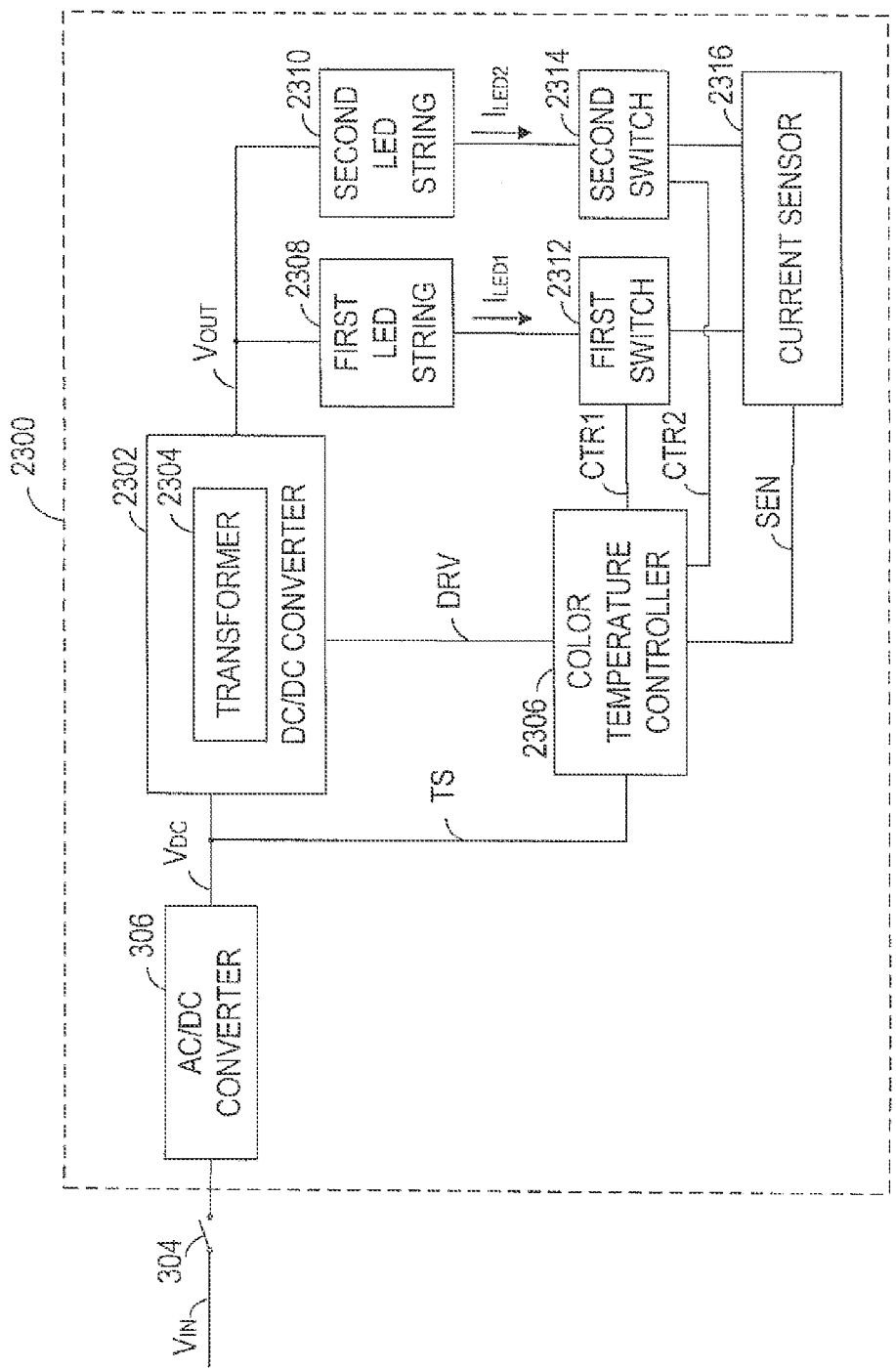
FIG. 23A shows a block diagram of a light source driving circuit, in an embodiment according to the present invention.

FIG. 23A shows a block diagram of a light source driving circuit 2300, in an embodiment according to the present invention. In one embodiment, a light source includes a first light element (e.g., a first LED string 2308) and a second light element (e.g., a second LED string 2310). The second LED string 2310 can have a different color temperature from the first LED string 2308. For example, the first LED string 2308 has a first color temperature level and the second LED string 2310 has a second color temperature level. A power switch 304 coupled between a power source and the light source driving circuit 2300 is operable for selectively coupling the power source to the light source driving circuit 2300. In one embodiment, the power switch 304 can be an on/off switch mounted on the wall.

The light source driving circuit 2300 includes an AC/DC converter 306 for converting an AC input voltage $V_{IN}$ from the power source to a DC voltage $V_{DC}$. The light source driving circuit 2300 also includes a DC/DC converter 2302 coupled between the AC/DC converter 306 and the light source (e.g., the first LED string 2308 and the second LED string 2310). The DC/DC converter 2302 is operable for receiving the DC voltage $V_{DC}$ from the AC/DC converter 306 and for providing regulated output power $V_{OUT}$ to the light source (e.g., the first LED string 2308 and the second LED string 2310). The DC/DC converter 2302 includes a transformer 2304 having a primary winding and a secondary winding. A color temperature controller 2306 is coupled between the primary winding of the transformer 2304 and the light source (e.g., the first LED string 2308 and the second LED string 2310). The color temperature controller 2306 is operable for receiving a switch monitoring signal TS indicative of an operation (e.g., a turn-off operation) of the power switch 304 and for adjusting the color temperature of the light source (e.g., the first LED string 2308 and the second LED string 2310) based on the switch monitoring signal TS. As shown in FIG. 23A, the color temperature controller 2306 generates a first control signal CTR1 and a second control signal CTR2 to control the first LED string 2308 and the second LED string 2310 according to the switch monitoring signal TS.

The first control signal CTR1 selectively turns on a first control switch 2312 coupled between the color temperature controller 2306 and the first LED string 2308 so that the color temperature of the light source is adjusted to the first color temperature level. The second control signal CTR2 selectively turns on a second control switch 2314 coupled between the color temperature controller 2306 and the second LED string 2310 so that the color temperature of the light source is adjusted to the second color temperature level. More specifically, if the first control signal CTR1 turns on the first control switch 2312 coupled between the color temperature controller 2306 and the first LED string 2308, a current $I_{LED1}$ flows through the first LED string 2308 and the color temperature of the light source is adjusted to the first color temperature level. If the second control signal CTR2 turns on the second control switch 2314 coupled between the color temperature controller 2306 and the second LED string 2310, a current $I_{LED2}$ flows through the second LED string 2310 and the color temperature of the light source is adjusted to the second color temperature level. The color temperature controller 2306 further receives a current monitoring signal SEN indicating a level of a current flowing through the light source (e.g., the current $I_{LED1}$ or the current $I_{LED2}$) from a current sensor 2316. The color temperature controller 2306 generates a driving signal DRV according to the current monitoring signal SEN. The driving signal DRV controls the input power to the primary winding of the transformer 2304, thereby regulating the output power $V_{OUT}$ of the DC/DC converter 2302.

Figure 23B:
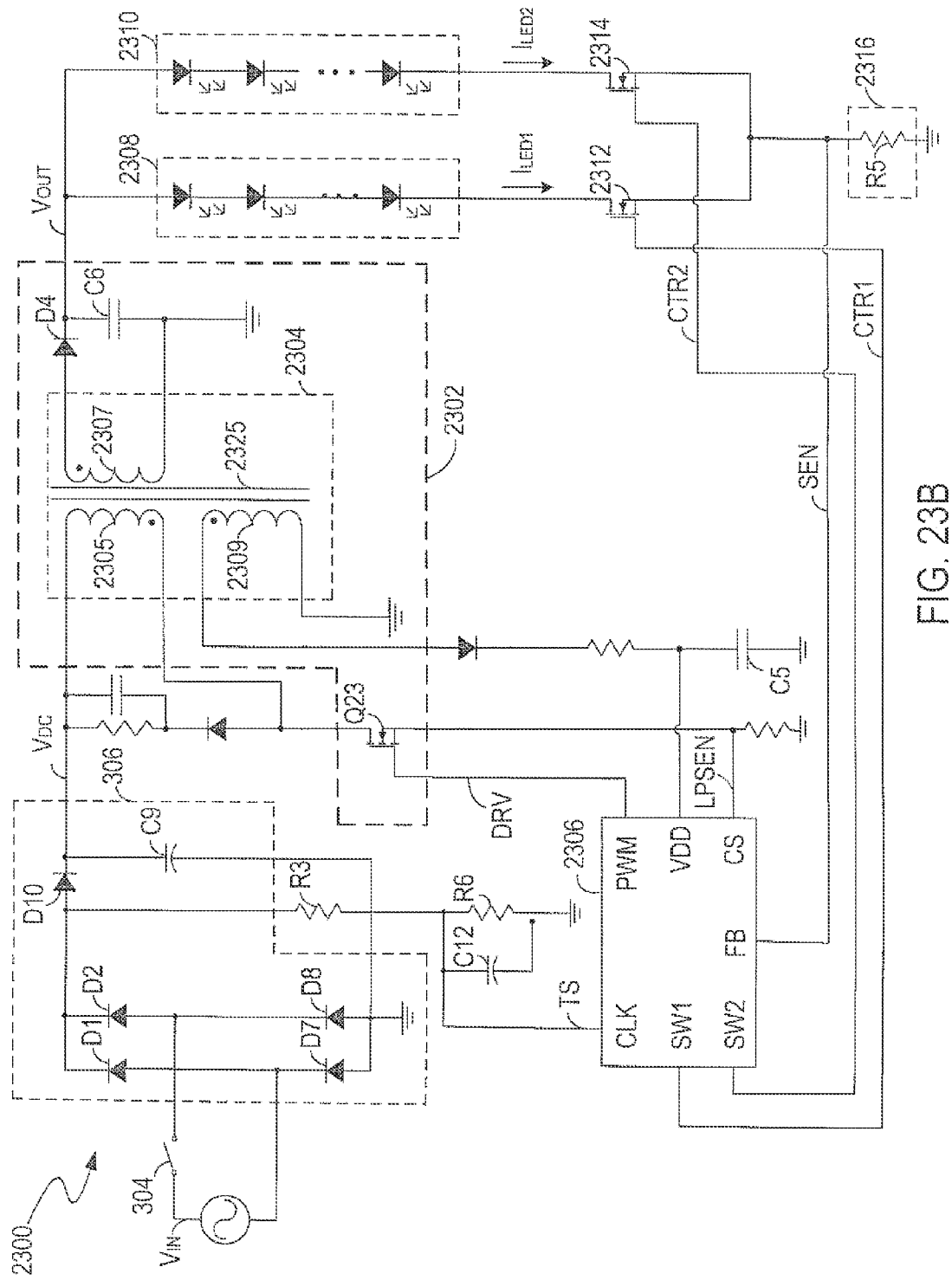
FIG. 23B shows an example of a schematic diagram of a light source driving circuit, in an embodiment according to the present invention.

FIG. 23B shows an example of a schematic diagram of the light source driving circuit 2300, in an embodiment according to the present invention. The light source driving circuit 2300 is powered by a power source $V_{IN}$ (e.g., 110/120 Volt AC, 60 Hz) via the power switch 304. In one embodiment, the AC/DC converter 306 has the same structure as in FIG. 4. The AC/DC converter 306 is coupled to the DC/DC converter 2302 and the color temperature controller 2306. The current sensor 2316 can be a current sensing resistor R5.

The DC/DC converter 2302 receives power from the AC/DC converter 306 and provides regulated power $V_{OUT}$ to the light source, e.g., the first LED string 2308 and the second LED string 2310. In the example of FIG. 23B, the DC/DC converter 2302 includes the transformer 2304, a control switch Q23, a diode D4, and a capacitor C6. The transformer 2304 includes a primary winding 2305 for receiving input power $V_{DC}$ from the AC/DC converter 306, a secondary winding 2307 for providing output power $V_{OUT}$ to the first LED string 2308 and the second LED string 2310, and a magnetic core 2325. The transformer 2304 further includes an auxiliary winding 2309 for providing power to the color temperature controller 2306. For illustrative purposes, three windings are shown in the example of FIG. 23B. However, a different number of windings can be included in the transformer 2304. In the embodiment shown in FIG. 23B, the control switch Q23 coupled to the primary winding 2305 is located outside the color temperature controller 2306. Alternatively, the control switch Q23 can be integrated in the color temperature controller 2306.

The color temperature controller 2306 is electrically coupled to the primary winding 2305 and the auxiliary winding 2309 of the transformer 2304. The color temperature controller 2306 can be a flyback PWM controller, which is operable for generating a pulse-width modulation (PWM) signal DRV to selectively turn on the control switch Q23 coupled in series with the primary winding 2305, and for adjusting the output power of the transformer 2304 by adjusting a duty cycle of the PWM signal DRV. By way of example, and not limitation, terminals of the color temperature controller 2306 include CLK, PWM, VDD, CS, FB, SW1 and SW2.

The color temperature controller 2306 receives a switch monitoring signal TS indicative of a conductance status, e.g., an ON/OFF status, of the power switch 304 at the terminal CLK. The color temperature controller 2306 further generates the first control signal CTR1 (at the terminal SW1) and the second control signal CTR2 (at the terminal SW2) to control the first LED string 2308 and the second LED string 2310 according to the switch monitoring signal TS. More specifically, in one embodiment, if the switch monitoring signal TS indicates that the power switch 304 is turned on for the first time, the color temperature controller 2306 uses the first control signal CTR1 to turn on the first control switch 2312 and uses the second control signal CTR2 to turn off the second control switch 2314. Then a current $I_{LED1}$ flows through the first LED string 2308 and there is no current flowing through the second LED string 2310. If the switch monitoring signal TS indicates that the power switch 304 is turned off and turned on again within a predetermined time period, the color temperature controller 2306 uses the first control signal CTR1 to turn off the first control switch 2312 and uses the second control signal CTR2 to turn on the second control switch 2314. Then there is no current flowing through the first LED string 2308 and a current $I_{LED2}$ flows through the second LED string 2310. Since the second LED string 2310 can have a different color temperature from the first LED string 2308, the color temperature controller 2306 can adjust the color temperature of the light source according to the switch monitoring signal TS.

The terminal FB receives the current monitoring signal SEN indicating a level of the current $I_{LED1}$ or the current $I_{LED2}$ from the current sensor 2316. The terminal CS receives a sensing signal LPSEN indicating a current flowing through the primary winding 2305. The color temperature controller 2306 receives the current monitoring signal SEN and the sensing signal LPSEN, and generates a driving signal DRV at the terminal PWM to control the control switch Q23 so as to regulate the output power $V_{OUT}$ of the DC/DC converter 2302.

The terminal PWM provides the driving signal DRV to control a conductance status, e.g., ON/OFF status, of the control switch Q23 according to the current monitoring signal SEN and the sensing signal LPSEN. More specifically, the voltage of the current monitoring signal SEN can be compared with that of a reference signal indicating a target current level flowing through the light source, and the voltage of the sensing signal LPSEN can be compared with that of another reference signal indicating the target current level. If either or both of the comparison results indicate that an instant current level flowing through the light source is greater than the target current level, the color temperature controller 2306 decreases the duty cycle of the driving signal DRV, and vice versa. In one embodiment, if the driving signal DRV is in a first state (e.g., logic high), the control switch Q23 is turned on, the current flows through the primary winding 2305, and the magnetic core 2325 stores energy. If the driving signal DRV is in a second state (e.g., logic low), the control switch Q23 is turned off, and the diode D4 coupled to the secondary winding 2307 is forward-biased so that the energy stored in the magnetic core 2325 is released to the capacitor C6 and the light source through the secondary winding 2307. Accordingly, the power of the light source (e.g., the first LED string 2308 and the second LED string 2310) is adjusted.

The terminal VDD is coupled to the auxiliary winding 2309. In one embodiment, an energy storage unit, e.g., a capacitor C5, coupled between the terminal VDD and ground can power the color temperature controller 2306 when the power switch 304 is turned off.

Advantageously, in response to a turn-off operation of the power switch 304 in the primary side circuit, the color temperature of the light source (e.g., the first LED string 2308 and the second LED string 2310) in the secondary side circuit can be adjusted to a target level by the color temperature controller 2306 after the power switch 304 is turned on again within a predetermined time period after the turn-off operation of the power switch.

Figure 24:
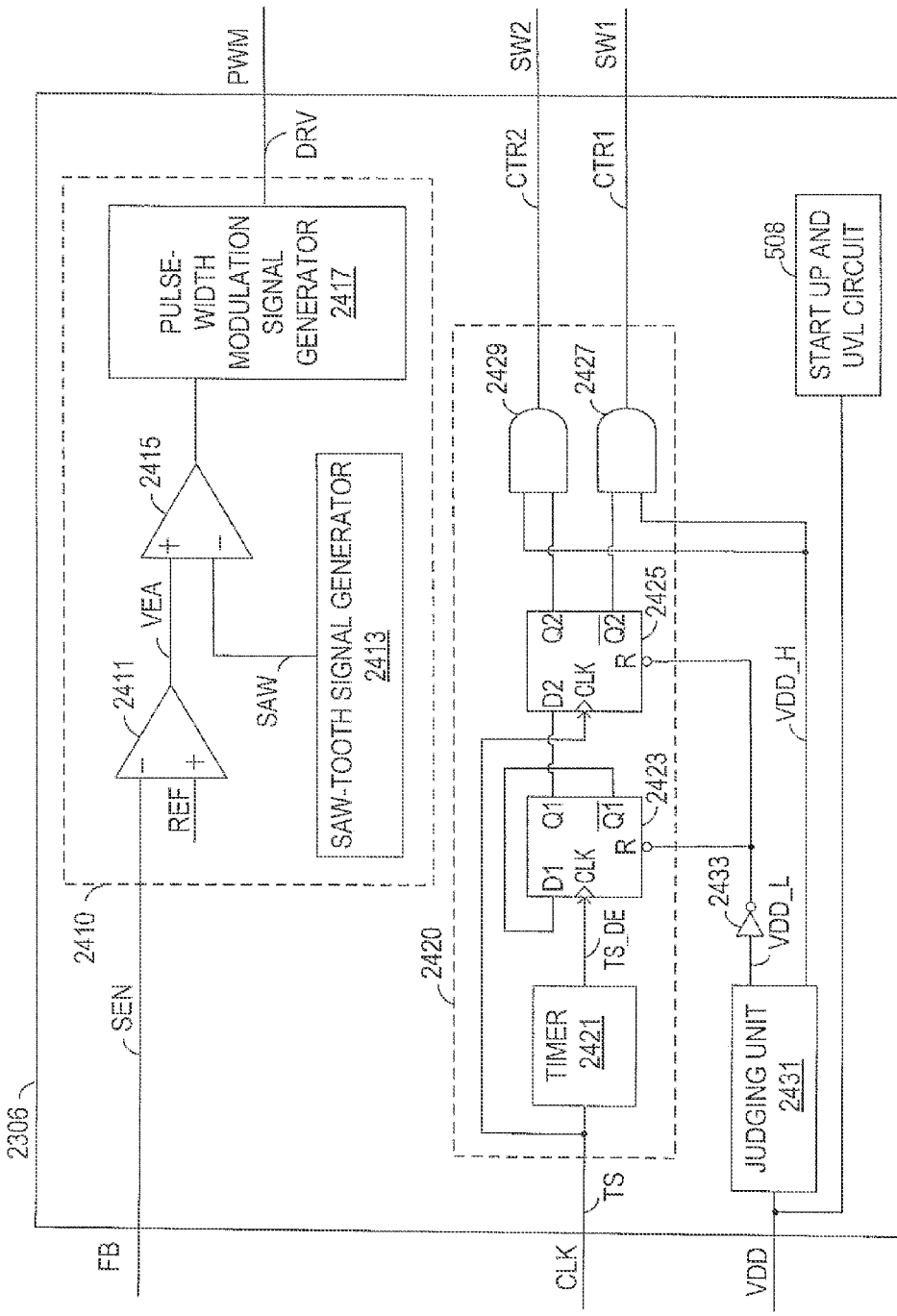
FIG. 24 shows an example of a structure of a color temperature controller in FIG. 23B, in an embodiment according to the present invention.

FIG. 24 shows an example of a structure of the color temperature controller 2306 in FIG. 23B, in an embodiment according to the present invention. FIG. 24 is described in combination with FIG. 20 and FIG. 23B. Elements labeled the same as in FIG. 20 and FIG. 23B have similar functions. In the example of FIG. 24, the color temperature controller 2306 includes a start up and under voltage lockout (UVL) circuit 508, a driver 2410, a control unit 2420, a judging unit 2431, and a NOT gate 2433.

The driver 2410 is operable for receiving a current monitoring signal SEN indicating a level of a current flowing through the first LED string 2308 or the second LED string 2310 from a current sensor 2316, and for generating the driving signal DRV according to the current monitoring signal SEN. In one embodiment, the driver 2410 includes an error amplifier 2411, a saw-tooth signal generator 2413, a comparator 2415, and a pulse-width modulation signal generator 2417. The error amplifier 2411 generates an error signal VEA based on a reference signal REF and the current monitoring signal SEN. The reference signal REF indicates a target current level of the light source (e.g., the first LED string 2308 or the second LED string 2310). The current monitoring signal SEN is received at the terminal FB and indicates the current $I_{LED1}$ or the current $I_{LED2}$ from the current sensor 2316. The error signal VEA is used to adjust the current $I_{LED1}$ flowing through the first LED string 2308 or the current $I_{LED2}$ flowing through the second LED string 2310 to the target current level. The saw-tooth signal generator 2413 generates a saw-tooth signal SAW. The comparator 2415 is coupled to the error amplifier 2411 and the saw-tooth signal generator 2413, compares the error signal VEA with the saw-tooth signal SAW, and generates an output to the pulse-width modulation signal generator 2417. The pulse-width modulation signal generator 2417 is coupled to the comparator 2415, and generates the driving signal DRV based on an output of the comparator 2415 to control the status of the switch Q23.

When the voltage of the current monitoring signal SEN is greater than that of the reference signal REF, indicating that the current $I_{LED1}$ flowing through the first LED string 2308 or the current $I_{LED2}$ flowing through the second LED string 2310 is greater than a target level that is determined by the reference signal REF, the driver 2410 decreases the duty cycle of the driving signal DRV according to the current monitoring signal SEN so that the output power of the DC/DC converter 2302 is decreased accordingly. Similarly, when the voltage of the current monitoring signal SEN is less than that of the reference signal REF, indicating that the current $I_{LED1}$ flowing through the first LED string 2308 or the current $I_{LED2}$ flowing through the second LED string 2310 is less than the target level that is determined by the reference signal REF, the driver 2410 increases the duty cycle of the driving signal DRV according to the current monitoring signal SEN so that the output power of the DC/DC converter 2302 is increased accordingly.

The judging unit 2431 detects a power status of the color temperature controller 2306 and generates a first judging signal VDD_L and a second judging signal VDD_H based on the power status of the color temperature controller 2306. Then the color temperature controller 2306 adjusts the color temperature of the light source based on the first judging signal VDD_L, the second judging signal VDD_H, and the switch monitoring signal TS. For example, if the voltage at the terminal VDD is less than a reset threshold (e.g., 4V), the first judging signal VDD_L has a first state, e.g., logic high. If the voltage at the terminal VDD of the color temperature controller 2306 is greater than the reset threshold (e.g., 4V), the first judging signal VDD_L has a second state, e.g., logic low. If the voltage at the terminal VDD of the color temperature controller 2306 is less than an enable threshold (e.g., 10V), the second judging signal VDD_H has a first state, e.g., logic low. If the voltage at the terminal VDD is greater than the enable threshold (e.g., 10V), the second judging signal VDD_H has a second state, e.g., logic high.

The control unit 2420 is operable for generating the first control signal CTR1 and the second control signal CTR2 to control the first LED string 2308 and the second LED string 2310 according to the switch monitoring signal TS, the first judging signal VDD_L, and the second judging signal VDD_H. In one embodiment, the control unit 2420 includes a timer 2421, a first D flip-flop 2423, a second D flip-flop 2425, a first AND gate 2427, and a second AND gate 2429. The timer 2421 receives the switch monitoring signal TS and begins timing if the switch monitoring signal TS has a falling edge. The timer 2421 further generates a pulse signal TS_DE after a predefined time interval Δt following each falling edge of the switch monitoring signal TS. The pulse signal TS_DE is coupled to the CLK input of the first D flip-flop 2423, and the switch monitoring signal TS is coupled to the CLK input of the second D flip-flop 2425. The D1 input of the first D flip-flop 2423 is coupled to its $\overline{Q1}$ output, and the Q1 output of the first D flip-flop 2423 is coupled to the D2 input of the second D flip-flop 2425.

The R inputs of the first D flip-flop 2423 and the second D flip-flop 2425 are both coupled to an output terminal of the NOT gate 2433, and the input terminal of the NOT gate 2433 is coupled to the judging unit 2431. If the voltage at the terminal VDD is less than a reset threshold (e.g., 4V) (e.g., the first judging signal VDD_L is logic high), the first D flip-flop 2423 and the second D flip-flop 2425 are reset via the NOT gate 2433. Then, the Q1 output of the first D flip-flop 2423 and the Q2 output of the second D flip-flop 2425 are both reset to logic low, and the $\overline{Q1}$ output of the first D flip-flop 2423 and the $\overline{Q2}$ output of the second D flip-flop 2425 are both reset to logic high.

The second judging signal VDD_H and the $\overline{Q2}$ output of the second D flip-flop 2425 are coupled to the first AND gate 2427. The first AND gate 2427 accordingly generates the first control signal CTR1 to control the first control switch 2312 and the current $I_{LED1}$ flowing through the first LED string 2308. The second judging signal VDD_H and the Q2 output of the second D flip-flop 2425 are coupled to the second AND gate 2429. The second AND gate 2429 accordingly generates the second control signal CTR2 to control the second control switch 2314 and the current $I_{LED2}$ flowing through the second LED string 2310. In this way, the color temperature of the light source can be adjusted by the color temperature controller 2306 in response to the turn-off operation of the power switch 304.

Figure 25:
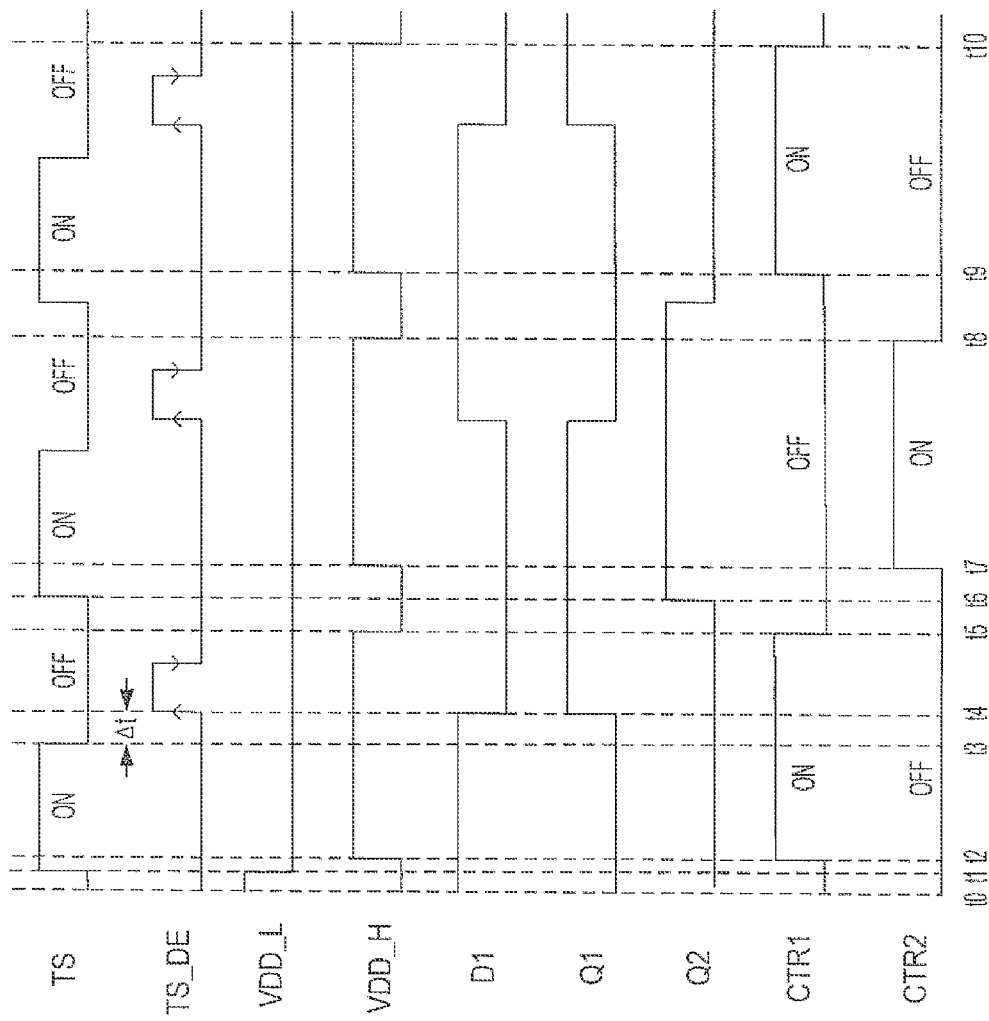
FIG. 25 illustrates an example of a diagram illustrating operation of a light source driving circuit including a color temperature controller, in an embodiment according to the present invention.

FIG. 25 illustrates examples of signal waveforms of the switch monitoring signal TS, the pulse signal TS_DE, the first judging signal VDD_L, the second judging signal VDD_H, the voltage at the D1 input, the voltage at the Q1 output, the voltage at the Q2 output, the first control signal CTR1 and the second control signal CTR2, in accordance with one embodiment of the present invention. FIG. 25 is described in combination with FIG. 23B and FIG. 24.

At time t0, the power switch 304 is turned on. At time t1, the switch monitoring signal TS changes from a first state (e.g., logic low) to a second state (e.g., logic high). The voltage at the terminal VDD is increased to the reset threshold (e.g., 4V) and the first judging signal VDD_L changes from a first state (e.g., logic high) to a second state (e.g., logic low). At time t2, the voltage at the terminal VDD is increased to the enable threshold (e.g., 10V) and the second judging signal VDD_H changes from a first state (e.g., logic low) to a second state (e.g., logic high). From t0 to t2, the Q1 output of the first D flip-flop 2423 and the Q2 output of the second D flip-flop 2425 are both logic low. Due to the second judging signal VDD_H (e.g., logic low) and the first AND gate 2427, the first control signal CTR1 and the second control signal CTR2 are both logic low. After time t2, since the second judging signal VDD_H changes to logic high, the first control signal CTR1 also changes to logic high. Then, the first control switch 2312 is turned on and the current $I_{LED1}$ starts to flow through the first LED string 2308. At time t3, the power switch 304 is turned off, and the voltage at the terminal VDD of the color temperature controller 2306 starts to decrease. As mentioned above, once the switch monitoring signal TS has a falling edge, a pulse signal TS_DE can be generated after a predefined time interval Δt. At time t4, in response to the rising edge of the pulse signal TS_DE, the D1 input of the first D flip-flop 2423 changes from logic high to logic low, and the Q1 output of the first D flip-flop 2423 changes from logic low to logic high. At time t5, the voltage at the terminal VDD is decreased to the enable threshold (e.g., 10V) and the second judging signal VDD_H changes from the second state (e.g., logic high) to the first state (e.g., logic low). Then, due to the second judging signal VDD_H (e.g., logic low) and the first AND gate 2427, the first control signal CTR1 and the second control signal CTR2 are both logic low.

At time t6, the power switch 304 is turned on again and therefore a rising edge appears in the switch monitoring signal TS at time t6. The time period between t3 and t6 is less than a predetermined (specified) time period (e.g., t6 minus t3<3 seconds), so that the voltage at the terminal VDD is kept above the reset threshold (e.g., 4V) and the first judging signal VDD_L is kept at logic low. In response to the rising edge of the switch monitoring signal TS, the Q2 output of the second D flip-flop 2425 changes from logic low to logic high and its $\overline{Q2}$ output changes from logic high to logic low. Similar to the time period between t1 and t2, the first control signal CTR1 and the second control signal CTR2 are both logic low from t6 to t7. After time t7, the voltage at the terminal VDD increases above the enable threshold (e.g., the second judging signal VDD_H changes to logic high), and the second control signal CTR2 also changes to logic high. The second control switch 2314 is turned on and the current $I_{LED2}$ starts to flow through the second LED string 2310. Then, the power switch 304 is turned off again, and the voltage at the terminal VDD is decreased to the enable threshold (e.g., 10V) at time t8. The waveforms between t8 and t10 are similar to those between t0 and t5. At time t9, the first control switch 2312 is turned on and the current $I_{LED1}$ starts to flow through the first LED string 2308.

Therefore, the color temperature controller 2306 alternately turns on the first control switch 2312 and the second control switch 2314 in response to the turn-off operation of the power switch 304. Since the second LED string 2310 can have a different color temperature from the first LED string 2308, the color temperature of the light source can be adjusted by the color temperature controller 2306 in response to the turn-off operation of the power switch 304.

Figure 26:
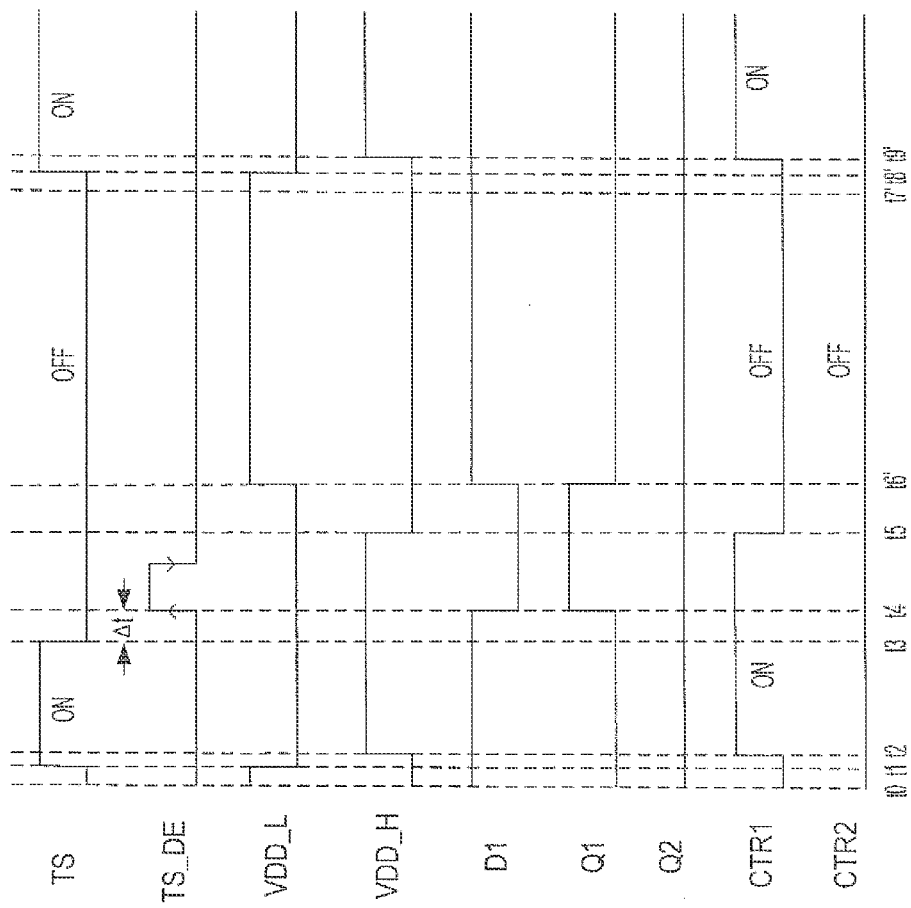
FIG. 26 illustrates another example of a diagram illustrating operation of a light source driving circuit including a color temperature controller, in an embodiment according to the present invention.

FIG. 26 illustrates examples of signal waveforms of the switch monitoring signal TS, the pulse signal TS_DE, the first judging signal VDD_L, the second judging signal VDD_H, the voltage at the D1 input, the voltage at the Q1 output, the voltage at the Q2 output, the first control signal CTR1, and the second control signal CTR2, in accordance with one embodiment of the present invention. FIG. 26 is described in combination with FIG. 23B, FIG. 24, and FIG. 25.

The waveforms between t0 and t6' are similar to those illustrated in FIG. 25. At time t7', the power switch 304 is turned on again. The time period between t3 and t7' is greater than the predetermined time period (e.g., t7' minus t3>3 seconds). Therefore, at time t6', the voltage at the terminal VDD is decreased to the reset threshold (e.g., 4V) and the first judging signal VDD_L changes from logic low to logic high. The Q1 output and the Q2 output are both reset to logic low. Due to the second judging signal VDD_H (e.g., logic low) and the first AND gate 2427, the first control signal CTR1 and the second control signal CTR2 are both logic low.

At time t8', the switch monitoring signal TS changes from the first state (e.g., logic low) to the second state (e.g., logic high). The voltage at the terminal VDD is increased to the reset threshold (e.g., 4V) and the first judging signal VDD_L changes from the first state (e.g., logic high) to the second state (e.g., logic low). At time t9', the voltage at the terminal VDD is increased to the enable threshold (e.g., 10V) and the second judging signal VDD_H changes from the first state (e.g., logic low) to the second state (e.g., logic high). The waveforms between t7' and t9' are similar to those between t0 and t2. After time t9', the voltage at the terminal VDD increases above the enable threshold (e.g., the second judging signal VDD_H changes to logic high), and the first control signal CTR1 also changes to logic high. Then, the first control switch 2312 is turned on and the current $I_{LED1}$ starts to flow through the first LED string 2308.

As shown in FIG. 25, if the switch monitoring signal TS indicates that a time period between a turn-off operation and a following turn-on operation of the power switch 304 is less than a predetermined time period (e.g., 3 seconds), the color temperature controller 2306 changes the color temperature of the light source (e.g., the first LED string 2308 and the second LED string 2310) from a first color temperature level to a second color temperature level in response to the following turn-on operation of the power switch 304. More specifically, in the example of FIG. 25, during a first time period (e.g., from t2 to t5), the first control signal CTR1 is logic high, the first LED string 2308 is turned on and the second LED string 2310 is turned off, so that the color temperature of the light source is adjusted to the first color temperature level. Then during a second time period, different from the first time period, e.g., from t7 to t8, the first control signal CTR2 is logic high, the first LED string 2308 is turned off, and the second LED string 2310 is turned on, so that the color temperature of the light source is adjusted to the second color temperature level. Therefore, the color temperature controller 2306 changes the color temperature of the light source from that of the first LED string 2308 to that of the second LED string 2310 by alternately turning on the first control switch 2312 and the second control switch 2314. However, as shown in FIG. 26, if the switch monitoring signal TS indicates that a time period between a turn-off operation and a following turn-on operation of the power switch 304 is greater than the predetermined time period, the color temperature controller 2306 resets the color temperature of the light source to a default color temperature in response to the following turn-on operation of the power switch 304. In the example of FIG. 26, the default color temperature can be preset to the color temperature of the first LED string 2308, for example, by the factory setting. The default color temperature can also be preset to any other suitable value and is not limited to the configuration as shown in the example of FIG. 26.

Figure 27:
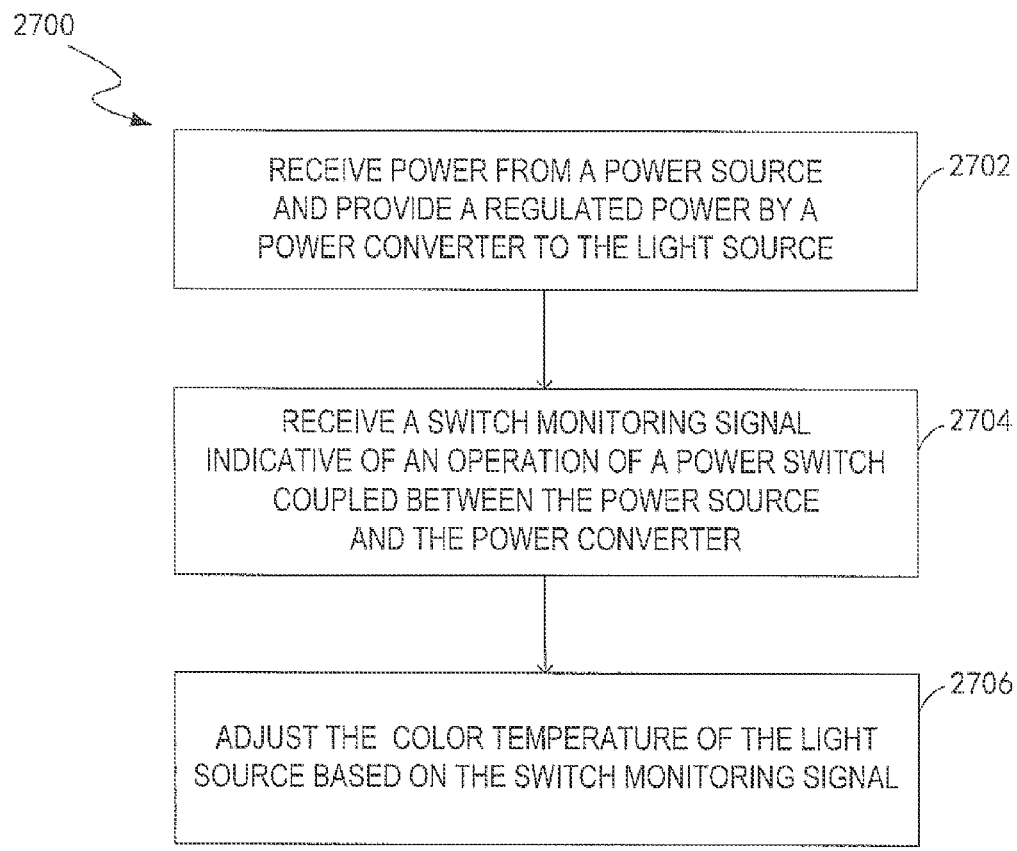
FIG. 27 shows a flowchart of a method for adjusting power for a light source, in an embodiment according to the present invention.

FIG. 27 shows a flowchart 2700 of operations performed by a light source color temperature controller, e.g., the color temperature controller 2306, in an embodiment according to the present invention. FIG. 27 is described in combination with FIG. 23A-FIG. 26. Although specific steps are disclosed in FIG. 27, such steps are examples. That is, the present invention is well suited to performing various other steps or variations of the steps recited in FIG. 27.

In block 2702, a driving circuit (e.g., the light source driving circuit 2300) receives power from a power source and provides a regulated power by a power converter (e.g. the bridge rectifier 306 and the transformer 2304) to a light source (e.g., the first LED string 2308 and the second LED string 2310). In block 2704, a switch monitoring signal TS is received, e.g., by the color temperature controller 2306. The switch monitoring signal TS indicates an operation of a power switch coupled between the power source and the power converter, e.g., the power switch 304. In block 2706, the color temperature of the light source is adjusted based on the switch monitoring signal TS. For example, during a first time period (e.g., in FIG. 25, from t2 to t5), the color temperature controller 2306 can generate a first control signal CTR1 and a second control signal CTR2 to turn on a first LED string 2308 having a first color temperature level and to turn off a second LED string 2310 having a second color temperature level, so that the color temperature of the light source is adjusted to the first color temperature level. Then during a second time period, different from the first time period (e.g., in FIG. 25, from t7 to t8), the color temperature controller 2306 can generate the first control signal CTR1 and the second control signal CTR2 to turn off the first LED string 2308 and to turn on the second LED string 2310, so that the color temperature of the light source is adjusted to the second color temperature level.

Accordingly, embodiments in accordance with the present invention provide a driving circuit that controls the color temperature of a light source, e.g., the first LED string 2308 and the second LED string 2310, according to a switch monitoring signal indicative of an operation of a power switch, e.g., an on/off switch mounted on the wall. The power of the light source, which is provided by a DC/DC converter, can be adjusted by the color temperature controller by controlling a switch coupled in series with a primary winding of a transformer in the DC/DC converter. Advantageously, users can adjust the color temperature of the light source through an operation (e.g., a turn-off operation) of a low-cost on/off power switch. Therefore, extra apparatus for controlling, such as a specially designed switch with adjusting buttons, can be avoided and the cost can be reduced.

The discussion above is based on example embodiments that utilize LED strings. However, embodiments according to the present invention may be implemented using other types of lights; that is, embodiments according to the invention are not necessarily limited to LEDs. Such other types of lights may be referred to herein as light elements.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A driving circuit for driving a light source having an adjustable color temperature, the driving circuit comprising:
a power converter, coupled between a power source and the light source and operable for receiving power from the power source and for providing a regulated power to the light source; and
a color temperature controller, coupled to the power converter and operable for receiving a switch monitoring signal indicative of an operation of a power switch coupled between the power source and the power converter, and for adjusting the color temperature of the light source based on the switch monitoring signal,
wherein the light source comprises a first light element having a first color temperature level and a second light element having a second color temperature level, wherein the color temperature controller comprises a control unit for generating a first control signal and a second control signal according to the switch monitoring signal, wherein the first control signal selectively turns on a first control switch coupled between the color temperature controller and the first light element so that the color temperature of the light source is adjusted to the first color temperature level, and wherein the second control signal selectively turns on a second control switch coupled between the color temperature controller and the second light element so that the color temperature of the light source is adjusted to the second color temperature level,
wherein the control unit comprises:
a timer, operable for receiving the switch monitoring signal, for beginning timing if the switch monitoring signal has a falling edge, and for generating a pulse signal after a predefined time interval;
a first D flip-flop, coupled to the pulse signal; and
a second D flip-flop, coupled to the switch monitoring signal and the first D flip-flop,
wherein the first control signal and the second control signal are generated based on the output of the second D flip-flop.

2. The driving circuit as claimed in claim 1, wherein if the switch monitoring signal indicates that the time period between a turn-off operation and a following turn-on operation of the power switch is less than a predetermined time period, then the color temperature controller changes the color temperature of the light source from a first color temperature level to a second color temperature level in response to the following turn-on operation of the power switch.

3. The driving circuit as claimed in claim 2, wherein the light source comprises a first light element having the first color temperature level and a second light element having the second color temperature level, wherein the color temperature controller adjusts the color temperature of the light source by generating a first control signal and a second control signal; wherein if the first control signal turns on a first control switch coupled between the color temperature controller and the first light element, then a current flows through the first light element and the color temperature of the light source is adjusted to the first color temperature level; and wherein if the second control signal turns on a second control switch coupled between the color temperature controller and the second light element, then a current flows through the second light element and the color temperature of the light source is adjusted to the second color temperature level.

4. The driving circuit as claimed in claim 1, wherein if the switch monitoring signal indicates that the time period between a turn-off operation and a following turn-on operation of the power switch is greater than a predetermined time period, then the color temperature controller resets the color temperature of the light source to a default color temperature level in response to the following turn-on operation of the power switch.

5. The driving circuit as claimed in claim 1, wherein the power converter comprises a bridge rectifier and a transformer, wherein the transformer has a primary winding, a secondary winding, and an auxiliary winding, wherein the primary winding is coupled to the bridge rectifier and operable for receiving power from the power source through the bridge rectifier, wherein the secondary winding is operable for providing the regulated power to the light source, and wherein the auxiliary winding is operable for providing power to the color temperature controller, and wherein the power switch is coupled between the power source and the bridge rectifier.

6. The driving circuit as claimed in claim 1, wherein the color temperature controller is operable for receiving a current monitoring signal indicating a level of a current flowing through the light source, and for controlling the regulated power to the light source according to the current monitoring signal.

* * * * *